US012242309B2

United States Patent
Hyun et al.

(10) Patent No.: US 12,242,309 B2
(45) Date of Patent: Mar. 4, 2025

(54) FOLDABLE ELECTRONIC DEVICE

(71) Applicant: SAMSUNG ELECTRONICS CO., LTD., Suwon-si (KR)

(72) Inventors: Kyunghoon Hyun, Suwon-si (KR); Daehyeong Park, Suwon-si (KR); Heebo Shim, Suwon-si (KR); Minsung Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 109 days.

(21) Appl. No.: 17/972,843

(22) Filed: Oct. 25, 2022

(65) Prior Publication Data

US 2023/0038719 A1    Feb. 9, 2023

Related U.S. Application Data

(63) Continuation of application No. PCT/KR2022/011881, filed on Aug. 9, 2022.

(30) Foreign Application Priority Data

Aug. 9, 2021 (KR) .................. 10-2021-0104909
Jan. 28, 2022 (KR) .................. 10-2022-0013699

(51) Int. Cl.
    *G06F 1/16*    (2006.01)
(52) U.S. Cl.
    CPC .......... *G06F 1/1681* (2013.01); *G06F 1/1647* (2013.01); *G06F 1/1652* (2013.01)
(58) Field of Classification Search
    None
    See application file for complete search history.

(56) References Cited

U.S. PATENT DOCUMENTS

| 9,348,450 B1* | 5/2016 | Kim .................... H04M 1/0268 |
| 10,365,694 B2 | 7/2019 | Lin et al. |

(Continued)

FOREIGN PATENT DOCUMENTS

| CN | 208225378 U | 12/2018 |
| CN | 111327739 A | 6/2020 |

(Continued)

OTHER PUBLICATIONS

International Search Report and Written Opinion for International Application No. PCT/KR2022/011881; International Filing Date Aug. 9, 2022; Date of Mailing Nov. 14, 2022; 10 Pages.

(Continued)

*Primary Examiner* — Jinhee J Lee
*Assistant Examiner* — Peter Krim
(74) *Attorney, Agent, or Firm* — CANTOR COLBURN LLP

(57) ABSTRACT

According to an example embodiment of the disclosure, an electronic device is provided, and the electronic device includes a foldable housing including a first housing, a second housing, and a folding part between the first housing and the second housing. A first support structure is positioned in an internal space of the first housing to support a portion of a flexible display of the device. A second support structure is positioned in an internal space of the second housing to support a second portion of the flexible display. A first plate assembly is positioned in an internal space of the foldable housing, coupled to the first support structure, to support a portion of the flexible display. The first plate assembly includes a first plate, a second plate, a third plate, and a fourth plate. The second plate is positioned between the third plate and the fourth plate, when viewed from above the fourth surface.

20 Claims, 27 Drawing Sheets

(56) References Cited

U.S. PATENT DOCUMENTS

| | | | |
|---|---|---|---|
| 10,827,633 | B2 | 11/2020 | Yoo et al. |
| 11,435,779 | B2 | 9/2022 | Lee |
| 2018/0210511 | A1 | 7/2018 | Lin |
| 2020/0173208 | A1 | 6/2020 | Hsu |
| 2021/0055763 | A1 | 2/2021 | Park |
| 2021/0181808 | A1* | 6/2021 | Liao .................. G06F 1/1652 |
| 2022/0019268 | A1 | 1/2022 | Yu et al. |
| 2022/0129046 | A1 | 4/2022 | Baek et al. |
| 2022/0397936 | A1* | 12/2022 | Shim .................. G09F 9/301 |

FOREIGN PATENT DOCUMENTS

| | | |
|---|---|---|
| CN | 107422789 B | 9/2020 |
| CN | 112233549 A | 1/2021 |
| EP | 4060471 A1 | 9/2022 |
| KR | 101389442 B1 | 4/2014 |
| KR | 20180122210 A | 11/2018 |
| KR | 20200100490 A | 8/2020 |
| KR | 20210058573 A | 5/2021 |
| KR | 20210081045 A | 7/2021 |

OTHER PUBLICATIONS

Korean Office Action corresponding to Application No. 10-2022-0013699; Filing Date Jan. 28, 2022; Mailing Date Aug. 21, 2023; 10 pages.

Korean Prioritized Examination Application corresponding to U.S. Appl. No. 17/972,843; Issued on Jun. 9, 2023.

European Search Report corresponding to Application No. 22856193.2-1218; Dated Oct. 8, 2024.

\* cited by examiner

FOLDABLE ELECTRONIC DEVICE

CROSS-REFERENCE TO RELATED APPLICATIONS

This application is a continuation of International Application No. PCT/KR2022/011881 designating the United States, filed on Aug. 9, 2022, and claims priority to Korean Patent Application No. 10-2022-0013699 filed on Jan. 28, 2022, and Korean Patent Application No. 10-2021-0104909 filed on Aug. 9, 2021, in the Korean Intellectual Property Office, the disclosure of which are incorporated by reference herein their entirety.

TECHNICAL FIELD

The disclosure relates to a foldable electronic device.

Background Art

When a foldable electronic device is switched from an unfolded state to a folded state, an area in a flexible display corresponding to a folding part of the foldable electronic device may be transformed and disposed from an unfolded state to a curved state.

Technical Problem

When a foldable electronic device having a foldable display is placed in an unfolded state, a structure for supporting a bendable display area of the foldable display may be required so that the bendable area (e.g., bendable display area) in the foldable display corresponding to a folding part of the foldable electronic device is maintained in substantially an unfolded state and so as to reinforce the ability of the bendable display area against external loads (or external pressure). Unfortunately, some support structures, such as single integral metal plates, can introduce defects in the final device during processing. For example, when removing foreign substances or smoothing a surface using ceramic grains (e.g., barrel grinding), integral metal plates may cause bending deformations due to the relatively large shape (e.g., area or length) of the plate. Various examples of the disclosure are provided to address to at least mitigate the above-mentioned issue.

Solution to Problem

Various embodiments of the disclosure provide a foldable electronic device including a structure for supporting a bendable display area corresponding to a folding part of the foldable electronic device when the foldable electronic device is placed in an unfolded state.

Technical problems to be solved in the disclosure are not limited to the above-described technical problems, and other technical problems not mentioned will be understood by those of ordinary skill in the art to which the disclosure belongs from the following description.

According to an example embodiment of the disclosure, an electronic device is provided, and the electronic device includes a foldable housing including a first housing, a second housing, and a folding part between the first housing and the second housing; a flexible display positioned in an internal space of the foldable housing and visible through a front surface of the foldable housing; a first support structure positioned in the internal space of the first housing and configured to support a portion of the flexible display; a second support structure positioned in the internal space of the second housing and configured to support a portion of the flexible display; a first hinge assembly and second hinge assembly positioned in the internal space of the foldable housing to correspond to the folding part, configured to connect the first support structure and the second support structure, and spaced apart from each other in a direction of a folding axis of the folding part; and a first plate assembly positioned in the internal space of the foldable housing to correspond to the folding part, coupled to the first support structure, and configured to support a portion of the flexible display corresponding to the folding part, wherein the first plate assembly includes a first plate including a first surface facing the first support structure and a second surface facing in a direction opposite to that of the first surface and positioned between the first hinge assembly and the second hinge assembly; a second plate including a third surface facing the second surface and a fourth surface facing in a direction opposite to that of the third surface; a third plate including a fifth surface and a sixth surface facing in a direction opposite to that of the fifth surface, the fifth surface facing the second surface and the first hinge assembly; and a fourth plate including a seventh surface and an eighth surface facing in a direction opposite to that of the seventh surface, the seventh surface facing the second surface and the second hinge assembly, wherein the second plate is positioned between the third plate and the fourth plate, when viewed from above the fourth surface.

Advantageous Effects of Invention

A foldable electronic device according to various embodiments of the disclosure includes a plate assembly capable of stably supporting a bendable display area of a flexible display corresponding to a folding part of the foldable electronic device when in an unfolded state, thereby securing reliability of the foldable electronic device. The plate assembly has a form in which a plurality of metal plates are coupled, and can contribute to improved device yields and reliability by reducing defects compared to an integral metal plate.

Further, effects obtainable or predicted by various embodiments of the disclosure can be directly or implicitly disclosed in the detailed description of the embodiments of the disclosure.

MODE FOR THE INVENTION

Hereinafter, various embodiments disclosed herein will be described with reference to the accompanying drawings.

Figure 1:
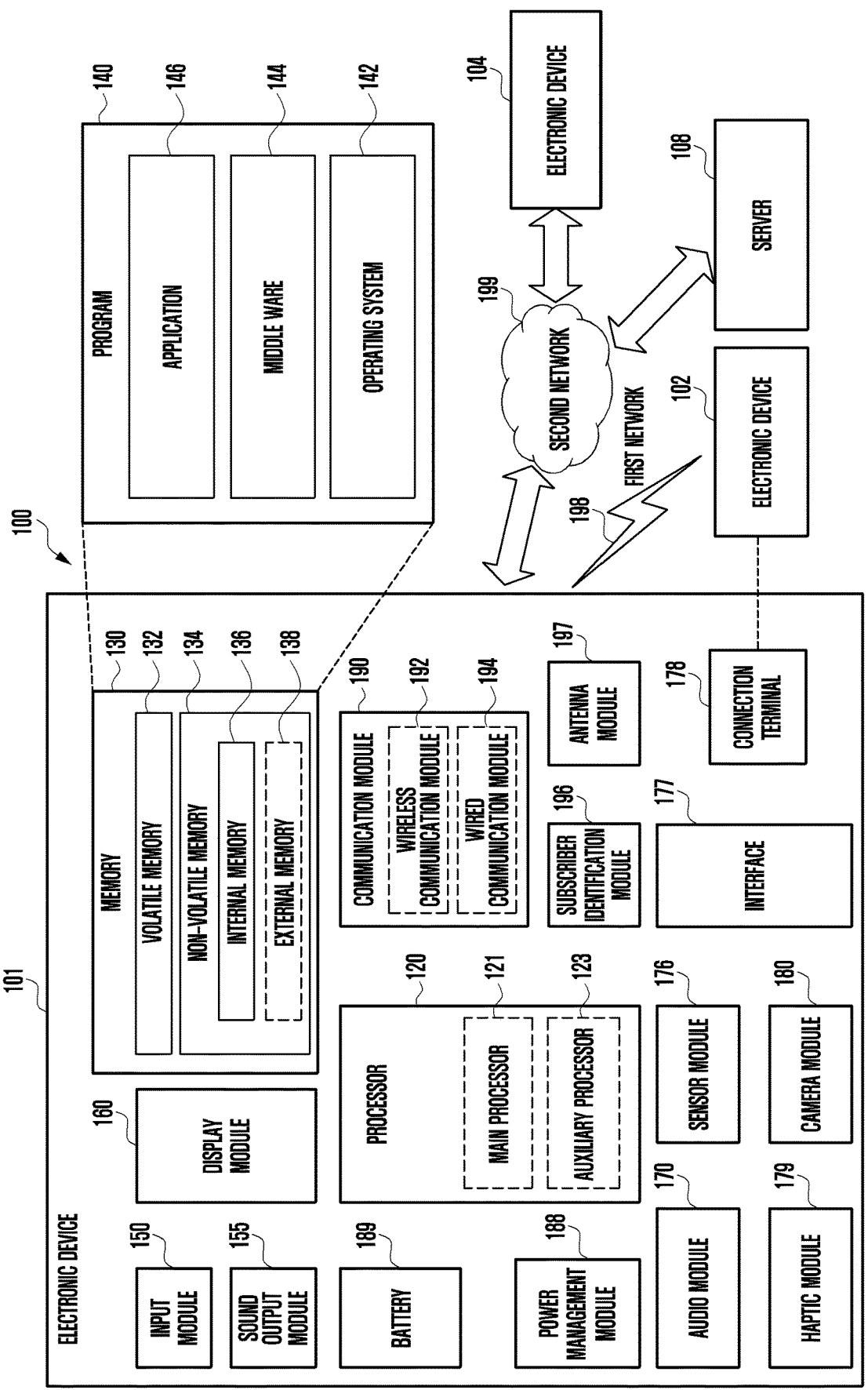
FIG. 1 is a block diagram illustrating an electronic device in a network environment according to an embodiment of the disclosure.

FIG. 1 is a block diagram of an electronic device 101 in a network environment 100 according to an embodiment of the disclosure.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments of the disclosure, at least one (e.g., the connection terminal 178) of the components may be omitted from the electronic device 101, or one or more other components may be added in the electronic device 101. In some embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application).

The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the external electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a 5th generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mmWave band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., external the electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In another embodiment of the disclosure, the external electronic device 104 may include an internet of things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAY-STORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
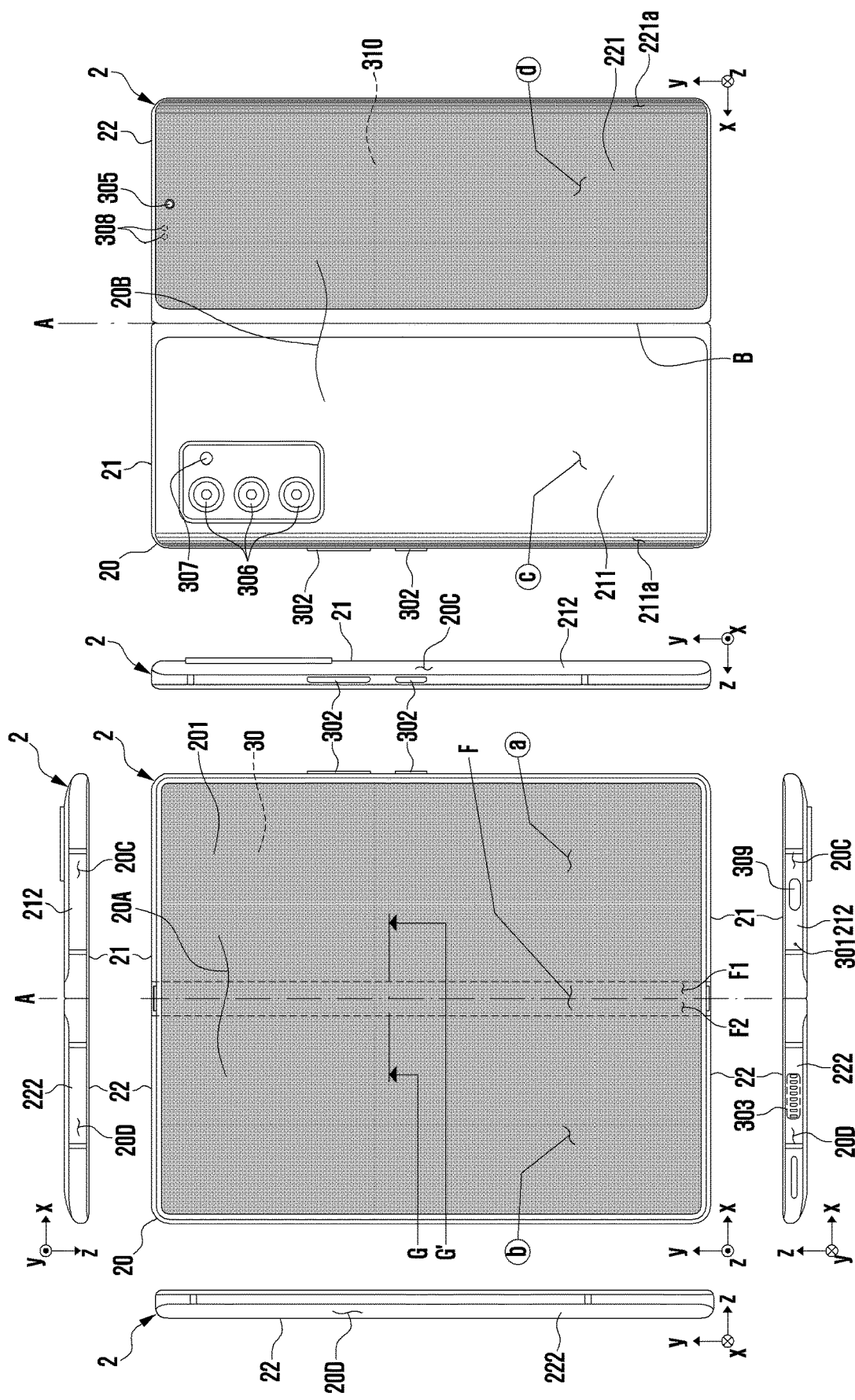
FIG. 2 is a diagram illustrating an electronic device in an unfolded state according to an embodiment of the disclosure.
Figure 3:
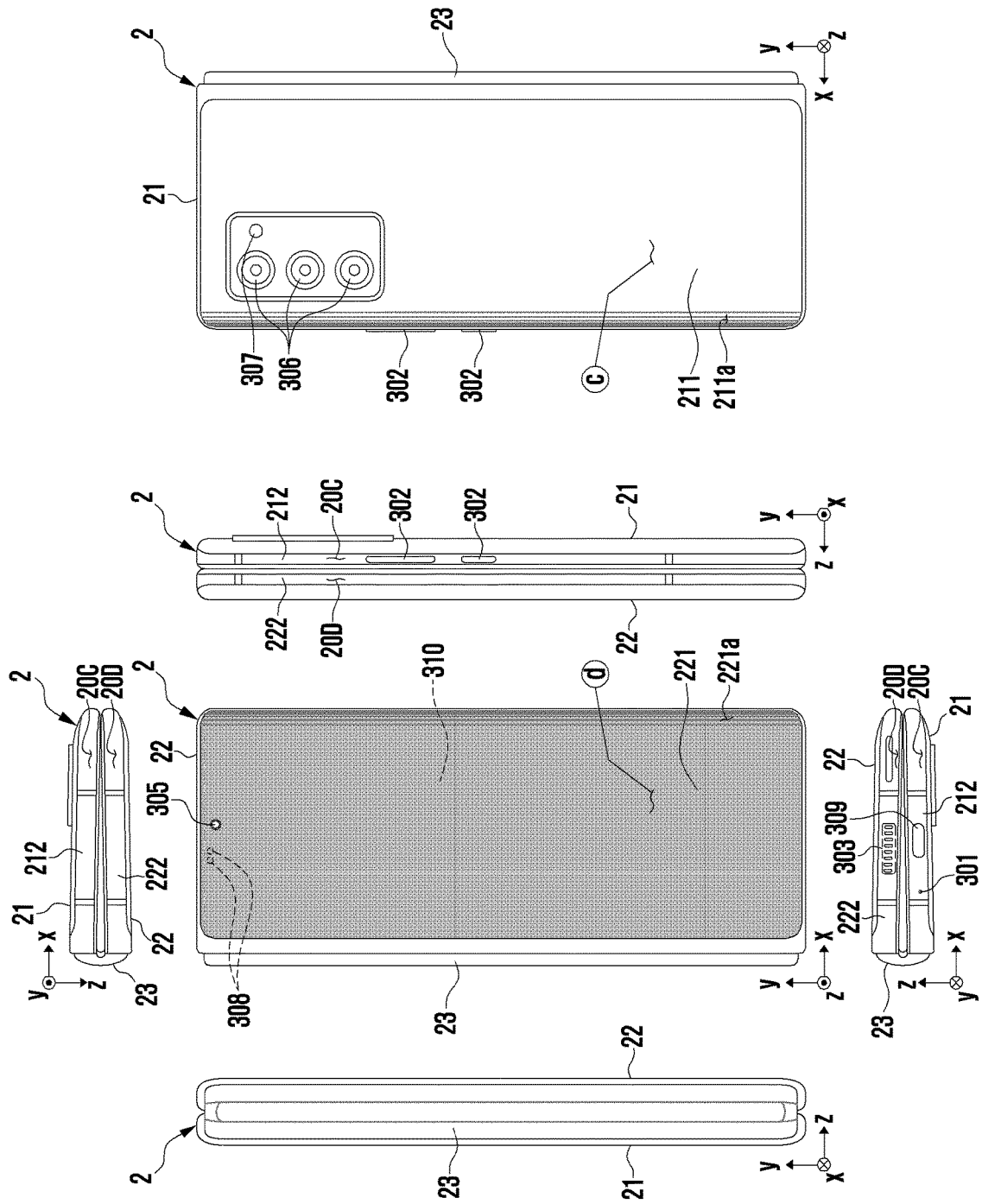
FIG. 3 is a diagram illustrating an electronic device in a folded state according to an embodiment of the disclosure.

FIG. 2 is a diagram illustrating an electronic device 2 in a flat or unfolded state according to an embodiment of the disclosure. FIG. 3 is a diagram illustrating an electronic device 2 in a folded state according to an embodiment of the disclosure.

With reference to FIGS. 2 and 3, in an embodiment, the electronic device 2 may include a foldable housing 20 and a flexible display 30. The foldable housing 20 may include a front surface 20A of the electronic device 2 and a rear surface 20B of the electronic device 2 positioned opposite to the front surface 20A. For better understanding, the front surface 20A of the electronic device 2 is a surface in which the flexible display 30 is exposed to the outside, and the rear surface 20B of the electronic device 2 is interpreted as a surface positioned opposite to the front surface 20A. The foldable housing 20 may include a first side surface 20C and a second side surface 20D of the electronic device 2 enclosing at least partially a space between the front surface 20A and the rear surface 20B. The front surface 20A may include a first cover area ⓐ, a second cover area ⓑ, and a folding cover area F between the first cover area ⓐ and the second cover area ⓑ. In an unfolded state of the foldable housing 20, the front surface 20A may be substantially a flat surface, and the first cover area ⓐ, the second cover area ⓑ, and the folding cover area F may face in substantially the same direction. The rear surface 20B may include a third cover area ⓒ and a fourth cover area ⓓ. The third cover area ⓒ may be positioned opposite to the first cover area ⓐ of the front surface 20A and face in a direction opposite to that of the first cover area). The fourth cover area ⓓ may be positioned opposite to the second cover area ⓑ of the front surface 20A and face in a direction opposite to that of the second cover area ⓑ. In an embodiment, the foldable housing 20 may be implemented in an in-folding structure in which the front surface 20A is folded inward. For example, in an unfolded state (see FIG. 2) of the foldable housing 20, the folding cover area F may be disposed in a planar form, and the first cover area ⓐ and the second cover area ⓑ may form an angle of about 180 degrees. In the folded state (see FIG. 3) of the foldable housing 20, the folding cover area F may be disposed in a curved form, and the first cover area ⓐ and the second cover area ⓑ may form an angle different from the angle of about 180 degrees. The folded state may include a fully folded state or an intermediate state. The fully folded state (see FIG. 3) is a fully folded state in which the first cover area ⓐ and the second cover area ⓑ of the front surface 20A are no longer close, and for example, the first cover area ⓐ and the second cover area ⓑ may form an angle of about 0 degrees to about 10 degrees. In a fully folded state, the front surface 20A may not be substantially exposed to the outside. The intermediate state may refer to a state between an unfolded state and a fully folded state. The folding cover area F of the front surface 20A may be more bent in the fully folded state than in the intermediate state. In some embodiments, the electronic device 2 may be implemented in an out-folding structure in which the front surface 20A (or screen) is folded outward.

According to an embodiment, the foldable housing 20 may include a front cover (e.g., window) 201 that provides at least a part of the front surface 20A. The flexible display 30 may at least partially overlap the front cover 201 to be positioned in an internal space of the electronic device 2. The front cover 201 may protect the flexible display 30 from the outside and be substantially transparent. Light output from the flexible display 30 may pass through the front cover 201 and proceed to the outside. The flexible display 30 may include, for example, a first display area (or first active area) overlapped with the first cover area ⓐ of the front surface 20A, a second display area (or second active area) overlapped with the second cover area ⓑ of the front surface 20A, and a third display area (or third active area) overlapped with the folding cover area F. In some embodiments, the third display area may be referred to as various other terms, such as a 'folding display area' or a 'bendable display area'. The screen may indicate an area that may represent the image in a device including the flexible display 30 and the front cover 201, and include, for example, a display area of the flexible display 30 and an area of the front cover 201 overlapped therewith. In some embodiments, the front cover 201 may be integrally formed with the flexible display 30 as a component included in the flexible display 30. The front cover 201 may be implemented in a thin film form such as a film so as to have flexibility. The front cover 201 may include, for example, a plastic film (e.g., polyimide film) or thin film glass (e.g., ultra-thin glass (UTG)). In some embodiments, the front cover 201 may include a plurality of layers. For example, the front cover 201 may be in the form in which a coating layer or protective layer of various polymeric materials (e.g., polyester (PET), polyimide (PI), or thermoplastic polyurethane (TPU)) is disposed on a plastic film or thin film glass.

According to an embodiment, the foldable housing 20 may include a first housing (or first housing part or first housing structure) 21, a second housing (or second housing part or second housing structure) 22, and a folding part between the first housing 21 and the second housing 22. Coordinate axes illustrated for better understanding are based on the first housing 21, for example, the first cover area ⓐ may face substantially in a +z axis direction, and the third cover area ⓒ may face substantially in a −z axis direction. The first housing 21 and the second housing 22 may be connected to the folding part and be mutually rotatable based on a folding axis A of the foldable housing 20. The folding part may include, for example, a hinge assembly (or hinge structure) (not illustrated). The folding axis A may be an axis of rotation of the hinge assembly. In the illustrated example, the folding axis A may be parallel to a y-axis direction. The first housing 21 may include a first cover portion of the front cover 201 positioned at one side based on the folding axis A, a first rear cover 211 that provides at least a part of the third cover area ⓒ of the rear surface 20B, and a first side member (or first side bezel structure) 212 that at least partially encloses a space between the first cover portion and the first rear cover 211 and that provides a first side surface 20C. A first cover portion of the front cover 201 may provide, for example, a first cover area ⓐ, and a first folding cover area F1 positioned at one side based on the folding axis A of the folding cover area F. The second housing 22 may include a second cover portion of the front cover 201 positioned at the other side based on the folding axis A, a second rear cover 221 that provides at least a part of the fourth cover area ⓓ of the rear surface 20B, and a second side member (or side bezel structure) 222 that at least partially encloses a space between the second cover part and the second rear cover 221 and that provides a second side surface 20D. The second cover part of the front cover 201 may provide, for example, the second cover area ⓑ and a second folding cover area F2 located at the other side based on the folding axis A of the folding cover area F. In the fully folded state of the foldable housing 20, the first side member 212 and the second side member 222 may be aligned at least partially overlapping each other. The first side member 212 and/or the second side member 222 may be provided by, for example, ceramic, polymer, metal (e.g., aluminum, stainless steel, or magnesium), or a combination of at least two of the foregoing materials. The first side member 212 and/or the second side member 222 may include various metallic materials such as, for example, titanium, an amorphous alloy, a metal-ceramic composite material (e.g., cermet), stainless steel, magnesium, a magnesium alloy, aluminum, aluminum alloys, zinc alloys, or copper alloys. The first rear cover 211 and/or the second rear cover 221 may be substantially opaque. The first rear cover 211 and/or the second rear cover 221 may be provided by, for example, coated or colored glass, ceramic, polymer, metal (e.g., aluminum, stainless steel, or magnesium), or a combination of at least two of the above materials. The first rear cover 211 or the second rear cover 221 may include, for example, a plate of various materials such as transparent glass, ceramic, or polymer and at least one coating layer disposed on the plate. For another example, the first rear cover 211 or the second rear cover 221 may include a plate of various materials such as transparent glass, ceramic, or polymer, and a film (e.g., decoration film) having various visual effects attached to the plate. In some embodiments, the first rear cover 211 and the first side member 212 may be integrally formed and include the same material. In some embodiments, the second rear cover 221 and the second side member 222 may be integrally formed and include the same material.

According to an embodiment, the folding part may include a hinge housing 23. The hinge housing 23 may cover at least one hinge connecting the first housing 21 and the second housing 22. In some embodiments, the hinge housing 23 may be referred to as a 'hinge cover'. When the electronic device 2 is switched from the unfolded state of FIG. 2 to the folded state of FIG. 3, the hinge housing 23 may cover the inside of the electronic device 2 from being exposed while a gap B between the first housing 21 and the second housing 22 is opened. As illustrated in FIG. 2, in the unfolded state of the electronic device 2, the gap B may be substantially free, and the hinge housing 23 may not be exposed to the outside because it is covered by the first housing 21 and the second housing 22. Although not illustrated, in an intermediate state of the electronic device 2, the hinge housing 23 may be partially exposed between the first housing 21 and the second housing 22. The hinge housing 23 may be exposed more in the folded state of FIG. 3 than in the intermediate state.

According to some embodiments, the foldable housing 20 may refer to a structure (e.g., foldable housing structure or foldable housing assembly) that provides at least a portion of the front surface 20A, the rear surface 20B, the first side surface 20C, and the second side surface 20D. For example, the foldable housing 20 may include a first housing part, a second housing part, and a folding part connected to the first housing part and the second housing part. The folding part may indicate a portion more flexible than the first housing part and the second housing part and be bent in the folded state of the electronic device 2. The folding part may include, for example, a hinge assembly. For another example, the folding part may include a structure (e.g., multi-bar structure) in which a plurality of bars are arranged, but is not limited thereto, and be implemented in various other structures that may have bending characteristics while connecting the first housing part and the second housing part.

According to an embodiment, the electronic device 2 may include a display (hereinafter, sub-display) 310 adjacent to the second rear cover 221 to be positioned inside the second housing 22. A partial area of the second rear cover 221 may overlap the sub-display 310 and be substantially transparent. The electronic device 2 may output an image using the sub-display 310 instead of the flexible display 30 in the folded state of FIG. 3.

According to an embodiment, the second rear cover 221 may include a second curved area 221a bent from the fourth cover area ⓓ toward the second cover area ⓑ to be extended seamlessly. The second curved area 221a may be provided adjacent to a long edge of the second rear cover 221 substantially parallel to the folding axis A. The sub-display 310 may include a flexible display that may be disposed in a corresponding form.

According to an embodiment, the first rear cover 211 may include a first curved area 211a bent from the third cover area ⓒ toward the first cover area ⓐ to be extended seamlessly. The first curved area 211a may be provided adjacent to a long edge of the first rear cover 211 substantially parallel to the folding axis A. For example, in the unfolded state (see FIG. 2) or the folded state (see FIG. 3) of the electronic device 2, for aesthetic purposes, the first curved area 211a and the second curved area 221a may be positioned substantially symmetrically at opposite sides of each other. In some embodiments, the first curved area 211a or the second curved area 221a may be omitted.

According to an embodiment, the electronic device 2 may include an input module, a sound output module, a camera module, a sensor module, or a connecting terminal. In some embodiments, the electronic device 2 may omit at least one of the components or additionally include other components. The position or number of components included in the electronic device 2 is not limited to the illustrated example and may vary.

The input module may include, for example, a microphone positioned inside the electronic device 2, and a microphone hole 301 provided in the first side surface 20C to correspond to the microphone. The position or number of the input module including the microphone and the corresponding microphone hole 301 is not limited to the illustrated example and may vary. In some embodiments, the electronic device 2 may include a plurality of microphones capable of detecting a direction of a sound.

The input module may include, for example, key input devices 302. The key input devices 302 may be, for example, positioned in an opening (not illustrated) provided at the first side surface 20C. In some embodiments, the electronic device 2 may not include some or all of the key input devices 302, and a non-included key input device may be implemented into a soft key using the flexible display 30 or the sub-display 310. In some embodiments, the input module may include at least one sensor module.

The sound output module may include, for example, a speaker positioned inside the electronic device 2, and a speaker hole 303 provided in the second side surface 20D to correspond to the speaker. The position or number of the sound output module including the speaker and the speaker hole 303 corresponding thereto is not limited to the illustrated example and may vary. In some embodiments, the microphone hole 301 and the speaker hole 303 may be implemented into one hole. In some embodiments, a piezo speaker in which the speaker hole 303 is omitted may be implemented. The sound output module may include, for example, a receiver for a call positioned inside the electronic device 2, and a receiver hole (not illustrated) provided in the fourth cover area ⓓ to correspond to the receiver for the call.

The camera module may include, for example, a first camera module (or front camera module) 305 positioned to correspond to the fourth cover area ⓓ or a plurality of second camera modules (or rear camera modules) 306 positioned to correspond to the third cover area ⓒ. The first camera module 305 and/or the plurality of second camera modules 306 may include one or a plurality of lenses, an image sensor, and/or an image signal processor. The position or number of the first camera module 305 or the plurality of second camera modules 306 is not limited to the illustrated example and may vary.

According to an embodiment, the sub-display 310 may include an opening aligned with the first camera module 305. External light may pass through the second rear cover 221 and the opening of the sub-display 310 to reach the first camera module 305. In some embodiments, the opening of the sub-display 310 may be provided in a notch form according to a position of the first camera module 305. In some embodiments, the first camera module 305 may be located at the rear surface of the sub-display 310, or below or beneath the sub-display 310, and perform a related function (e.g., taking an image) without visually distinguishing (or exposing) a position thereof. For example, the first camera module 305 may include a hidden display rear camera (e.g., under display camera (UDC)). In some embodiments, the first camera module 305 may be positioned to align with the recess provided at the rear surface of the sub-display 310. The first camera module 305 may be disposed to overlap at least a portion of the screen, and acquire an image of an external subject without being visually exposed to the outside. In this case, a partial area of the sub-display 310 overlapped at least partially with the first camera module 305 may include a pixel structure and/or a wiring structure different from other areas. For example, a partial area of the sub-display 310 overlapped at least partially with the first camera module 305 may have different pixel density compared to other areas. A pixel structure and/or a wiring structure provided in a partial area of the sub-display 310 that is at least partially overlapped with the first camera module 305 may reduce light loss between the outside and the first camera module 305. In some embodiments, pixels may not be disposed in a partial area of the sub-display 310 that at least partially overlaps with the first camera module 305.

According to an embodiment, the plurality of second camera modules 306 may have different attributes (e.g., angle of view) or functions and include, for example, dual cameras or triple cameras. The plurality of second camera modules 306 may include a plurality of camera modules including lenses having different angles of view, and the electronic device 2 may control to change an angle of view of the camera module performed by itself based on the user's selection. The plurality of second camera modules 306 may include at least one of a wide-angle camera, a telephoto camera, a color camera, a monochrome camera, or an infrared (IR) camera (e.g., time of flight (TOF) camera, structured light camera). In some embodiments, the IR camera may operate as at least part of the sensor module. The electronic device 2 may include a flash 307 as a light source for the plurality of second camera modules 306. The flash 307 may include, for example, a light emitting diode or a xenon lamp.

The sensor module may generate an electrical signal or data value corresponding to an internal operating state of the electronic device 2 or an external environmental state. The sensor module may include, for example, at least one of a proximity sensor, a gesture sensor, a gyro sensor, a barometric pressure sensor, a magnetic sensor, an acceleration sensor, a grip sensor, a color sensor, an infrared (IR) sensor, a biometric sensor (e.g., fingerprint sensor, heart rate monitor (HRM) sensor), a temperature sensor, a humidity sensor, or an illuminance sensor.

According to an embodiment, the sensor module may include an optical sensor 308 positioned inside the electronic device 2 corresponding to the fourth cover area ⓓ. The optical sensor 308 may include, for example, a proximity sensor or an illuminance sensor. The optical sensor 308 may be aligned with the opening provided in the sub-display 310. External light may pass through the second rear cover 221 and the opening of the sub-display 310 to reach the optical sensor 308. In some embodiments, the optical sensor 308 may be positioned at the rear surface of the sub-display 310 or below or beneath the sub-display 310, and perform related functions without being visually distinguished (or exposed) a position of the optical sensor 308. In some embodiments, the optical sensor 308 may be positioned to align with the recess provided at the rear surface of the sub-display 310. The optical sensor 308 may be disposed to overlap at least a portion of the screen, and perform a sensing function without being exposed to the outside. In this case, a partial area of the sub-display 310 at least partially overlapped with the optical sensor 308 may include a pixel structure and/or a wiring structure different from other areas. For example, a partial area of the sub-display 310 at least partially overlapped with the optical sensor 308 may have different pixel density compared to other areas. In some embodiments, the sensor module may include a fingerprint sensor (not illustrated) positioned below the sub-display 310. The fingerprint sensor may be implemented using a capacitive method, an optical method, or an ultrasonic method. A pixel structure and/or a wiring structure provided in a partial area of the sub-display 310 that is at least partially overlapped with the sensor module may reduce a loss when various types of signals (e.g., light or ultrasound) related to the sensor module pass between the outside and the sensor module. In some embodiments, a plurality of pixels may not be disposed in a partial area of the sub-display 310 that at least partially overlaps the sensor module.

The connection terminal may include, for example, a connector (e.g., USB connector) positioned inside the electronic device 2. The electronic device 2 may include a connector hole 309 provided in the first side surface 20C to correspond to the connector. The electronic device 2 may transmit and/or receive power and/or data to and from an external electronic device electrically connected to the connector through the connector hole 309. The position or number of connectors and the corresponding connector hole 309 is not limited to the illustrated example and may vary.

According to some embodiments, the electronic device 2 may include a removable pen input device (e.g., electronic pen, digital pen, or stylus pen) (not illustrated). For example, the pen input device may be detached from or attached to the hinge housing 23. The hinge housing 23 may include a recess, and the pen input device may be inserted into the recess. The pen input device may be, for example, detached from or attached to the recess of the hinge housing 23 exposed to the outside in a folded state (see FIG. 3) or in an intermediate state of the electronic device 2. In some embodiments, the electronic device 2 may be implemented such that the pen input device may be inserted into an internal space of the first housing 21 or the second housing 22.

The electronic device 2 may further include various components according to a provision form thereof. Although it is not possible to describe all of these components due to various variations according to the convergence trend of the electronic device 2, components equivalent to the above-mentioned components may be further included in the electronic device 2. In various embodiments, specific components may be excluded from the above components or replaced with other components according to a provision form thereof. It is to be understood at the disclosure envisages and includes all combinations of the above-mentioned features and/or embodiments. That is, every combination of the above-described features should be considered as included in the disclosure as a specific example.

Figure 4:
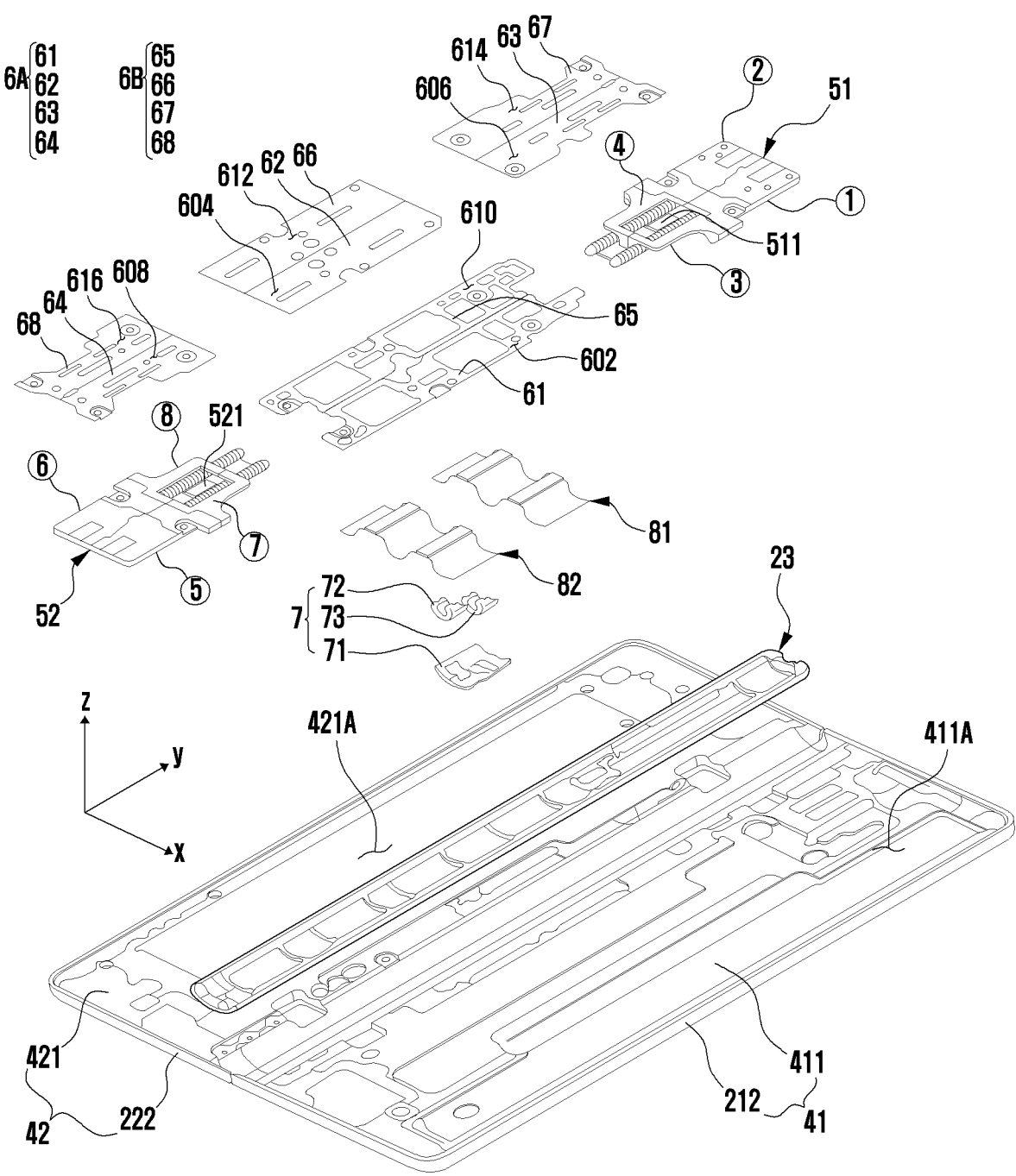
FIG. 4 is a partial exploded perspective view illustrating an electronic device in an unfolded state according to an embodiment of the disclosure.

FIG. 4 is a partial exploded perspective view of an electronic device 2 in an unfolded state according to an embodiment of the disclosure. It is to be understood as the disclosure envisages and includes all combinations of features and/or embodiments disclosed in relation to FIG. 4. That is, every combination of the features described below in relation to FIG. 4 should be considered as included in the disclosure as a specific example.

With reference to FIG. 4, the electronic device 2 may include a first front case 41, a second front case 42, a first hinge assembly 51, a second hinge assembly 52, a hinge housing 23, a first plate assembly 6A, a second plate assembly 6B, a guide rail assembly 7, a first electrical path 81, and/or a second electrical path 82.

According to an embodiment, the first front case 41 may include a first side member 212 and a first support structure 411. The first support structure 411 may be positioned in an internal space of the first housing 21 (see FIG. 2) and be connected to the first side member 212 or be integrally formed with the first side member 212. The second front case 42 may include a second side member 222 and a second support structure 421. The second support structure 421 may be positioned in an internal space of the second housing 22 (see FIG. 2) and be connected to the second side member 222 or be integrally formed with the second side member 222. The first support structure 411 and the second support structure 421 may be positioned in the electronic device 2 to withstand a load, thereby contributing to durability or stiffness (e.g., torsional stiffness) of the electronic device 2. The first support structure 411 and/or the second support structure 421 may be made of, for example, a metal material and/or a non-metallic material (e.g., polymer). Electronic components, or various members related to electronic components, may be disposed in the first front case 41 or the first support structure 411 or may be supported by the first front case 41 or the first support structure 411. The first support structure 411 may include, for example, a first support area 411A facing the first cover area ⓐ (see FIG. 2) of the front surface 20A, and a third support area (not illustrated) facing the third cover area C (see FIG. 2) of the rear surface 20B. A portion of the flexible display 30 (see FIG. 2) corresponding to the first housing 21 may be disposed in the first support area 411A of the first support structure 411 or may be supported by the first support area 411A. Although not illustrated, a first PCB (or first substrate assembly) positioned in an internal space of the first housing 21 may be disposed in a third support area of the first support structure 411. Electronic components, or various members related to electronic components, may be disposed in the second front case 42 or the second support structure 421 or may be supported by the second front case 42 or the second support structure 421. The second support structure 421 may include, for example, a second support area 421A facing the second cover area ⓑ (see FIG. 2) of the front surface 20A, and a fourth support area (not illustrated) facing the fourth cover area ⓓ (see FIG. 2) of the rear surface 20B. A portion of the flexible display 30 corresponding to the second housing 22 may be disposed in the second support area 421A of the second support structure 421 or may be supported by the second support area 421A. Although not illustrated, a second PCB (or second substrate assembly) positioned in an internal space of the second housing 22 may be disposed in a fourth support area of the second support structure 421. The first front case 41 or the first support structure 411 may be included in the first housing 21 of the foldable housing 20 (see FIG. 2) so as to withstand a load, thereby contributing to the durability or rigidity of the electronic device 2. The second front case 42 or the second support structure 421 may be included in the second housing 22 of the foldable housing 20 so as to withstand a load, thereby contributing to the durability or rigidity of the electronic device 2. In some embodiments, the first front case 41 or the first support structure 411 may be referred to as various other terms, such as a "first frame," a "first frame structure," or a "first framework." In some embodiments, the second front case 42 or the second support structure 421 may be referred to as various other terms, such as a 'second frame', a 'second frame structure', or a 'second framework'. The first support structure 411 is an internal structure positioned in an internal space of the electronic device 2 corresponding to the first housing 21, and in some embodiments, the first support structure 411 may be referred to as various other terms, such as a 'first bracket' or a 'first support member'. The second support structure 421 is an internal structure positioned in an internal space of the electronic device 2 corresponding to the second housing 22, and in some embodiments, the second support structure 421 may be referred to as various other terms, such as a 'second bracket' or a 'second support member'. In some embodiments, the first support structure 411 may be interpreted as part of the first housing 21, and the second support structure 421 may be interpreted as part of the second housing 22.

According to an embodiment, the first hinge assembly 51 and the second hinge assembly 52 may connect the first front case 41 and the second front case 42. The first front case 41 and the second front case 42 may be mutually rotatable based on the axis of rotation (e.g., the folding axis A) by the first hinge assembly 51 and the second hinge assembly 52. The first hinge assembly 51 may include, for example, a first part ① coupled to the first support structure 411, a second part ② coupled to the second support structure 421, a third part ③ connected to the first part ①, a fourth part ④ connected to the second part ②, and a first actuator 511 for connecting the third part ③ and the fourth part ④. The first part ① may be, for example, disposed in or coupled to the first support area 411A and be in the form of a plate overlapped with the first support area 411A, when viewed from above the first support area 411A of the first support structure 411. In an embodiment, the first part ① may be coupled to the first support structure 411 using screws. The second part ② may be, for example, disposed in or coupled to the second support area 421A and be in the form of a plate overlapped with the second support area 421A, when viewed from above the second support area 421A of the second support structure 421. In an embodiment, the second part ② may be coupled to the second support structure 421 using screws. The third part ③ may be, for example, in the form of a plate overlapped with the first support area 411A, when viewed from above the first support area 411A of the first support structure 411. The fourth part ④ may be, for example, in the form of a plate overlapped with the second support area 421A, when viewed from above the second support area 421A of the second support structure 421. The first actuator 511 may connect the third part ③ and the fourth part ④ so that the third part ③ and the fourth part ④ may be rotated with each other. The first actuator 511 may provide, for example, a driving force so that the third part ③ and the fourth part ④ are mutually rotated. The first actuator 511 may, for example, enable the third part ③ and the fourth part ④ to be rotated at the same angle in opposite directions to each other. The first actuator 511 may enable, for example, the third part ③ and the fourth part ④ to be maintained in at least one designated angle. Because the first part ① connected to the third part ③ is connected to the first support structure 411, the first front case 41 may be moved together with the first part ① and the third part ③. Because the second part ② connected to the fourth part ④ is connected to the second support structure 421, the second front case 42 may be moved together with the second part ② and the fourth part ④. Both the first part ① and the second part ② are referred to as a 'first rotator', and both the third part ③ and the fourth part ④ are referred to as a 'first hinge arm'. In some embodiments, the first part ① and the third part ③ may be integrally formed, and the second part ② and the fourth part ④ may be integrally formed. The second hinge assembly 52 may be implemented substantially the same as or similar to the first hinge assembly 51. In an embodiment, the first hinge assembly 51 and the second hinge assembly 52 may be substantially symmetrically disposed based on the center between the first hinge assembly 51 and the second hinge assembly 52. The center between the first hinge assembly 51 and the second hinge assembly 52 may indicate, for example, a point on the folding axis A substantially spaced apart from the first hinge assembly 51 and the second hinge assembly 52. The second hinge assembly 52 may include, for example, a fifth part ⑤ disposed in (or coupled to) the first support area 411A of the first support structure 411, a sixth part ⑥ disposed in (or coupled to) the second support area 421A of the second support structure 421, a seventh part ⑦ connected to the fifth part ⑤, an eighth part ⑧ connected to the sixth part ⑥, and a second actuator 521 for connecting the seventh part ⑦ and the eighth part ⑧. The first hinge assembly 51 and the second hinge assembly 52 may be disposed apart in a direction of the folding axis A (e.g., y-axis direction). A first hinge arm including the third part ③ and the fourth part ④ in the first hinge assembly 51 and a second hinge arm including the seventh part ⑦ and the eighth part ⑧ in the second hinge assembly 52 may be positioned between a first rotator including the first part ① and the second part ② in the first hinge assembly 51 and a second rotator including the fifth part ⑤ and the sixth part ⑥ in the second hinge assembly 52. In the unfolded state (see FIG. 2) of the electronic device 2, the first part ① and the second part ② of the first hinge assembly 51, the third part ③ and the fourth part ④ of the first hinge assembly 51, the fifth part ⑤ and the sixth part ⑥ of the second hinge assembly 52, and the seventh part ⑦ and the eighth part ⑧ of the second hinge assembly 52 may form an angle of about 180 degrees. In the folded state (see FIG. 3) of the electronic device 2, the first part ① and the second part ② of the first hinge assembly 51, the third part ③ and the fourth part ④ of the first hinge assembly 51, the fifth part ⑤ and the sixth part ⑥ of the second hinge assembly 52, and the seventh part ⑦ and the eighth part ⑧ of the second hinge assembly 52 may be spaced apart and overlapped to form an angle of about 0 degrees to about 10 degrees or may be positioned substantially in parallel.

According to an embodiment, the first hinge assembly 51 and the second hinge assembly 52 may be coupled to the hinge housing 23 using a screw. The first front case 41 and the second front case 42 may be connected to the hinge housing 23 using the first hinge assembly 51 and the second hinge assembly 52.

According to an embodiment, the first plate assembly 6A may be in the form of a plurality of plates which are coupled, and the plurality of plates can be coupled to the first support structure 411 using a screw. The second plate assembly 6B may be in the form of a plurality of plates which are coupled, and the plurality of plates can be coupled to the second support structure 421 using a screw. The first plate assembly 6A and the second plate assembly 6B may stably support a bendable area corresponding to the folding part between the first housing 21 (see FIG. 2) and the second housing 22 (see FIG. 2) in the display assembly including the flexible display 30. In an embodiment, the first plate assembly 6A and the second plate assembly 6B each comprise a plurality of coupled metal plates, and together may contribute to securing improved device yields by reducing defects as compared to a comparative example using an integral metal plate. In the comparative example, in contrast to the first plate assembly 6A or the second plate assembly 6B including a plurality of metal plates according to an embodiment of the disclosure, an integral metal plate supports a bendable area of the display assembly including the flexible display 30. Unfortunately, when processing (e.g., barrel grinding) such as removing foreign substances or smoothing a surface using ceramic grains, the integral metal plate according to the comparative example may cause bending deformation due to its relatively large, continuous shape (e.g., a large area or a large length as compared to each of the plurality of metal plates included in the plate assembly according to the embodiment of the disclosure). In the unfolded state (see FIG. 2) of the electronic device 2, the first plate assembly 6A and the second plate assembly 6B may form an angle of about 180 degrees. The first plate assembly 6A may support one side area based on the folding axis A (see FIG. 2) in the bendable area of the display assembly corresponding to the folding cover area F (see FIG. 2) in the unfolded state of the electronic device 2, and the second plate assembly 6B may support the other side area based on the folding axis in the bending area of the display assembly. In the folded state (see FIG. 3) of the electronic device 2, the first plate assembly 6A and the second plate assembly 6B may be spaced apart and overlapped to form an angle of about 0 degrees to about 10 degrees or may be positioned substantially in parallel.

According to an embodiment, the first plate assembly 6A may include a first plate 61, a second plate 62, a third plate 63, and/or a fourth plate 64. The first plate 61 may be positioned between the first hinge assembly 51 and the second hinge assembly 52. When viewed from above the first support area 411A of the first support structure 411, the first plate 61 may not overlap the first hinge assembly 51 and the second hinge assembly 52. The first plate 61 may include a first surface (not illustrated) facing the first support area 411A, and a second surface 602 facing in a direction opposite to that of the first surface. The second plate 62 may overlap the first plate 61. The second plate 62 may include, for example, a third surface (not illustrated) facing the second surface 602 of the first plate 61, and a fourth surface 604 facing in a direction opposite to that of the third surface. A portion of the third plate 63 may overlap the first plate 61, and another portion of the third plate 63 may overlap the first hinge assembly 51. The third plate 63 may include a fifth surface (not illustrated), and a sixth surface 606 facing in a direction opposite to that of the fifth surface. A partial area of the fifth surface may face the second surface 602 of the first plate 61, and another partial area of the fifth surface may face the first hinge assembly 51. A portion of the fourth plate 64 may overlap the first plate 61, and another portion of the fourth plate 64 may overlap the second hinge assembly 52. The fourth plate 64 may include a seventh surface (not illustrated), and an eighth surface 608 facing in a direction opposite to that of the seventh surface. A partial area of the seventh surface may face the second surface 602 of the first plate 61, and another partial area of the seventh surface may face the second hinge assembly 52. When viewed from above the second surface 602 of the first plate 61 (e.g., when viewed in the −z axis direction), the second plate 62 may be positioned between the third plate 63 and the fourth plate 64, and the third plate 63, the second plate 62, and the fourth plate 64 may be arranged in a direction (e.g., y-axis direction) of the folding axis A (see FIG. 2).

According to an embodiment, the second plate assembly 6B may be provided in a manner substantially the same as or similar to the first plate assembly 6A. The second plate assembly 6B may include a fifth plate 65 corresponding to the first plate 61, a sixth plate 66 corresponding to the second plate 62, a seventh plate 67 corresponding to the third plate 63, and/or an eighth plate 68 corresponding to the fourth plate 64. The fifth plate 65 may be positioned between the first hinge assembly 51 and the second hinge assembly 52. When viewed from above the second support area 421A of the second support structure 421, the fifth plate 65 may not overlap the first hinge assembly 51 and the second hinge assembly 52. The fifth plate 65 may include a ninth surface (not illustrated) facing the second support area 421A, and a tenth surface 610 facing in a direction opposite to that of the ninth surface. The sixth plate 66 may overlap the fifth plate 65. The sixth plate 66 may include, for example, an eleventh surface (not illustrated) facing the tenth surface 610 of the fifth plate 65, and a twelfth surface 612 facing in a direction opposite to that of the eleventh surface. A portion of the seventh plate 67 may overlap the fifth plate 65, and another portion of the seventh plate 67 may overlap the first hinge assembly 51. The seventh plate 67 may include a thirteenth surface (not illustrated), and a fourteenth surface 614 facing in a direction opposite to that of the thirteenth surface. A partial area of the thirteenth surface may face the tenth surface 610 of the fifth plate 65, and another partial area of the thirteenth surface may face the first hinge assembly 51. A portion of the eighth plate 68 may overlap the fifth plate 65, and another portion of the eighth plate 68 may overlap the second hinge assembly 52. The eighth plate 68 may include a fifteenth surface (not illustrated), and a sixteenth surface 616 facing in a direction opposite to that of the fifteenth surface. A partial area of the fifteenth surface may face the tenth surface 610 of the fifth plate 65, and another partial area of the fifteenth surface may face the second hinge assembly 52. When viewed from above the tenth surface 610 of the fifth plate 65 (e.g., when viewed in the −z axis direction), the sixth plate 66 may be positioned between the seventh plate 67 and the eighth plate 68, and the seventh plate 67, the sixth plate 66, and the eighth plate 68 may be arranged in a direction (e.g., y-axis direction) of the folding axis A (see FIG. 2).

According to an embodiment, the first plate 61 and the second plate 62 may be coupled using welding. In some embodiments, the first plate 61 and the second plate 62 may be coupled using bonding techniques including bonding with an adhesive material. In some embodiments, the first plate 61 and the second plate 62 may be coupled using a screw.

According to an embodiment, the third plate 63 may be coupled to the first plate 61 and the first support structure 411 using a screw. The third plate 63 may include a screw hole and the first plate 61 may include a screw hole aligned with the screw hole of the third plate 63, to correspond to the screw, and the first support structure 411 may include a screw fastening part aligned with the screw hole of the first plate 61. The screw fastening part may be, for example, a boss including female threads corresponding to male threads of the screw.

According to an embodiment, the third plate 63 may be coupled to the first hinge assembly 51 and the first support structure 411 using a screw. For example, to correspond to a screw, the third plate 63 may include a screw hole, the first part ①  of the first hinge assembly 51 may include a screw hole aligned with the screw hole of the third plate 63, and the first support structure 411 may include a screw fastening part (e.g., a boss including a female screw) aligned with the screw hole of the first part ① of the first hinge assembly 51.

According to an embodiment, the fourth plate 64 may be coupled to the first plate 61 and the first support structure 411 using a screw. To correspond to the screw, the fourth plate 64 may include a screw hole, the first plate 61 may include a screw hole aligned with the screw hole of the fourth plate 64, and the first support structure 411 may include a screw fastening part (e.g., a boss including a female screw) aligned with the screw hole of the first plate 61.

According to an embodiment, the fourth plate 64 may be coupled to the second hinge assembly 52 and the first support structure 411 using a screw. For example, to correspond to a screw, the fourth plate 64 may include a screw hole, the fifth part ⑤ of the second hinge assembly 52 may include a screw hole aligned with the screw hole of the fourth plate 64, and the first support structure 411 may include a screw fastening part (e.g., a boss including a female screw) aligned with the screw hole of the fifth part ⑤ of the second hinge assembly 52.

According to an embodiment, the fifth plate 65 and the sixth plate 66 may be coupled using welding. In some embodiments, the fifth plate 65 and the sixth plate 66 may be coupled using bonding techniques including bonding with an adhesive material. In some embodiments, the fifth plate 65 and the sixth plate 66 may be coupled using a screw.

According to an embodiment, the seventh plate 67 may be coupled to the fifth plate 65 and the second support structure 421 using a screw. To correspond to the screw, the seventh plate 67 may include a screw hole, the fifth plate 65 may include a screw hole aligned with the screw hole of the seventh plate 67, and the second support structure 421 may include a screw fastening part (e.g., a boss including a female screw) aligned with the screw hole of the fifth plate 65.

According to an embodiment, the seventh plate 67 may be coupled to the first hinge assembly 51 and the second support structure 421 using a screw. For example, to correspond to a screw, the seventh plate 67 may include a screw hole, the second part ② of the first hinge assembly 51 may include a screw hole aligned with the screw hole of the seventh plate 67, and the second support structure 421 may include a screw fastening part (e.g., a boss including a female screw) aligned with the screw hole of the second part ② of the first hinge assembly 51.

According to an embodiment, the eighth plate 68 may be coupled to the fifth plate 65 and the second support structure 421 using a screw. To correspond to the screw, the eighth plate 68 may include a screw hole, the fifth plate 65 may include a screw hole aligned with the screw hole of the eighth plate 68, and the second support structure 421 may include a screw fastening part (e.g., a boss including a female screw) aligned with the screw hole of the fifth plate 65.

According to an embodiment, the eighth plate 68 may be coupled to the second hinge assembly 52 and the second support structure 421 using a screw. For example, to correspond to the screw, the eighth plate 68 includes a screw hole, the sixth part ⑥ of the second hinge assembly 52 may include a screw hole aligned with the screw hole of the eighth plate 68, and the second support structure 421 may include a screw fastening part (e.g., a boss including a female screw) aligned with the screw hole of the sixth part ⑥ of the second hinge assembly 52.

According to an embodiment, the first plate 61, the second plate 62, the third plate 63, and the fourth plate 64 may be metal plates. The first plate 61, the second plate 62, the third plate 63, or the fourth plate 64 may be made of, for example, metal materials such as aluminum, stainless steel, magnesium, titanium, amorphous alloys. The first plate 61, the second plate 62, the third plate 63, or the fourth plate 64 may include a metal-ceramic composite material (e.g., cermet), stainless steel, magnesium, magnesium alloys, aluminum, aluminum alloys, zinc alloys, copper alloys, or combinations thereof. In some embodiments, at least one of the first plate 61, the second plate 62, the third plate 63, or the fourth plate 64 may include a non-metallic material capable of securing rigidity such as engineering plastic, thermoplastics such as polyoxymethylene-based plastics, fluoropolymers such as polytetrafluoroethylene, polyethylene, polyurethane, phenolic plastics, and acrylonitrile butadiene styrene-based plastics, although other materials are within the contemplated scope of the disclosure. In some embodiments, the first plate 61, the second plate 62, the third plate 63, and the fourth plate 64 are made of a same material. In some embodiments, at least one of the first plate 61, the second plate 62, the third plate 63, and the fourth plate 64 is made of a different material.

According to an embodiment, the fifth plate 65, the sixth plate 66, the seventh plate 67, and the eighth plate 68 may be metal plates. The fifth plate 65, the sixth plate 66, the seventh plate 67, or the eighth plate 68 may be made of, for example, metallic materials such as aluminum, stainless steel, magnesium, titanium, amorphous alloys. The fifth plate 65, the sixth plate 66, the seventh plate 67, or the eighth 68 may include a metal-ceramic composite material (e.g., cermet), stainless steel, magnesium, magnesium alloys, aluminum, aluminum alloys, zinc alloys, copper alloys, or combinations thereof. In some embodiments, at least one of the fifth plate 65, the sixth plate 66, the seventh plate 67, or the eighth plate 68 may include a non-metallic material capable of securing rigidity, such as engineering plastics, thermoplastics such as polyoxymethylene-based plastics, fluoropolymers such as polytetrafluoroethylene, polyethylene, polyurethane, phenolic plastics, and acrylonitrile butadiene styrene-based plastics, although other materials are within the contemplated scope of the disclosure. In some embodiments, the fifth plate 65, the sixth plate 66, the seventh plate 67, and the eighth plate 68 are made of a same material. In some embodiments, at least one of the fifth plate 65, the sixth plate 66, the seventh plate 67, and the eighth plate 68 is made of a different material.

According to an embodiment, the guide rail assembly 7 may be disposed in or coupled to the hinge housing 23. The hinge housing 23 may include a recess provided in the other surface opposite to one surface exposed to the outside in the folded state (see FIG. 3) of the electronic device 2, and the guide rail assembly 7 may be positioned in a recess of the hinge housing 23. The guide rail assembly 7 may be positioned in a space provided by the hinge housing 23, the first plate assembly 6A, and the second plate assembly 6B. The guide rail assembly 7 may include a guide rail structure 71, a first slider structure 72, and/or a second slider structure 73. The first slider structure 72 and the second slider structure 73 may be slidably disposed in the guide rail structure 71. The guide rail structure 71 may be coupled to the hinge housing 23 using a screw. The first slider structure 72 may be coupled to the first plate 61 of the first plate assembly 6A using a screw and be rotationally moveable together with the first plate assembly 6A coupled to the first front case 41. The second slider structure 73 may be coupled to the fifth plate 65 of the second plate assembly 6B using a screw and be rotationally moveable together with the second plate assembly 6B coupled to the second front case 42. The guide rail structure 71 may include a first guide rail and a second guide rail. The first guide rail may be a space provided along a path corresponding to a rotational motion of the first front case 41 coupled with the first plate assembly 6A coupled with the first slider structure 72. The second guide rail may be a space provided along a path corresponding to a rotational motion of the second front case 42 coupled with the second plate assembly 6B coupled with the second slider structure 73. The first slider structure 72 may include a first slider inserted into the first guide rail of the guide rail structure 71 and movable by being guided to the first guide rail. The second slider structure 73 may include a second slider inserted into the second guide rail of the guide rail structure 71 and movable by being guided to the second guide rail. The guide rail assembly 7 may be positioned between the first hinge assembly 51 and the second hinge assembly 52. For example, the guide rail assembly 7 may be positioned to correspond to the center between the first hinge assembly 51 and the second hinge assembly 52 (e.g., a point on the folding axis A substantially separated from the first hinge assembly 51 and the second hinge assembly 52). In an embodiment, the guide rail assembly 7 may be positioned at substantially the same separation distance from the first hinge assembly 51 and the second hinge assembly 52. The guide rail assembly 7 may reduce a lifting phenomenon of the first plate assembly 6A and the second plate assembly 6B.

According to an embodiment, the first electrical path 81 and the second electrical path 82 may electrically connect the first electrical element housed in the first housing 21 (see FIG. 2) and the second electrical element received in the second housing 22 (see FIG. 2). The first electrical path 81 and/or the second electrical path 82 may electrically connect, for example, the first PCB housed in the first housing 21 and the second PCB housed in the second housing 22. Signals (e.g., commands or data) between the first PCB and the second PCB may be transmitted through the first electrical path 81 and/or the second electrical path 82. The first electrical path 81 and the second electrical path 82 may include a flexible printed circuit board (FPCB) or a rigid flexible printed circuit board (RFPCB). The first electrical path 81 and the second electrical path 82 may be coupled to the first plate assembly 6A and the second plate assembly 6B and be supported by the first plate assembly 6A and the second plate assembly 6B. The first electrical path 81 and the second electrical path 82 may be extended between the hinge housing 23 and the first plate assembly 6A, and between the hinge housing 23 and the second plate assembly 6B. The first electrical path 81 may include a first area coupled to the first plate assembly 6A, a second area coupled to the second plate assembly 6B, and a third area connecting the first and second areas. The third area may be positioned in the recess of the hinge housing 23 and may be bent and disposed according to a state change (e.g., the switch between the unfolded state of FIG. 2 and the folded state of FIG. 3) of the electronic device 2. The first electrical path 81 may include a fourth area extended from the first area to be electrically connected to the first electrical element housed in the first housing 21. The fourth area may include, for example, a first connector for an electrical connection with the first electrical element. The first electrical path 81 may include a fifth area extended from the second area to be electrically connected to the second electrical element housed in the second housing 22. The fifth area may include, for example, a second connector for an electrical connection with a second electrical element. The second electrical path 82 may be provided to be substantially the same as or similar to the first electrical path 81. When viewed from above the first support area 411A of the first support structure 411 or the second support area 421A of the second support structure 421, the guide rail assembly 7 may be positioned between the first electrical path 81 and the second electrical path 82.

Figure 5:
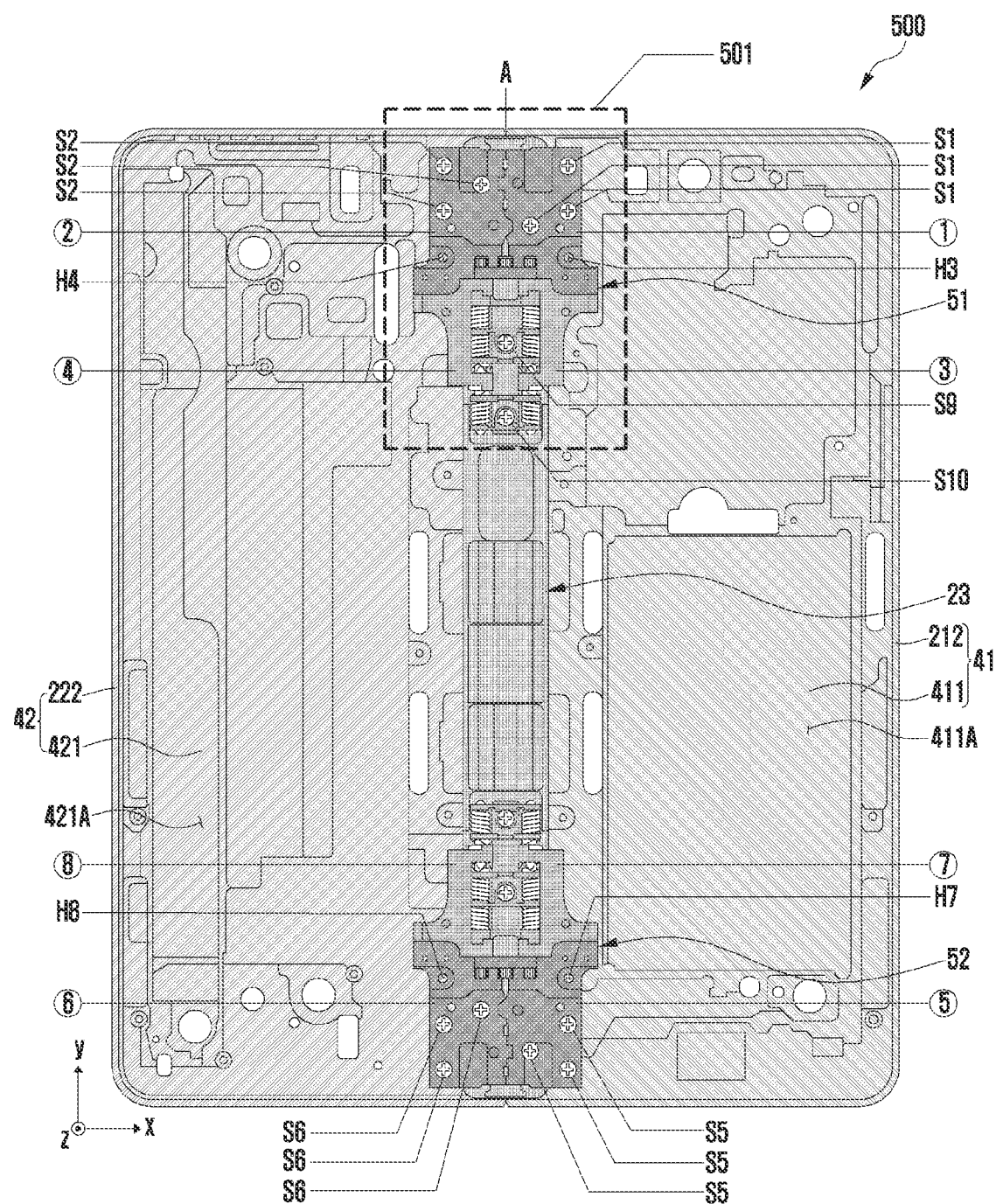
FIG. 5 is a diagram illustrating a first assembly in an unfolded state in which a first front case, a second front case, a first hinge assembly, a second hinge assembly, and a hinge housing are coupled according to an embodiment of the disclosure.
Figure 6:
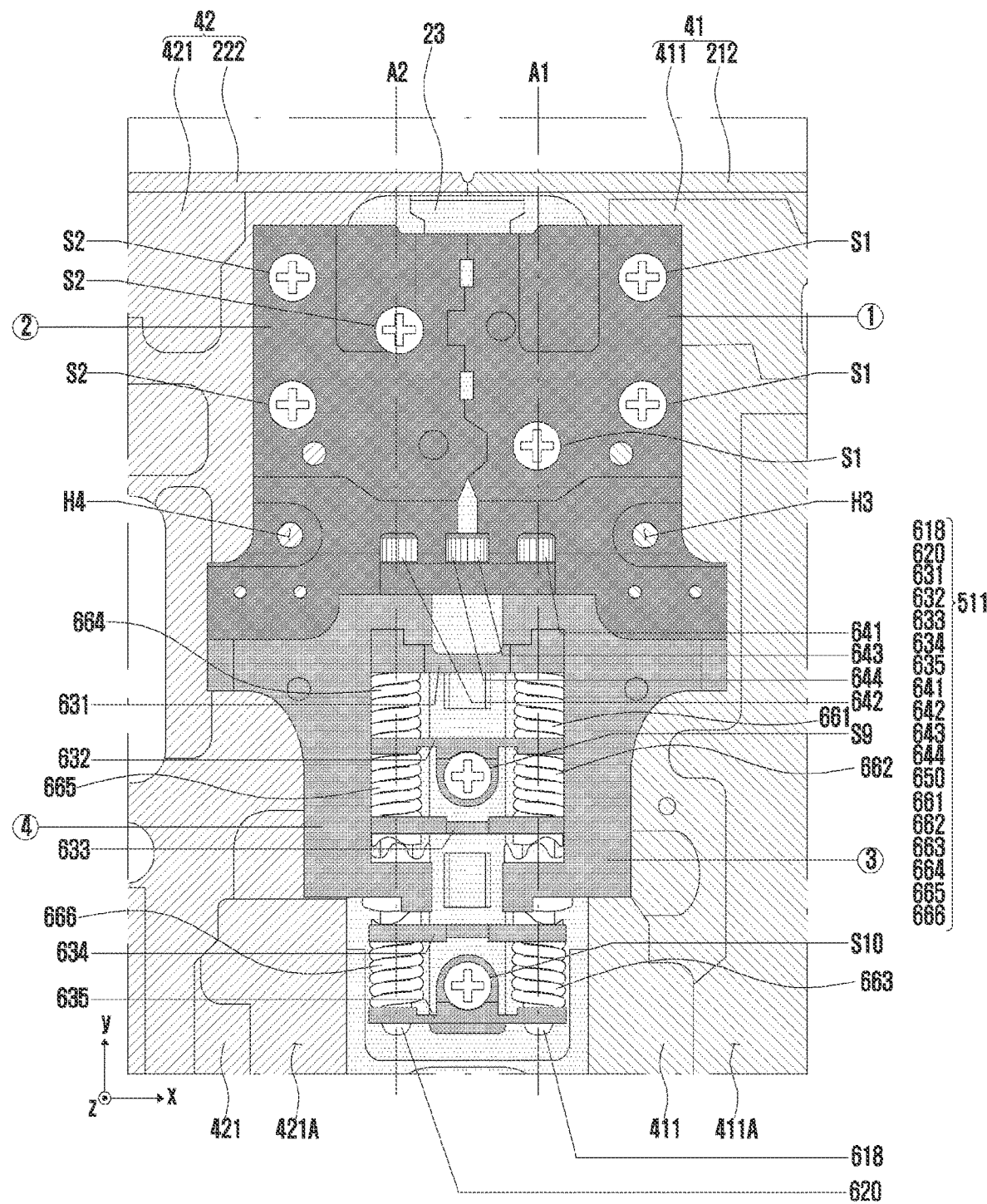
FIG. 6 is an enlarged view illustrating a portion indicated by reference numeral '501' in FIG. 5 according to an embodiment of the disclosure.
Figure 7:
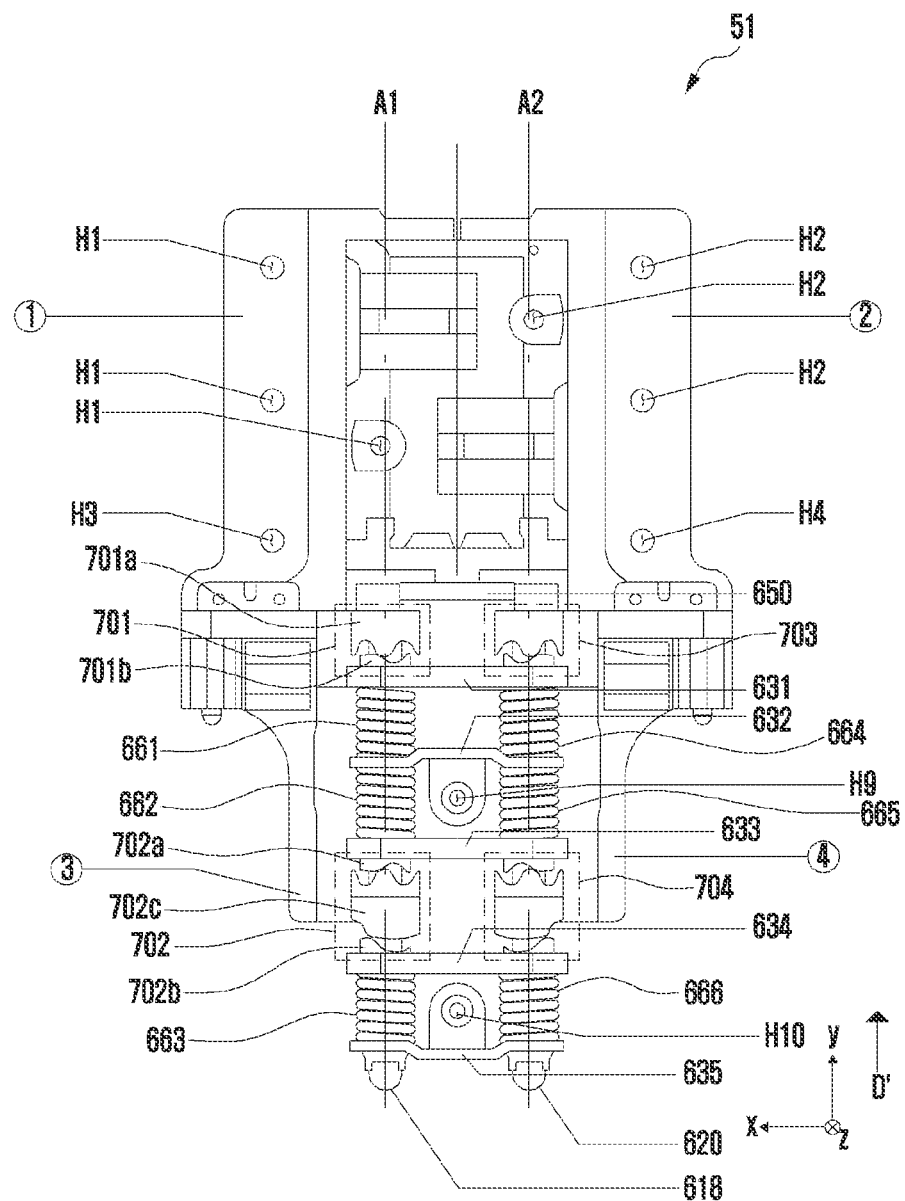
FIG. 7 is a diagram illustrating a first hinge assembly included in an electronic device in an unfolded state according to an embodiment of the disclosure.

FIG. 5 is a diagram illustrating a first assembly 500 in an unfolded state in which a first front case 41, a second front case 42, a first hinge assembly 51, a second hinge assembly 52, and a hinge housing 23 are coupled according to an embodiment of the disclosure. FIG. 6 is an enlarged view illustrating, for example, a portion indicated by reference numeral '501' in FIG. 5 according to an embodiment of the disclosure. FIG. 7 is a diagram illustrating a first hinge assembly 51 included in an electronic device 2 in an unfolded state according to an embodiment of the disclosure. It is to be understood as the disclosure envisages and includes all combinations of features and/or embodiments disclosed in relation to FIGS. 5, 6, and 7. That is, every combination of the features described below in relation to FIGS. 5, 6, and 7 should be considered as included in the disclosure as a specific example.

According to an embodiment, the first hinge assembly 51 may connect the first front case 41 and the second front case 42. The first hinge assembly 51 may include a first part ①, a second part ②, a third part ③, a fourth part ④, and a first actuator 511. The first part ① may be coupled to the first support structure 411 of the first front case 41 using a plurality of first screws S1. The first part ① may include a plurality of first screw holes H1 to correspond to a plurality of first screws S1, and the first support structure 411 may include a plurality of first screw fastening parts (e.g., first bosses including female screws) aligned with a plurality of first screw holes H1. The second part ② may be coupled to the second support structure 421 of the second front case 42 using a plurality of second screws S2. The second part ② may include a plurality of second screw holes H2 to correspond to a plurality of second screws S2, and the second support structure 421 may include a plurality of second screw fastening parts (e.g., second bosses including female screws) aligned with the plurality of second screw holes H2.

According to an embodiment, the first part ① of the first hinge assembly 51 may include a third screw hole H3, and the first support structure 411 may include a third screw fastening part (e.g., a third boss including a female screw) aligned with the third screw hole H3. The third screw hole H3 and the third screw fastening part may be used for screwing the third plate 63 (see FIG. 4) and the first part ① with the first support structure 411. The second part ② of the first hinge assembly 51 may include a fourth screw hole H4, and the second support structure 421 may include a fourth screw fastening part (e.g., a fourth boss including a female screw) aligned with the fourth screw hole H4. The fourth screw hole H4 and the fourth screw fastening part may be used for screwing the seventh plate 67 (see FIG. 4) and the second part ② with the second support structure 421.

According to an embodiment, the second hinge assembly 52 may connect the first front case 41 and the second front case 42. The fifth part ⑤ of the second hinge assembly 52 may be coupled to the first support structure 411 using a plurality of fifth screws S5. The fifth part) may include a plurality of fifth screw holes to correspond to a plurality of fifth screws S5, and the first support structure 411 may include a plurality of fifth screw fastening parts (e.g., fifth bosses including female screws) aligned with the plurality of fifth screw holes. A sixth part ⑥ of the second hinge assembly 52 may be coupled to the second support structure 421 using a plurality of sixth screws S6. The sixth part ⑥ may include a plurality of sixth screw holes to correspond to the plurality of sixth screws S6, and the second support structure 421 may include a plurality of sixth screw fastening parts (e.g., sixth bosses including female screws) aligned with the plurality of sixth screw holes.

According to an embodiment, the fifth part ⑤ of the second hinge assembly 52 may include a seventh screw hole H7, and the first support structure 411 may include a seventh screw fastening part (e.g., a seventh boss including a female screw) aligned with the seventh screw hole H7. The seventh screw hole H7 and the seventh screw fastening part may be used for screwing the fourth plate 64 (see FIG. 4) and the fifth part ⑤ with the first support structure 411.

The sixth part ⑥ of the second hinge assembly 52 may include an eighth screw hole H8, and the second support structure 421 may include an eighth screw fastening part (e.g., an eighth boss including a female screw) aligned with the eighth screw hole H8. The eighth screw hole H8 and the eighth screw fastening part may be used for screwing the eighth plate 68 (see FIG. 4) and the sixth part ⑥ with the second support structure 421.

According to an embodiment, the first actuator 511 of the first hinge assembly 51 may include a gear assembly. The gear assembly may include, for example, a first shaft 618, a second shaft 620, a first shaft support 631, a second shaft support 632, a third shaft support 633, a fourth shaft support 634, a fifth shaft support 635, a first circular gear 641, a second circular gear 642, a third circular gear 643, a fourth circular gear 644, a gear support 650, a first torsion spring 661, a second torsion spring 662, a third torsion spring 663, a fourth torsion spring 664, a fifth torsion spring 665, and/or a sixth torsion spring 666.

According to an embodiment, the first shaft 618 may be positioned to correspond to the third part ③ and be positioned in a direction (e.g., −z axis direction) opposite to a direction of the first support area 411A of the first support structure 411 based on the third part ③ to be at least partially received in the recess of the hinge housing 23. The second shaft 620 may be positioned to correspond to the fourth part ④ and be positioned in a direction opposite to a direction of the second support area 421A of the second support structure 421 based on the fourth part ④ to be at least partially received in the recess of the hinge housing 23. The first shaft 618 and the second shaft 620 may be parallel to the folding shaft A. The first shaft 618 and the second shaft 620 may be rotatably positioned in the first shaft support 631, the second shaft support 632, the third shaft support 633, the fourth shaft support 634, and the fifth shaft support 635. The first shaft support 631, the second shaft support 632, the third shaft support 633, the fourth shaft support 634, and the fifth shaft support 635 may be disposed to be spaced apart in a direction (e.g., y-axis direction) of the folding axis A. The first shaft support 631, the second shaft support 632, the third shaft support 633, the fourth shaft support 634, and the fifth shaft support 635 may include a first hole (not illustrated) in which the first shaft 618 may be rotatably positioned, and include a second hole (not illustrated) in which the second shaft 620 may be rotatably positioned. In an embodiment, the second shaft support 632 may be coupled to the hinge housing 23 using a ninth screw S9. The second shaft support 632 may include a ninth screw hole H9 to correspond to the ninth screw S9, and the hinge housing 23 may include a ninth screw fastening part (e.g., a ninth boss including a female screw) aligned with the ninth screw hole H9. In an embodiment, the fifth shaft support 635 may be coupled to the hinge housing 23 using a tenth screw S10. The fifth shaft support 635 may include a tenth screw hole H10 to correspond to the tenth screw S10, and the hinge housing 23 may include a tenth screw fastening part (e.g., a tenth boss including a female screw) aligned with the tenth screw hole H10. A portion of the second shaft support 632 including the ninth screw hole H9 and a portion of the fifth shaft support 635 including the tenth screw hole H10 may be positioned between the first shaft 618 and the second shaft 620, when viewed in the x-y plane. The folding axis A of the electronic device 2 may be, for example, substantially provided by a combination of the first center axis A1 of a first shaft 618 and the second center axis A2 of a second shaft 620. The third part ③ and the first part ① connected to the third part ③ may be rotated based on the first center axis A1 of the first shaft 618. The fourth part ④ and the second part ② connected to the fourth part ④ may be rotated based on the second central axis A2 of the second shaft 620.

According to an embodiment, the first circular gear 641 may be connected to the first shaft 618 and be rotated together with the first shaft 618 based on the first center axis A1. The second circular gear 642 may be connected to the second shaft 620 and be rotated together with the second shaft 620 based on the second center axis A2. The third circular gear 643 may be engaged with the first circular gear 641. The fourth circular gear 644 may be engaged with the second circular gear 642. The third circular gear 643 and the fourth circular gear 644 may be engaged with each other. A third rotation axis of the third circular gear 643 and a fourth rotation axis of the fourth circular gear 644 may be parallel to the first rotation axis (e.g., the first center axis A1) of the first circular gear 641 and the second rotation axis (e.g., the second center axis A2) of the second circular gear 642. The first circular gear 641, the second circular gear 642, the third circular gear 643, and the fourth circular gear 644 may be, for example, a spur gear. The gear support 650 may support the third circular gear 643 so that the third circular gear 643 may be rotated by engaging with the first circular gear 641 connected to the first shaft 618. The gear support 650 may support the fourth circular gear 644 so that the fourth circular gear 644 may be rotated by engaging with the second circular gear 642 connected to the second shaft 620. When the third part ③ is rotated based on the first center axis A1 of the first shaft 618, the first circular gear 641 connected to the first shaft 618 may be rotated in the same direction as that of the third part ③. When the fourth part ④ is rotated based on the second center axis A2 of the second shaft 620, the second circular gear 642 connected to the second shaft 620 may be rotated in the same direction as that of the fourth part 4). When the first circular gear 641 is rotated in the first direction and the second circular gear 642 is rotated in a second direction opposite to the first direction, the third circular gear 643 and the fourth circular gear 644 may contribute to the transmission and balance of forces (e.g., rotational forces) between the first circular gear 641 and the second circular gear 642.

According to an embodiment, the first shaft 618 may include a first cam (or first cam gear) 701 and a second cam (or second cam gear) 702. The first cam 701 may be positioned between the gear support 650 and the first shaft support 631. The second cam 702 may be positioned between the third shaft support 633 and the fourth shaft support 634. The first cam 701 may include, for example, a first cam gear 701a and a second cam gear 701b. The first cam gear 701a may include a first tooth surface in an uneven form facing the second cam gear 701b, and the second cam gear 701b may include a second tooth surface in an uneven form facing the first tooth surface. The second cam 702 may include, for example, a third cam gear 702a, a fourth cam gear 702b, and a fifth cam gear 702c. The fifth cam gear 702c may be positioned between the third cam gear 702a and the fourth cam gear 702b. The third cam gear 702a may include a third tooth surface in an uneven form facing the fifth cam gear 702c. The fourth cam gear 702b may include a fourth tooth surface in an uneven form facing the fifth cam gear 702c. The fifth cam gear 702c may include a fifth tooth surface in an uneven form facing the third tooth surface of the third cam gear 702a, and a sixth surface in an uneven form facing the fourth tooth surface of the fourth cam gear 702b. The first shaft 618 may include a first shaft portion including the first cam gear 701a, a second shaft portion including the second cam gear 701b and a third cam gear 702a, a third shaft portion including the fifth cam gear 702c, and a fourth shaft portion including the fourth cam gear 702b. The first shaft portion may be connected to the first circular gear 641 and be rotated together with the first circular gear 641. The first torsion spring 661, the second torsion spring 662, and the third torsion spring 663 may be coil springs and be arranged in a direction of the first central axis A1 (e.g., y-axis direction). The first torsion spring 661 may be flexibly positioned between the first shaft support 631 and the second shaft support 632, and the second shaft portion including the second cam gear 701b and the third cam gear 702a may be positioned to penetrate the first torsion spring 661. The second torsion spring 662 may be flexibly positioned between the second shaft support 632 and the third shaft support 633, and the second shaft portion including the second cam gear 701b and the third cam gear 702a may be positioned to penetrate the second torsion spring 662. The third torsion spring 663 may be flexibly positioned between the fourth shaft support 634 and the fifth shaft support 635, and the fourth shaft portion including the fourth cam gear 702b may be positioned to penetrate the third torsion spring 663. The second shaft 620 may be provided substantially symmetrically with the first shaft 618. The second shaft 620 may include, for example, a third cam 703 corresponding to the first cam 701, and a fourth cam 704 corresponding to the second cam 702. The fourth torsion spring 664 may be positioned in the second shaft 620 in a substantially the same or similar way to that the first torsion spring 661 is disposed in the first shaft 618. The fifth torsion spring 665 may be positioned in the second shaft 620 in a substantially the same or similar way to that the second torsion spring 662 is disposed in the first shaft 618. The sixth torsion spring 666 may be positioned in the second shaft 620 in a substantially the same or similar way to that the third torsion spring 663 is disposed in the first shaft 618. The first actuator 511 may perform a function of providing a drive force so that the third part ③ and the fourth part ④ may be rotated with each other. The first actuator 511 may perform a function of enabling the third part ③ and the fourth part ④ to be rotated at the same angle in opposite directions to each other. The first actuator 511 may perform a function (e.g., free-stop function) of enabling the third part ③ and the fourth part ④ to be rotated and maintained at least specified one angle. The above-described functions of the first actuator 511 may be provided using, for example, an interaction between the plurality of circular gears 641, 642, 643, and 644, an interaction between two cam gears 701a and 701b of the first cam 701 using elasticity of the first torsion spring 661, an interaction between three cam gears 702a, 702b, and 702c of the second cam 702 using elasticity of the second torsion spring 662 and elasticity of the third torsion spring 663, an interaction between two cam gears of the third cam 703 using elasticity of the fourth torsion spring 664, and an interaction between three cam gears of the fourth cam 704 using elasticity of the fifth torsion spring 665, and elasticity of the sixth torsion spring 666.

According to an embodiment, the second actuator 521 (see FIG. 4) of the second hinge assembly 52 may be provided to be substantially the same as or similar to the first actuator 511 of the first hinge assembly 51. The second actuator 521 may be substantially symmetrically disposed with the first actuator 511 based on the center between the first hinge assembly 51 and the second hinge assembly 52. The second actuator 521 may perform a function of providing a driving force so that the seventh part ⑦ (see FIG. 4) and the eighth part ⑧ (see FIG. 4) of the second hinge assembly 52 can mutually rotate. The second actuator 521 may perform a function of enabling the seventh part ⑦ and the eighth part ⑧ of the second hinge assembly 52 to be rotated in opposite directions at the same angle. The second actuator 521 may perform a function of enabling the seventh part ⑦ and the eighth part ⑧ of the second hinge assembly 52 to be maintained in at least one designated angle.

The first hinge assembly 51 including the aforementioned components, and the second hinge assembly 52 provided substantially the same as or similar to the first hinge assembly 51 may be implemented in a slim form to be spaced apart from the rear surface of the display assembly including the flexible display 30 so as not to press the rear surface of the display assembly including the flexible display 30. The first hinge assembly 51 and the second hinge assembly 52 may be implemented to reduce or substantially do not include a plane area for supporting the rear surface of the display assembly including the flexible display 30. Conversely, in the case of a comparative example in which the hinge assembly includes an extended portion (e.g., a relatively large plane area) protruding toward the rear surface of the display assembly, the rear surface of the display assembly may need to include a recess of a form in which a portion is removed corresponding to the protruding extended portion of the hinge assembly (i.e., a recess to accommodate the extended portion). Unfortunately, in the case of a comparative example, an electromagnetic induction panel may not be extended to a portion in which a recess is provided in the display assembly, and a portion of the display assembly in which the recess is provided may, due to lack of an extended electromagnetic induction panel, cause difficulties when inputting using the pen input device. The first plate assembly 6A and the second plate assembly 6B are implemented to correspond to the first hinge assembly 51 and the second hinge assembly 52 according to an embodiment, and may reduce or omit a portion in which the recess is provided in the display assembly, as implementing the first plate assembly 6A and the second plate assembly 6B according to one or more embodiments results in stably supporting the rear surface of the display assembly without requiring an extended portion of the hinge assembly and the associated accommodative recess in the rear surface of the display assembly as is needed in the comparative example.

Figure 8:
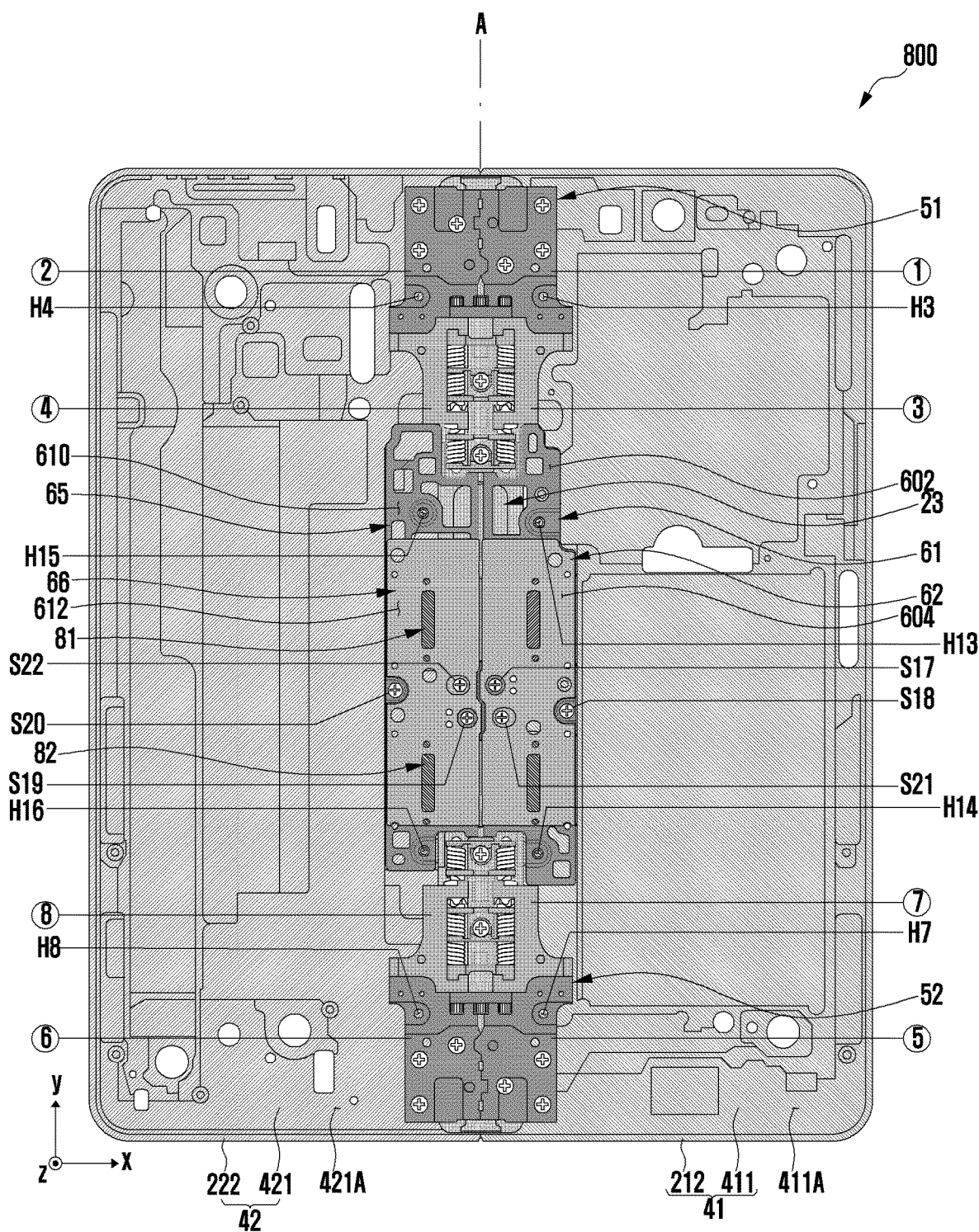
FIG. 8 is a diagram illustrating a second assembly in an unfolded state in which a first plate, a second plate, a fifth plate, a sixth plate, a first electrical path, and a second electrical path are coupled to a first assembly of FIG. 5 according to an embodiment of the disclosure.
Figure 9:
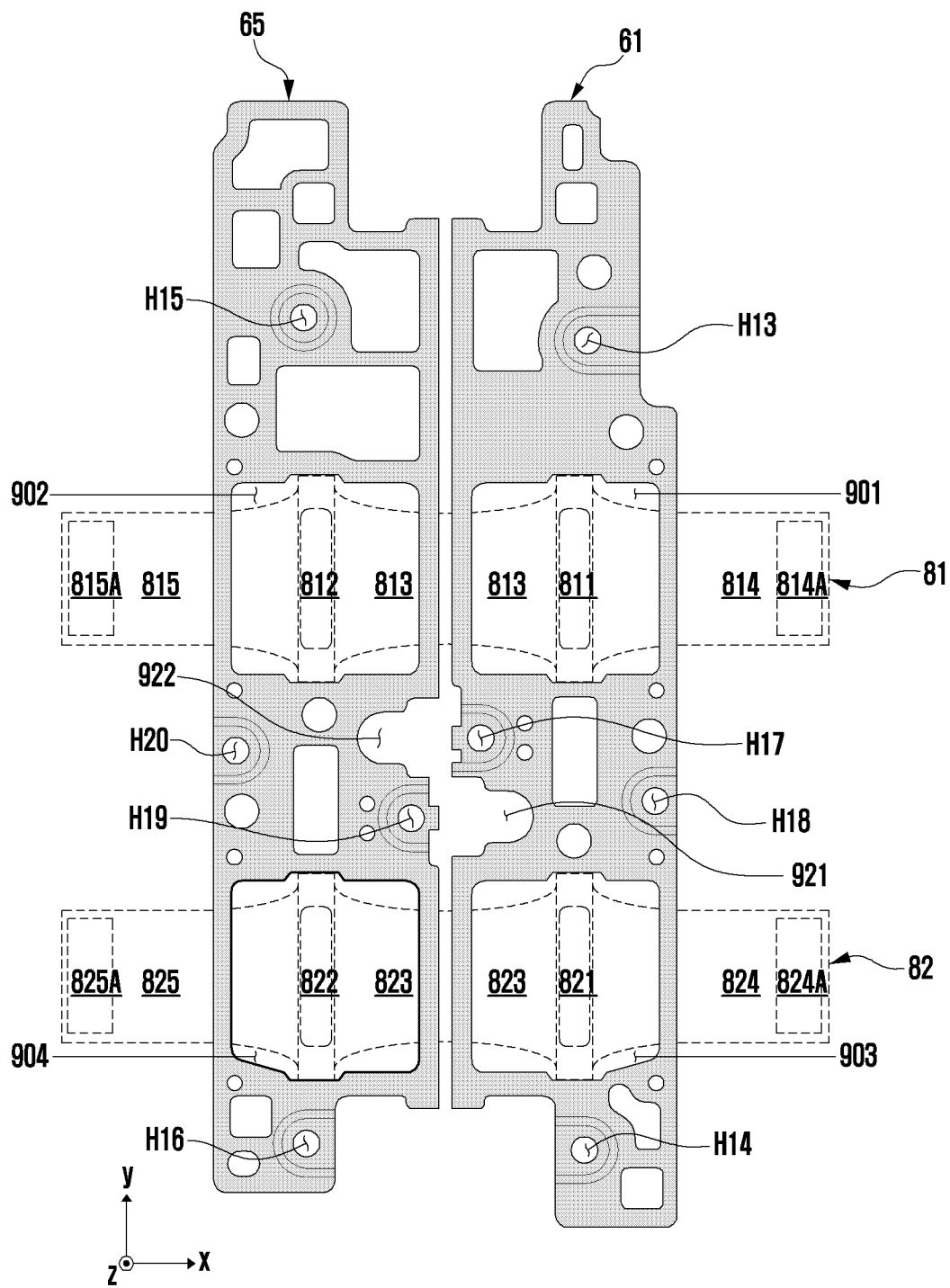
FIG. 9 is a diagram illustrating a first plate and a fifth plate according to an embodiment of the disclosure.
Figure 10:
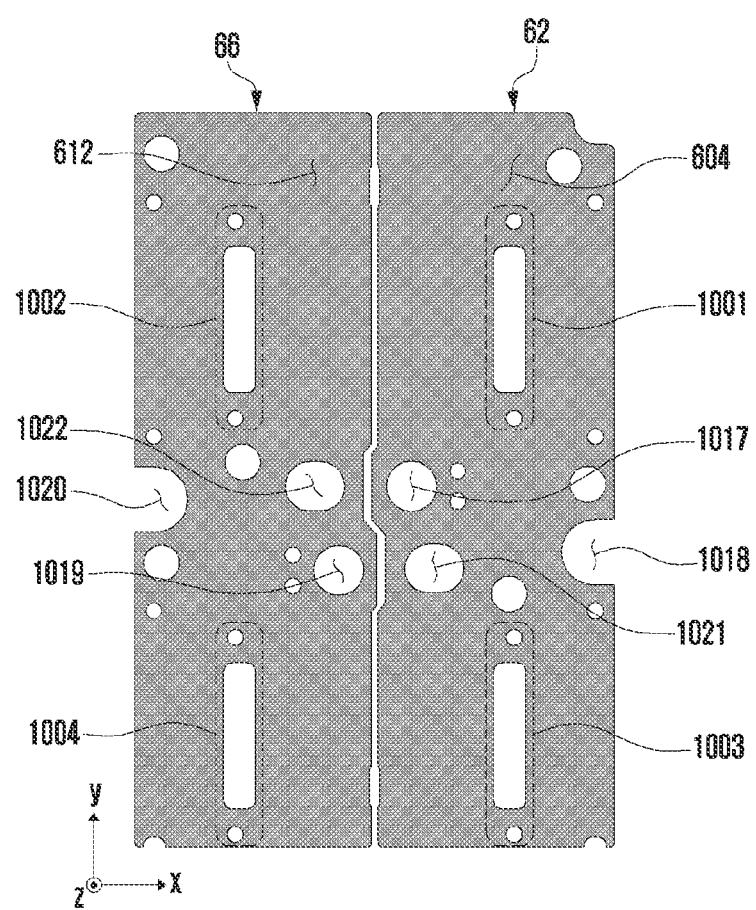
FIG. 10 is a diagram illustrating a second plate and a sixth plate according to an embodiment of the disclosure.
Figure 11:
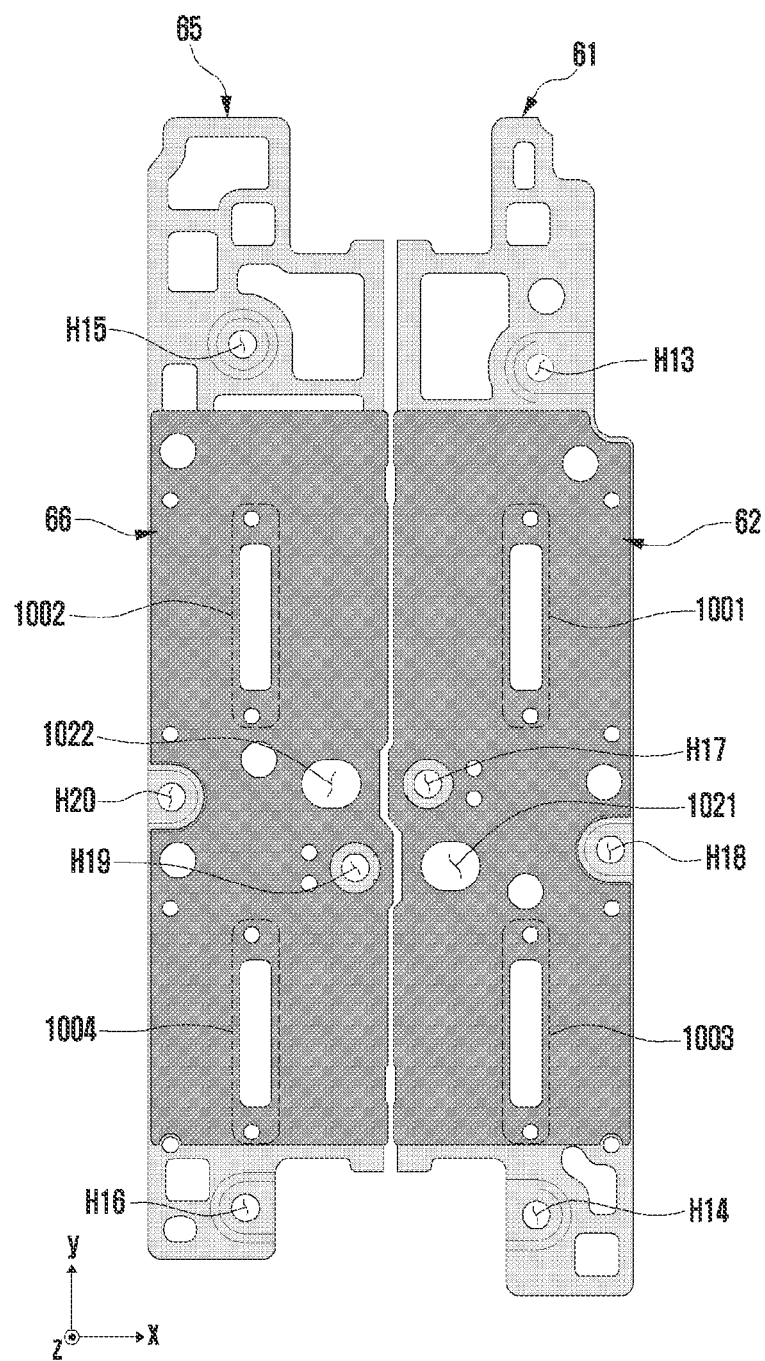
FIG. 11 is a diagram illustrating a state in which a first plate and a second plate are coupled and a state in which a fifth plate and a sixth plate are coupled according to an embodiment of the disclosure.

FIG. 8 is a diagram illustrating a second assembly 800 in an unfolded state in which a first plate 61, a second plate 62, a fifth plate 65, a sixth plate 66, a first electrical path 81, and a second electrical path 82 are coupled to the first assembly 500 of FIG. 5 according to an embodiment of the disclosure. FIG. 9 is a diagram illustrating a first plate 61 and a fifth plate 65 according to an embodiment of the disclosure. FIG. 10 is a diagram illustrating a second plate 62 and a sixth plate 66 according to an embodiment of the disclosure. FIG. 11 is a diagram illustrating a state in which a first plate 61 and a second plate 62 are coupled and a state in which a fifth plate 65 and a sixth plate 66 are coupled according to an embodiment of the disclosure. It is to be understood as the disclosure envisages and includes all combinations of features and/or embodiments disclosed in relation to FIGS. 8, 9, 10, and 11. That is, every combination of the features described below in relation to FIGS. 8, 9, 10, and 11 should be considered as included in the disclosure as a specific example.

With reference to FIGS. 8, 9, 10, and 11, the first plate 61 may be positioned between the first hinge assembly 51 and the second hinge assembly 52. When viewed from above the first support area 411A of the first support structure 411, the first plate 61 may not overlap the first hinge assembly 51 and the second hinge assembly 52. The first plate 61 may include a first surface (not illustrated) facing the first support area 411A, and a second surface 602 facing in a direction opposite to that of the first surface. The second plate 62 may overlap the first plate 61. The second plate 62 may include, for example, a third surface (not illustrated) facing the second surface 602 of the first plate 61, and a fourth surface 604 facing in a direction opposite to that of the third surface. In an embodiment, the first plate 61 and the second plate 62 may be coupled using welding. In some embodiments, the first plate 61 and the second plate 62 may be coupled using bonding techniques including bonding with an adhesive material. In some embodiments, the first plate 61 and the second plate 62 may be coupled using a screw.

According to an embodiment, when viewed from above the first support area 411A of the first support structure 411, the second plate 62 may not overlap the first hinge assembly 51 and the second hinge assembly 52.

According to an embodiment, when viewed from above the first support area 411A of the first support structure 411, the first plate 61 may include a first extension area and a second extension area compared to the second plate 62. The first extension area may be extended toward the first hinge assembly 51 to not overlap the second plate 62. The first expansion area may be coupled to the third plate 63 (see FIG. 4) and the first support structure 411 using a screw. The second expansion area may be extended toward the second hinge assembly 52 to not overlap the second plate 62. The second expansion area may be coupled to the fourth plate 64 (see FIG. 4) and the first support structure 411 using a screw.

According to an embodiment, the fifth plate 65 may be positioned between the first hinge assembly 51 and the second hinge assembly 52. When viewed from above the second support area 421A of the second support structure 421, the fifth plate 65 may not overlap the first hinge assembly 51 and the second hinge assembly 52. The fifth plate 65 may include a ninth surface (not illustrated) facing the second support area 421A, and a tenth surface 610 facing in a direction opposite to that of the ninth surface. The sixth plate 66 may overlap the fifth plate 65. The sixth plate 66 may include, for example, an eleventh surface (not illustrated) facing the tenth surface 610 of the fifth plate 65, and a twelfth surface 612 facing in a direction opposite to that of the eleventh surface. In an embodiment, the fifth plate 65 and the sixth plate 66 may be coupled using welding. In some embodiments, the fifth plate 65 and the sixth plate 66 may be coupled using bonding techniques including bonding with an adhesive material. In some embodiments, the fifth plate 65 and the sixth plate 66 may be coupled using a screw.

According to an embodiment, when viewed from above the second support area 421A of the second support structure 421, the fifth plate 65 may include a third expansion area and a fourth expansion area compared with the sixth plate 66. The third expansion area may be extended toward the first hinge assembly 51 to not overlap the sixth plate 66. The third expansion area may be coupled to the seventh plate 67 (see FIG. 4) and the second support structure 421 using a screw. The fourth expansion area may be extended toward the second hinge assembly 52 to not overlap the sixth plate 66. The fourth expansion area may be coupled to the eighth plate 68 (see FIG. 4) and the second support structure 421 using a screw.

According to an embodiment, the first plate 61 may include a thirteenth screw hole H13, a fourteenth screw hole H14, a seventeenth screw hole H17, and/or an eighteenth screw hole H18. The first support structure 411 may include a thirteenth screw fastening part (e.g., a thirteenth boss including a female screw) aligned with the thirteenth screw hole H13. The thirteenth screw hole H13 and the thirteenth screw fastening part may be used for screwing the third plate 63 (see FIG. 4) and the first plate 61 with the first support structure 411. The first support structure 411 may include a fourteenth screw fastening part (e.g., a fourteenth boss including a female screw) aligned with the fourteenth screw hole H14. The fourteenth screw hole H14 and the fourteenth screw fastening part may be used for screwing the fourth plate 64 (see FIG. 4) and the first plate 61 with the first support structure 411. The first plate 61 may be coupled to the first slider structure 72 (see FIG. 4) using a seventeenth screw S17 corresponding to a seventeenth screw hole H17. The first plate 61 may be coupled to the first support structure 411 using an eighteenth screw S18 corresponding to an eighteenth screw hole H18.

According to an embodiment, the second plate 62 may include an opening 1017 (see FIG. 10) aligned (or overlapped) with the seventeenth screw hole H17 of the first plate 61. The opening 1017 of the second plate 62 may prevent the second plate 62 from interfering with a structure in which the seventeenth screw S17 penetrates the seventeenth screw hole H17 to be coupled to the seventeenth screw fastening part (e.g., a seventeenth boss including a female screw) provided in the first slider structure 72. The opening 1017 corresponding to the seventeenth screw hole H17 may be in the form of a through hole as in the illustrated example, but is not limited thereto and may be provided in the form of a notch. The second plate 62 may include an opening 1018 (see FIG. 10) aligned (or overlapped) with the eighteenth screw hole H18 of the first plate 61. The opening 1018 of the second plate 62 may prevent the second plate 62 from interfering with a structure in which the eighteenth screw S18 penetrates the eighteenth screw hole H18 to be coupled to an eighteenth screw fastening part (e.g., an eighteenth boss including a female screw) provided in the first support structure 411. The opening 1018 corresponding to the eighteenth screw hole H18 may be in the form of a notch as in the illustrated example, but is not limited thereto and may be provided in the form of a through hole.

According to an embodiment, the fifth plate 65 may include a fifteenth screw hole H15, a sixteenth screw hole H16, a nineteenth screw hole H19, and/or a twentieth screw hole H20. The second support structure 421 may include a fifteenth screw fastening part (e.g., a fifteenth boss including a female screw) aligned with the fifteenth screw hole H15. The fifteenth screw hole H15 and the fifteenth screw fastening part may be used for screwing the seventh plate 67 (see FIG. 4) and the fifth plate 65 with the second support structure 421. The second support structure 421 may include a sixteenth screw fastening part (e.g., a sixteenth boss including a female screw) aligned with the sixteenth screw hole H16. The sixteenth screw hole H16 and the sixteenth screw fastening part may be used for screwing the eighth plate 68 (see FIG. 4) and the fifth plate 65 with the second support structure 421. The fifth plate 65 may be coupled to the second slider structure 73 (see FIG. 4) using a nineteenth screw S19 corresponding to a nineteenth screw hole H19. The fifth plate 65 may be coupled to the second support structure 421 using a twentieth screw S20 corresponding to a twentieth screw hole H20.

According to an embodiment, the sixth plate 66 may include an opening 1019 (see FIG. 10) aligned (or overlapped) with the nineteenth screw hole H19 of the fifth plate 65. The opening 1019 of the sixth plate 66 may prevent the sixth plate 66 from interfering with a structure in which the nineteenth screw S19 penetrates a nineteenth screw hole H19 to be coupled to a nineteenth screw fastening part (e.g., a nineteenth boss including a female screw) provided in the second slider structure 73 (see FIG. 4). The opening 1019 corresponding to the nineteenth screw hole H19 may be in the form of a through hole as in the illustrated example, but is not limited thereto and may be provided in the form of a notch. The sixth plate 66 may include an opening 1020 (see FIG. 10) aligned (or overlapping) with the twentieth screw hole H20 of the fifth plate 65. The opening 1020 of the sixth plate 66 may prevent the sixth plate 66 from interfering with a structure in which the twentieth screw S20 penetrates the twentieth screw hole H20 to be coupled to a twentieth screw fastening part (e.g., a twentieth boss including a female screw) provided in the second support structure 421. The opening 1020 corresponding to the twentieth screw hole H20 may be in the form of a notch as in the illustrated example, but is not limited thereto and may be provided in the form of a through hole.

According to an embodiment, the guide rail structure 71 (see FIG. 4) may be coupled to the hinge housing 23 using a twenty-first screw S21. The first plate 61 may include an opening 921 (see FIG. 9) corresponding to the twenty-first screw S21. The second plate 62 may include an opening 1021 (see FIG. 10) aligned (or overlapped) with the opening 921 of the first plate 61. The guide rail structure 71 (see FIG. 4) may include a twenty-first screw hole corresponding to the twenty-first screw S21. The hinge housing 23 may include a twenty-first screw fastening part (e.g., a twenty-first boss including a female screw) corresponding to the twenty-first screw hole. The opening 921 of the first plate 61 and the opening 1021 of the second plate 62 may prevent the first plate 61 and the second plate 62 from interfering with a structure in which the twenty-first screw S21 penetrates the twenty-first screw hole of the guide rail structure 71 to be coupled to the twenty-first screw fastening part provided in the hinge housing 23. The opening 921 of the first plate 61 corresponding to the twenty-first screw S21 may be in the form of a notch as in the illustrated example, but is not limited thereto and may be provided in the form of a through hole. The opening 1021 of the second plate 62 corresponding to the twenty-first screw S21 may be in the form of a through hole as in the illustrated example, but is not limited thereto and may be provided in the form of a notch.

According to an embodiment, the guide rail structure 71 (see FIG. 4) may be coupled to the hinge housing 23 using a twenty-second screw S22. The fifth plate 65 may include an opening 922 (see FIG. 9) corresponding to the twenty-second screw S22. The sixth plate 66 may include an opening 1022 (see FIG. 10) aligned (or overlapped) with the opening 922 of the fifth plate 65. The guide rail structure 71 (see FIG. 4) may include a twenty-second screw hole corresponding to the twenty-second screw S22. The hinge housing 23 may include a twenty-second screw fastening part (e.g., a twenty-second boss including a female screw) corresponding to the twenty-second screw hole. The opening 922 of the fifth plate 65 and the opening 1022 of the sixth plate 66 may prevent the fifth plate 65 and the sixth plate 66 from interfering with a structure in which the twenty-second screw S22 penetrates the twenty-second screw hole of the guide rail structure 71 (see FIG. 4) to be coupled to the twenty-second screw fastening part of the hinge housing 23. The opening 922 of the fifth plate 65 corresponding to the twenty-second screw S22 may be in the form of a notch as in the illustrated example, but is not limited thereto and may be provided in the form of a through hole. The opening 1022 of the sixth plate 66 corresponding to the twenty-second screw S22 may be in the form of a through hole as in the illustrated example, but is not limited thereto and may be provided in the form of a notch.

According to an embodiment, the first electrical path 81 may include a first area 811 coupled to the second plate 62, a second area 812 coupled to the sixth plate 66, and a third area 813 connecting the first area 811 and the second area 812. The third area 813 may be positioned at a recess of the hinge housing 23 and may be bent and disposed according to a state change of the electronic device 2 (e.g., the switch between the unfolded state of FIG. 2 and the folded state of FIG. 3). The first electrical path 81 may include a fourth area 814 extended from the first area 811 and electrically connected to a first electrical element (e.g., first printed circuit board) housed in the first housing 21 (see FIG. 2). The first electrical path 81 may include a first connector 814A disposed in the fourth area 814. The first connector 814A may be electrically connected to the first electrical element. The first electrical path 81 may include a fifth area 815 extended from the second area 812 and electrically connected to a second electrical element (e.g., second PCB) received in the second housing 22 (see FIG. 2). The first electrical path 81 may include a second connector 815A disposed in the fifth area 815. The second connector 815A may be electrically connected to the second electrical element. The second electrical path 82 may be provided to be substantially the same as or similar to the first electrical path 81. The second electrical path 82 may include, for example, a first area 821 coupled to the second plate 62, a second area 822 coupled to the sixth plate 66, and a third area 823 connecting the first area 821 and the second area 822. The second electrical path 82 may include a fourth area 824 extended from the first area 821 and a third connector 824A disposed in the fourth area 824. The second electrical path 82 may include a fifth area 825 extended from the second area 822, and a fourth connector 825A disposed in the fifth area 825.

According to an embodiment, to correspond to the first electrical path 81, the first plate 61 may include a first opening 901 and the fifth plate 65 may include a second opening 902. The first area 811 of the first electrical path 81 may pass through the first opening 901 to be disposed in the second plate 62. The second area 812 of the first electrical path 81 may pass through the second opening 902 to be disposed in the sixth plate 66. The first area 811 may be disposed at the third surface facing the first plate 61 in the second plate 62. The second area 812 may be disposed at an eleventh surface facing the second plate 62 in the sixth plate 66.

According to an embodiment, to correspond to the second electrical path 82, the first plate 61 may include a third opening 903 and the fifth plate 65 may include a fourth opening 904. The first area 821 of the second electrical path 82 may pass through the third opening 903 to be disposed in the second plate 62. The second area 822 of the second electrical path 82 may pass through the fourth opening 904 to be disposed in the sixth plate 66. The first area 821 may be disposed at the third surface facing the first plate 61 in the second plate 62. The second area 822 may be disposed at the eleventh surface facing the second plate 62 in the sixth plate 66.

According to an embodiment, the first area 811 and the second area 812 of the first electrical path 81 may be substantially rigid, and the third area 813, the fourth area 814, and the fifth area 815 of the first electrical path 81 may be substantially flexible. The first area 821 and the second area 822 of the second electrical path 82 may be substantially rigid, and the third area 823, the fourth area 824, and the fifth area 825 of the second electrical path 82 may be substantially flexible. The first electrical path 81 and the second electrical path 82 may be a FPCB or RFPCB.

According to an embodiment, the second plate 62 may include a first opening structure 1001 in which one or more openings are provided to correspond to the first area 811 of the first electrical path 81. Through the first opening structure 1001, an adhesive material for coupling the first area 811 and the second plate 62 may be introduced. In some embodiments, the first opening structure 1001 may enable a portion of the first area 811 to be fitted, thereby contributing to stably coupling the second plate 62 and the first area 811 to each other.

According to an embodiment, the sixth plate 66 may include a second opening structure 1002 in which one or more openings are provided to correspond to the second area 812 of the first electrical path 81. The second opening structure 1002 may be used for coupling the second area 812 of the first electrical path 81 to the sixth plate 66 with substantially the same method as that of using the first opening structure 1001 in coupling the first area 811 of the first electrical path 81 to the second plate 62.

According to an embodiment, the second plate 62 may include a third opening structure 1003 in which one or more openings are provided to correspond to the first area 821 of the second electrical path 82. The third opening structure 1003 may be used for coupling the first area 821 of the second electrical path 82 to the second plate 62 with substantially the same method as that of using the first opening structure 1001 in coupling the first area 811 of the first electrical path 81 to the second plate 62.

According to an embodiment, the sixth plate 66 may include a fourth opening structure 1004 in which one or more openings are provided to correspond to the second area 822 of the second electrical path 82. The fourth opening structure 1004 may be used for coupling the second area 822 of the second electrical path 82 to the sixth plate 66 with substantially the same method as that of using the first opening structure 1001 in coupling the first area 811 of the first electrical path 81 to the second plate 62.

Figure 12:
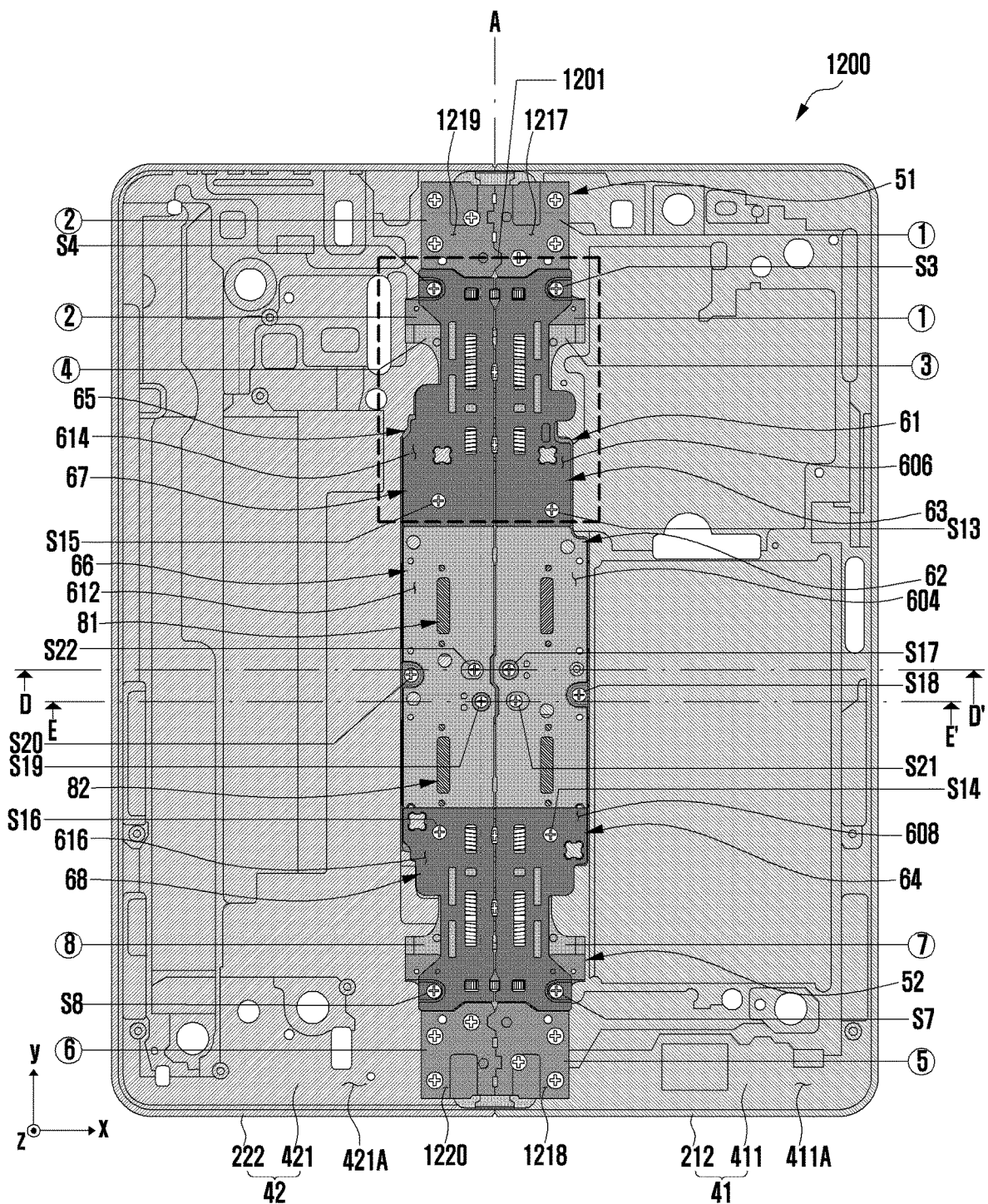
FIG. 12 is a diagram illustrating a third assembly in an unfolded state in which a third plate, a fourth plate, a seventh plate, and an eighth plate are coupled to a second assembly of FIG. 8 according to an embodiment of the disclosure.

FIG. 12 is a diagram illustrating a third assembly 1200 in an unfolded state in which a third plate 63, a fourth plate 64, a seventh plate 67, and an eighth plate 68 are coupled to a second assembly 800 of FIG. 8 according to an embodiment of the disclosure. It is to be understood as the disclosure envisages and includes all combinations of features and/or embodiments disclosed in relation to FIG. 12. That is, every combination of the features described below in relation to FIG. 12 should be considered as included in the disclosure as a specific example.

With reference to FIG. 12, in an embodiment, when viewed from above the first support area 411A of the first support structure 411 (e.g., when viewed in the −z axis direction), a portion of the third plate 63 may overlap the first plate 61, and another portion of the third plate 63 may overlap the first hinge assembly 51. The third plate 63 may include a fifth surface, and a sixth surface 606 facing in a direction opposite to that of the fifth surface. A partial area of the fifth surface may face the first plate 61, and another partial area of the fifth surface may face the first hinge assembly 51. The third plate 63 may be coupled to the first support structure 411 and the first part ①  of the first hinge assembly 51 using a third screw S3. The third plate 63 may be coupled to the first plate 61 and the first support structure 411 using the thirteenth screw S13.

According to an embodiment, when viewed from above the first support area 411A of the first support structure 411 (e.g., when viewed in the −z axial direction), a portion of the fourth plate 64 may overlap the first plate 61, and another portion of the fourth plate 64 may overlap the second hinge assembly 52. The fourth plate 64 may include a seventh surface, and an eighth surface 608 facing in a direction opposite to that of the seventh surface. A partial area of the seventh surface may face the first plate 61, and another partial area of the seventh surface may face the second hinge assembly 52. The fourth plate 64 may be coupled to the first support structure 411 and the fifth part ⑤ of the second hinge assembly 52 using the seventh screw S7. The fourth plate 64 may be coupled to the first plate 61 and the first support structure 411 using a fourteenth screw S14.

According to an embodiment, when viewed from above the first support area 411A of the first support structure 411 (e.g., when viewed in the −z axis direction), the second plate 62 may be positioned between the third plate 63 and the fourth plate 64 and may not overlap the third plate 63 and the fourth plate 64.

According to an embodiment, when viewed from above the second support area 421A of the second support structure 421, a portion of the seventh plate 67 may overlap the fifth plate 65, and another portion of the seventh plate 67 may overlap the first hinge assembly 51. The seventh plate 67 may include a thirteenth surface, and a fourteenth surface 614 facing in a direction opposite to that of the thirteenth surface. A partial area of the thirteenth surface may face the fifth plate 65, and another partial area of the thirteenth surface may face the first hinge assembly 51. The seventh plate 67 may be coupled to the second support structure 421 and the second part ② of the first hinge assembly 51 using a fourth screw S4. The seventh plate 67 may be coupled to the fifth plate 65 and the second support structure 421 using the fifteenth screw S15.

According to an embodiment, when viewed from above the second support area 421A of the second support structure 421, a portion of the eighth plate 68 may overlap the fifth plate 65, and another portion of the eighth plate 68 may overlap the second hinge assembly 52. The eighth plate 68 may include a fifteenth surface, and a sixteenth surface 616 facing in a direction opposite to that of the fifteenth surface. A partial area of the fifteenth surface may face the fifth plate 65, and another partial area of the fifteenth surface may face the second hinge assembly 52. The eighth plate 68 may be coupled to the second support structure 421 and the sixth part ⑥ of the second hinge assembly 52 using the eighth screw S8. The eighth plate 68 may be coupled to the fifth plate 65 and the second support structure 421 using the sixteenth screw S16.

According to an embodiment, when viewed from above the second support area 421A of the second support structure 421, the sixth plate 66 may be positioned between the seventh plate 67 and the eighth plate 68 and may not overlap the seventh plate 67 and the eighth plate 68.

According to an embodiment, the second plate 62, the third plate 63, and the fourth plate 64 of the first plate assembly 6A (see FIG. 4) may substantially support the rear surface of the display assembly including the flexible display 30 (see FIG. 2). In an embodiment, the first plate 61 may be disposed in the first support area 411A of the first support structure 411 between the first hinge assembly 51 and the second hinge assembly 52 to be a bracket or base connecting the second plate 62, the third plate 63, and the fourth plate 64 supporting the display assembly to the first support structure 411. The first plate 61 may enable the second plate 62, the third plate 63, and the fourth plate 64 to be positioned apart from the first support structure 411 at a designated height. The second plate 62, the third plate 63, and the fourth plate 64 disposed at the first plate 61 and positioned spaced apart from the first support structure 411 at a designated height may support the display assembly not to sag without substantially pressing the rear surface of the display assembly.

According to an embodiment, a portion supporting the rear surface of the display assembly in the first support area 411A of the first support structure 411 may be formed with substantially no difference in height with at least a portion supporting the rear surface of the display assembly in the fourth surface 604 of the second plate 62, at least a portion supporting the rear surface of the display assembly in the sixth surface 606 of the third plate 63, and/or at least a portion supporting the rear surface of the display assembly in the eighth surface 608 of the fourth plate 64.

According to an embodiment, a portion that is not covered by the third plate 63 in the first part ① of the first hinge assembly 51 may include a seventeenth surface 1217 that supports the rear surface of the display assembly including the flexible display 30 (see FIG. 2). The seventeenth surface 1217 may be formed with substantially no difference in height with a portion supporting the rear surface of the display assembly in the first support area 411A of the first support structure 411 and/or at least a portion supporting the rear surface of the display assembly in the sixth surface 606 of the third plate 63.

According to an embodiment, a portion that is not covered by the fourth plate 64 in the fifth part ⑤ of the second hinge assembly 52 may include a eighteenth surface 1218 that supports the rear surface of the display assembly including the flexible display 30 (see FIG. 2). The eighteenth surface 1218 may be formed with substantially no difference in height with a portion supporting the rear surface of the display assembly in the first support area 411A of the first support structure 411 and/or at least a portion supporting the rear surface of the display assembly in the eighth surface 608 of the fourth plate 64.

According to an embodiment, the sixth plate 66, the seventh plate 67, and the eighth plate 68 of the second plate assembly 6B (see FIG. 4) may substantially support the rear surface of the display assembly including the flexible display 30 (see FIG. 2). In an embodiment, the fifth plate 65 may be disposed in the second support area 421A of the second support structure 421 between the first hinge assembly 51 and the second hinge assembly 52 to be a bracket or base connecting the sixth plate 66, the seventh plate 67, and the eighth plate 68 supporting the display assembly to the second support structure 421. The fifth plate 65 may enable the sixth plate 66, the seventh plate 67, and the eighth plate 68 to be positioned apart from the second support structure 421 at a designated height. The sixth plate 66, the seventh plate 67, and the eighth plate 68 disposed at the fifth plate 65 and spaced apart from the second support structure 421 at a designated height may support the display assembly not to sag without substantially pressing the rear surface of the display assembly.

According to an embodiment, a portion supporting the rear surface of the display assembly in the second support area 421A of the second support structure 421 may be formed with substantially no difference in height with at least a portion supporting the rear surface of the display assembly in the twelfth surface 612 of the sixth plate 66, at least a portion supporting the rear surface of the display assembly in the fourteenth surface 614 of the seventh plate 67, and/or at least a portion supporting the rear surface of the display assembly in the sixteenth surface 616 of the eighth plate 68.

According to an embodiment, a portion that is not covered by the seventh plate 67 in the second part ② of the first hinge assembly 51 may include a nineteenth surface 1219 that supports the rear surface of the display assembly including the flexible display 30 (see FIG. 2). The nineteenth surface 1219 may be formed with substantially no difference in height with a portion supporting the rear surface of the display assembly in the second support area 421A of the second support structure 421 and/or at least a portion supporting the rear surface of the display assembly in the fourteenth surface 614 of the seventh plate 67.

According to an embodiment, a portion that is not covered by the eighth plate 68 in the sixth part ⑥ of the second hinge assembly 52 may include a twentieth surface 1220 that supports the rear surface of the display assembly including the flexible display 30 (see FIG. 2). The twentieth surface 1220 may be formed with substantially no difference in height with a portion supporting the rear surface of the display assembly in the second support area 421A of the second support structure 421 and/or at least a portion supporting the rear surface of the display assembly in the sixteenth surface 616 of the eighth plate 68.

According to an embodiment, in the unfolded state (see FIG. 2) of the electronic device 2, a seventeenth surface 1217 that supports the rear surface of the display assembly including the flexible display 30 (see FIG. 2) in the first part ① of the first hinge assembly 51 and a nineteenth surface 1219 that supports the rear surface of the display assembly in the second part ② of the first hinge assembly 51 may be disposed with substantially no difference in height.

According to an embodiment, in the unfolded state (see FIG. 2) of the electronic device 2, the eighteenth surface 1218 that supports the rear surface of the display assembly including the flexible display 30 (see FIG. 2) in the fifth part ⑤ of the second hinge assembly 52 and the twentieth surface 1220 that supports the rear surface of the display assembly in the sixth part ⑥ of the second hinge assembly 52 may be disposed with substantially no difference in height.

According to an embodiment, in the unfolded state (see FIG. 2) of the electronic device 2, at least a portion supporting the rear surface of the display assembly including the flexible display 30 (see FIG. 2) in the sixth surface 606 of the third plate 63 and at least a portion supporting the rear surface of the display assembly in the fourteenth surface 614 of the seventh plate 67 may be disposed with substantially no difference in height.

According to an embodiment, in the unfolded state (see FIG. 2) of the electronic device 2, at least a portion supporting the rear surface of the display assembly including the flexible display 30 (see FIG. 2) in the fourth surface 604 of the second plate 62 and at least a portion supporting the rear surface of the display assembly in the twelfth surface 612 of the sixth plate 66 may be disposed with substantially no difference in height.

According to an embodiment, in the unfolded state (see FIG. 2) of the electronic device 2, at least a portion supporting the rear surface of the display assembly including the flexible display 30 (see FIG. 2) in the eighth surface 608 of the fourth plate 64 and at least a portion supporting the rear surface of the display assembly in the sixteenth surface 616 of the eighth plate 68 may be disposed with substantially no difference in height.

According to some embodiments, in case that it is found to be difficult to substantially evenly support the rear surface of the display assembly due to the height difference between two support surfaces of two neighboring components for supporting the rear surface of the display assembly, one or more members for reducing the height difference may be added.

According to an embodiment, the first part ①, the second part ②, the third part ③, and the fourth part ④ of the first hinge assembly 51 may be disposed not to interfere with an operation of the first actuator 511 (see FIG. 4) of the first hinge assembly 51. The fifth part ⑤, the sixth part ⑥, the seventh part (7, and the eighth part ⑧ of the second hinge assembly 52 may be disposed not to interfere with an operation of the second actuator 521 (see FIG. 4) of the second hinge assembly 52. In an embodiment, the first plate assembly 6A (see FIG. 4) and the second plate assembly 6B (see FIG. 4) may be disposed not to interfere with an operation of the first actuator 511 (see FIG. 4) of the first hinge assembly 51 and an operation of the second actuator 521 (see FIG. 4) of the second hinge assembly 52. A structure for not interfering with the operation of the first actuator 511 and the operation of the second actuator 521 will be described below with reference to FIGS. 13, 14, and 15.

Figure 13:
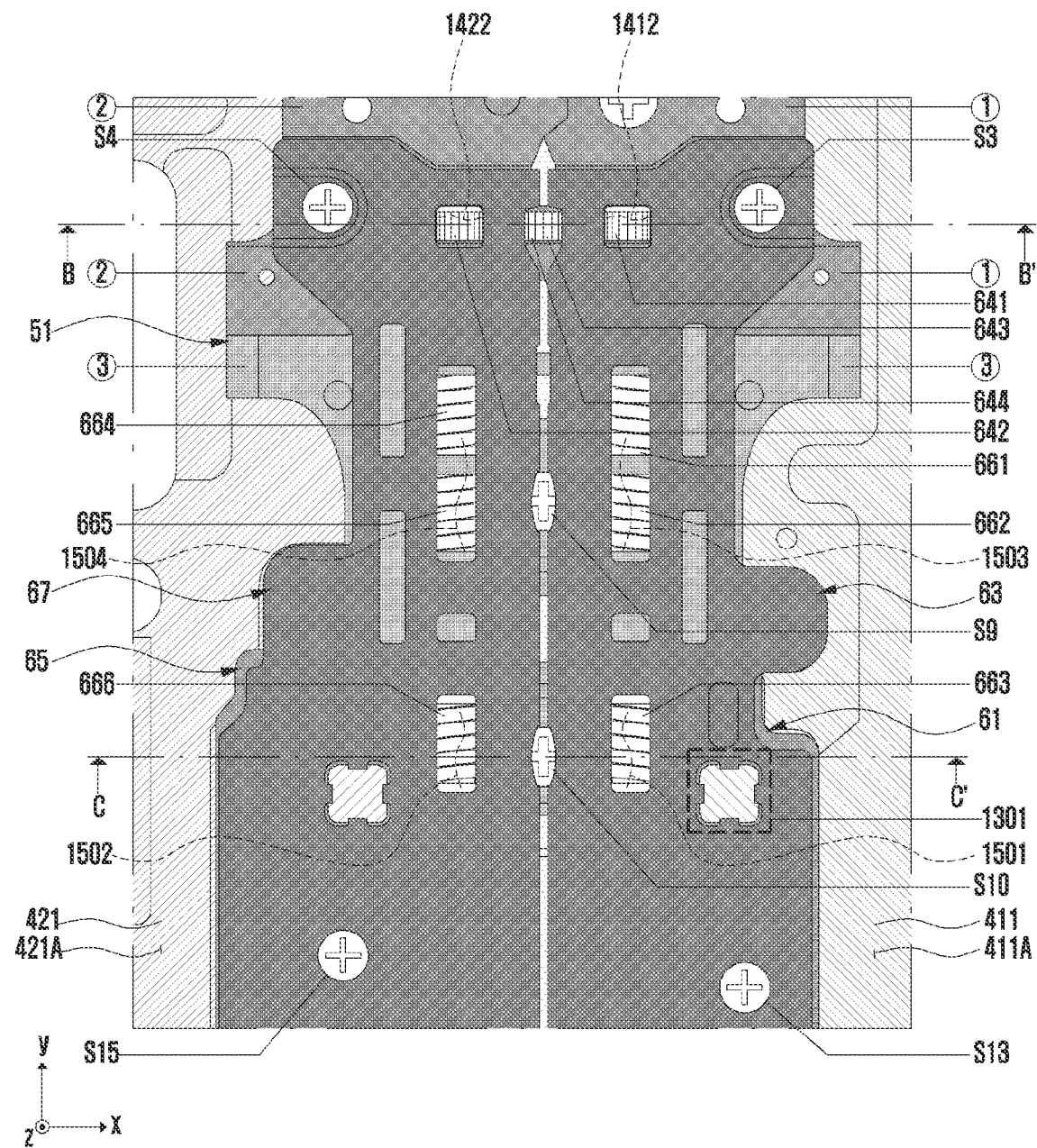
FIG. 13 is an enlarged view illustrating a portion indicated by the reference numeral '1201' in FIG. 12 according to an embodiment of the disclosure.
Figure 14:
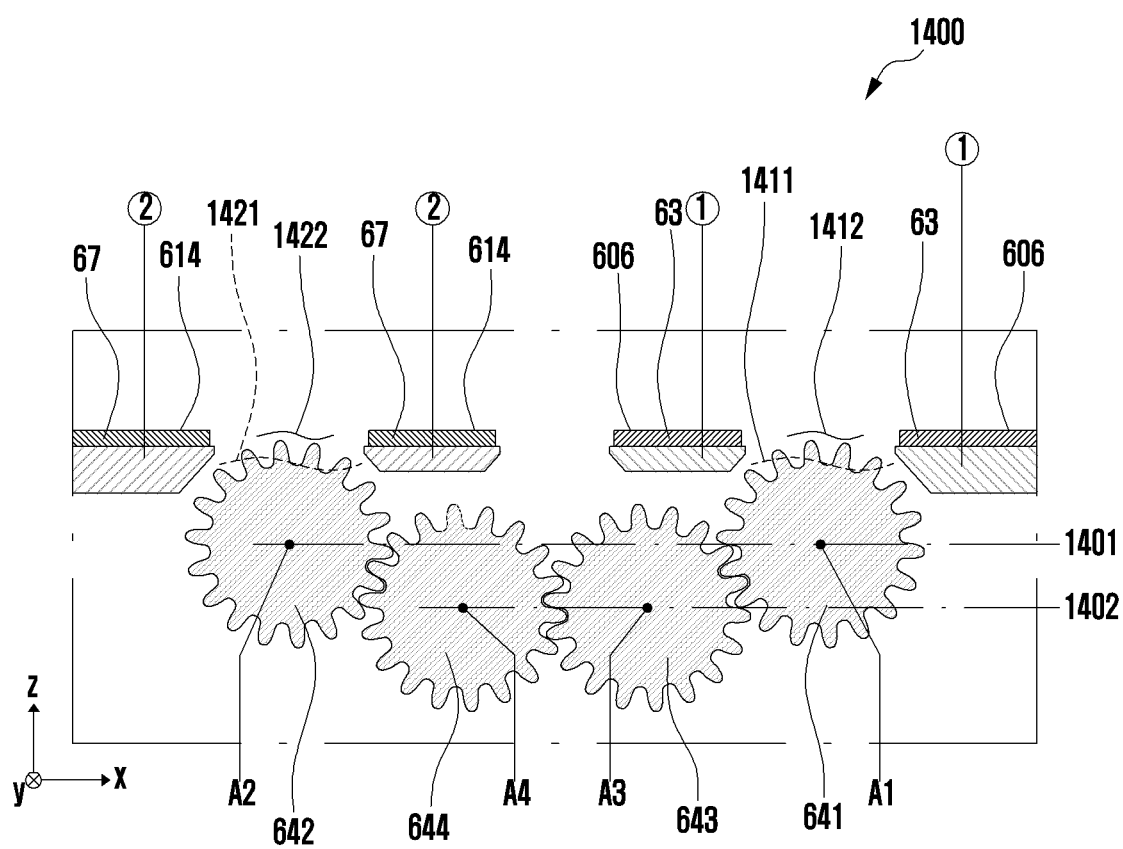
FIG. 14 is a cross-sectional view illustrating a portion of a third assembly taken along line B-B' in FIG. 13 according to an embodiment of the disclosure.
Figure 15:
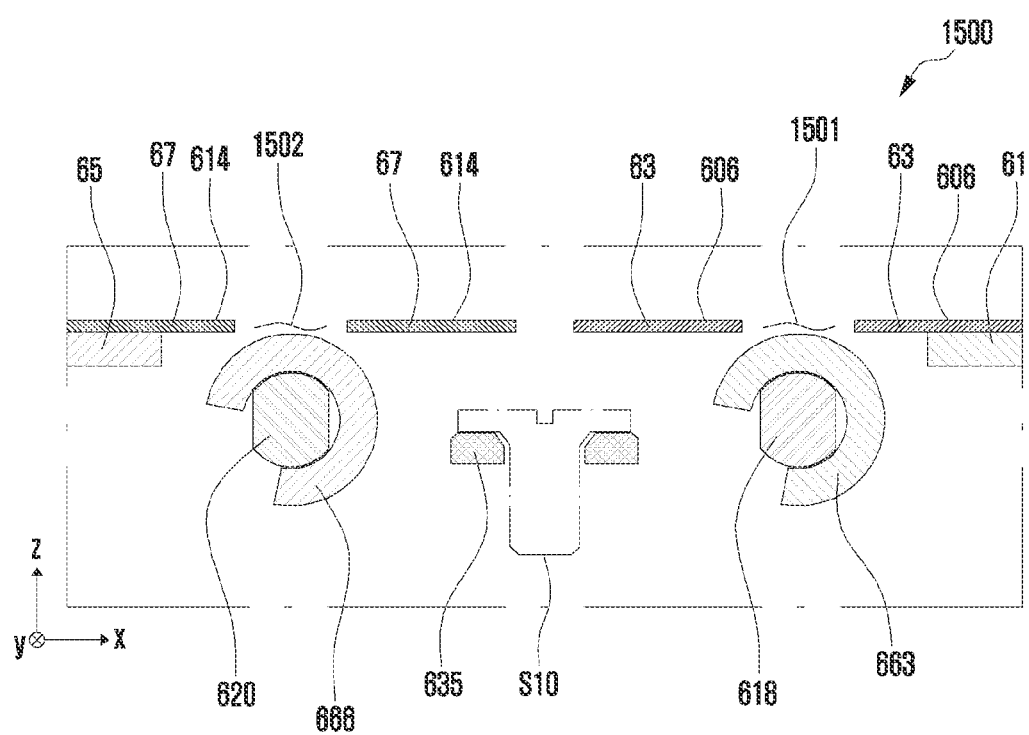
FIG. 15 is a cross-sectional view illustrating a portion of a third assembly taken along line C-C' in FIG. 13 according to an embodiment of the disclosure.

FIG. 13 is an enlarged view illustrating, for example, a portion indicated by the reference numeral '1201' in FIG. 12 according to an embodiment of the disclosure. FIG. 14 is a cross-sectional view 1400 illustrating a portion of a third assembly 1200 taken along line B-B' in FIG. 13 according to an embodiment of the disclosure. FIG. 15 is a cross-sectional view 1500 illustrating a portion of a third assembly 1200 taken along line C-C' in FIG. 13 according to an embodiment of the disclosure. It is to be understood as the disclosure envisages and includes all combinations of features and/or embodiments disclosed in relation to FIGS. 13, 14, and 15. That is, every combination of the features described below in relation to FIGS. 13, 14, and 15 should be considered as included in the disclosure as a specific example.

With reference to FIGS. 13 and 14, in an embodiment, a first rotational axis (e.g., first center axis A1) of the first circular gear 641 and a second rotational axis (e.g., second center axis A2) of the second circular gear 642 may be symmetrically positioned based on the folding axis A (see FIG. 12). The first circular gear 641 and the second circular gear 642 may have substantially the same shape. For example, the first circular gear 641 and the second circular gear 642 may have the same number of teeth. A third rotation axis A3 of the third circular gear 643 and a fourth rotation axis A4 of the fourth circular gear 644 may be symmetrically positioned based on the folding axis A (see FIG. 12). The third circular gear 643 and the fourth circular gear 644 may have substantially the same shape. For example, the third circular gear 643 and the fourth circular gear 644 may have the same number of teeth.

According to an embodiment, the third circular gear 643 and the fourth circular gear 644 may have substantially the same shape as that of the first circular gear 641 and the second circular gear 642. For example, the first circular gear 641, the second circular gear 642, the third circular gear 643, and the fourth circular gear 644 may have the same number of teeth.

According to some embodiments, the third circular gear 643 and the fourth circular gear 644 may have a different size from that of the first circular gear 641 and the second circular gear 642. For example, the third circular gear 643 and the fourth circular gear 644 are gears smaller than the first circular gear 641 and the second circular gear 642 and may have the number of teeth fewer than that of the first circular gear 641 and the second circular gear 642. For another example, the third circular gear 643 and the fourth circular gear 644 are gears larger than the first circular gear 641 and the second circular gear 642 and may have the number of teeth greater than that of the first circular gear 641 and the second circular gear 642.

According to an embodiment, an imaginary first straight line 1401 passing through the first rotation axis (e.g., the first central axis A1) of the first circular gear 641 and the second rotation axis (e.g., the second central axis A2) of the second circular gear 642 may be spaced apart from an imaginary second straight line 1402 passing through the third rotation axis A3 of the third circular gear 643 and the fourth rotation axis A4 of the fourth circular gear 644 and be substantially parallel to the imaginary second straight line 1402.

In an embodiment, with reference to the cross-sectional view 1400 of FIG. 14, in order for the first part ① and the third plate 63 of the first hinge assembly 51 not to interfere with the first circular gear 641, the first part ① may include an opening 1411 corresponding to the first circular gear 641, and the third plate 63 may include an opening 1412 aligned (or overlapped) with the opening 1411 of the first part ①. A portion of the first circular gear 641 may pass through the opening 1411 of the first part ⑦ to be positioned at the opening 1412 of the third plate 63. The first circular gear 641 may not be protruded from the sixth surface 606 of the third plate 63 so as to avoid interference with or pressurize the display assembly including the flexible display 30 (see FIG. 2). The opening 1411 of the first part ① and the opening 1412 of the third plate 63 may contribute to slimming of a structure in which the first hinge assembly 51, the first plate assembly 6A (see FIG. 4), and the second plate assembly 6B (see FIG. 4) are coupled.

In an embodiment, with reference to the cross-sectional view 1400 of FIG. 14, in order for the second part ② and the seventh plate 67 of the first hinge assembly 51 not to interfere with the second circular gear 642, the second part ② may include an opening 1421 corresponding to the second circular gear 642, and the seventh plate 67 may include an opening 1422 aligned (or overlapped) with the opening 1421 of the second part ②. A portion of the second circular gear 642 may pass through the opening 1421 of the second part ② to be positioned at the opening 1422 of the seventh plate 67. The second circular gear 642 may not be protruded from the fourteenth surface 614 of the seventh plate 67 so as to avoid interfere with or pressurize the display assembly including the flexible display 30 (see FIG. 2). The opening 1421 of the second part ② and the opening 1422 of the seventh plate 67 may contribute to slimming of a structure in which the first hinge assembly 51, the first plate assembly 6A (see FIG. 4), and the second plate assembly 6B (see FIG. 4) are coupled.

Although not illustrated, the fourth plate 64 and the fifth part ⑤ of the second hinge assembly 52 may include an opening so as not to interfere with a circular gear included in the second hinge assembly 52. Although not illustrated, the eighth plate 68 and the sixth part ⑥ of the second hinge assembly 52 may include an opening so as not to interfere with the circular gear included in the second hinge assembly 52.

With reference to FIGS. 13 and 15, in an embodiment, the fifth shaft support 635 may be positioned between the first shaft 618 and the second shaft 620. The fifth shaft support 635 may be coupled to the hinge housing 23 (see FIG. 4) using the tenth screw S10.

In an embodiment, with reference to the cross-sectional view 1500 of FIG. 15, the third plate 63 may include an opening 1501 corresponding to the third torsion spring 663. The opening 1501 of the third plate 63 may prevent the third plate 63 from interfering with the third torsion spring 663. In an embodiment, with reference to the cross-sectional view 1500 of FIG. 15, the seventh plate 67 may include an opening 1502 corresponding to the sixth torsion spring 666. The opening 1502 of the seventh plate 67 may prevent the seventh plate 67 from interfering with the sixth torsion spring 666.

According to an embodiment, the third plate 63 may include an opening 1503 (see FIG. 13) corresponding to the first torsion spring 661 and the second torsion spring 662. The opening 1503 of the third plate 63 may prevent the third plate 63 from interfering with the first torsion spring 661 and the second torsion spring 662. In an embodiment, the seventh plate 67 may include an opening 1504 (see FIG. 13) corresponding to the fourth torsion spring 664 and the fifth torsion spring 665. The opening 1504 of the seventh plate 67 may prevent the seventh plate 67 from interfering with the fourth torsion spring 664 and the fifth torsion spring 665.

According to an embodiment, the openings 1501 and 1503 of the third plate 63 and the openings 1502 and 1504 of the seventh plate 67 may contribute to slimming of a structure in which the first hinge assembly 51, the first plate assembly 6A (see FIG. 4), and the second plate assembly 6B (see FIG. 4) are coupled.

According to an embodiment, the first torsion spring 661, the second torsion spring 662, and the third torsion spring 663 may not be protruded from the sixth surface 606 of the third plate 63 so as not to interfere with or pressurize the display assembly including the flexible display 30 (see FIG. 2). The fourth torsion spring 664, the fifth torsion spring 665, and the sixth torsion spring 666 may not be protruded from the fourteenth surface 614 of the seventh plate 67 so as not to interfere with or pressurize the display assembly including the flexible display 30 (see FIG. 2).

Although not illustrated, the fourth plate 64 (see FIG. 12) may include an opening so as not to interfere with the torsion spring included in the second hinge assembly 52 (see FIG. 12). Although not illustrated, the eighth plate 68 (see FIG. 12) may include an opening so as not to interfere with the torsion spring included in the second hinge assembly 52 (see FIG. 12).

Figure 16:
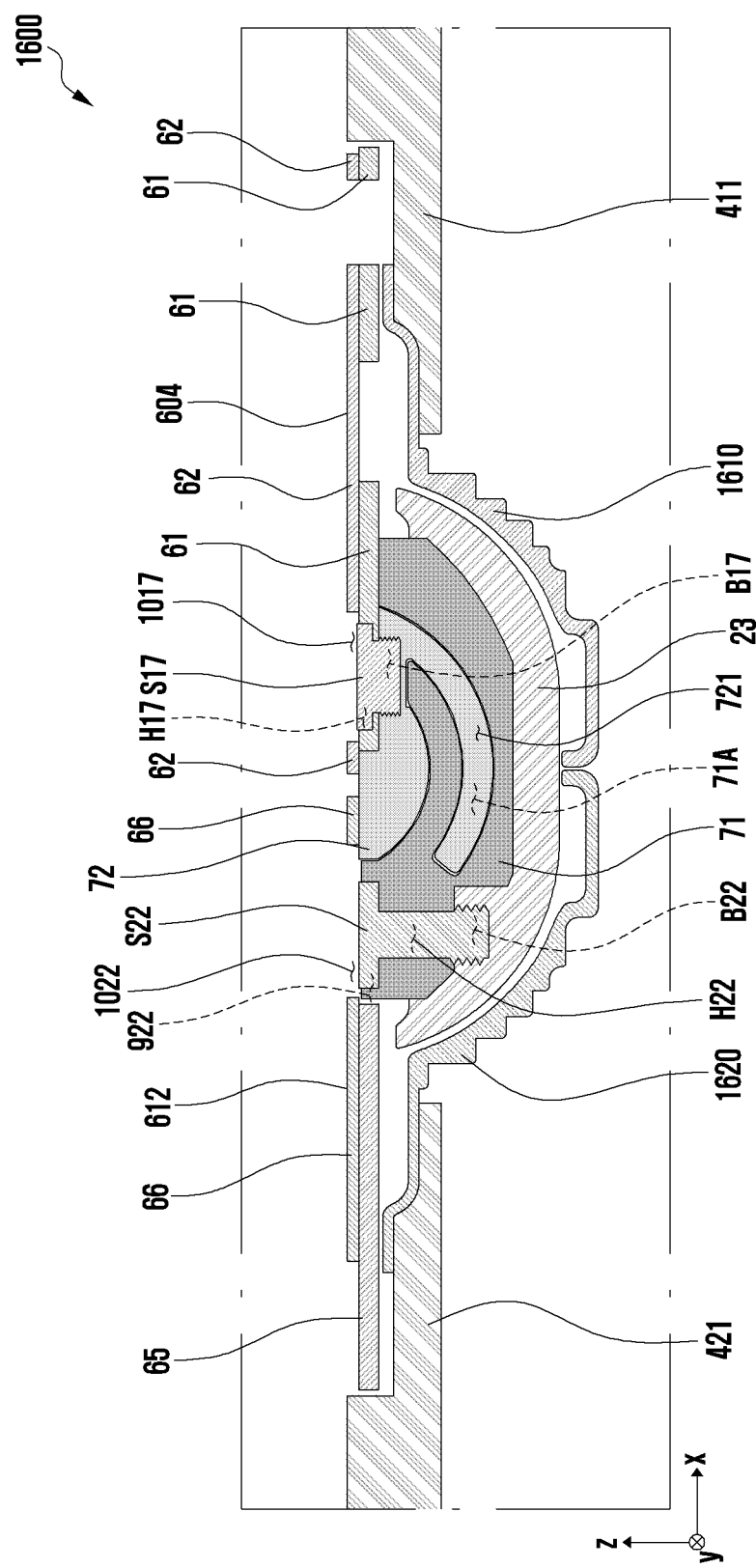
FIG. 16 is a cross-sectional view taken along line D-D' in FIG. 12 according to an embodiment of the disclosure.
Figure 17:
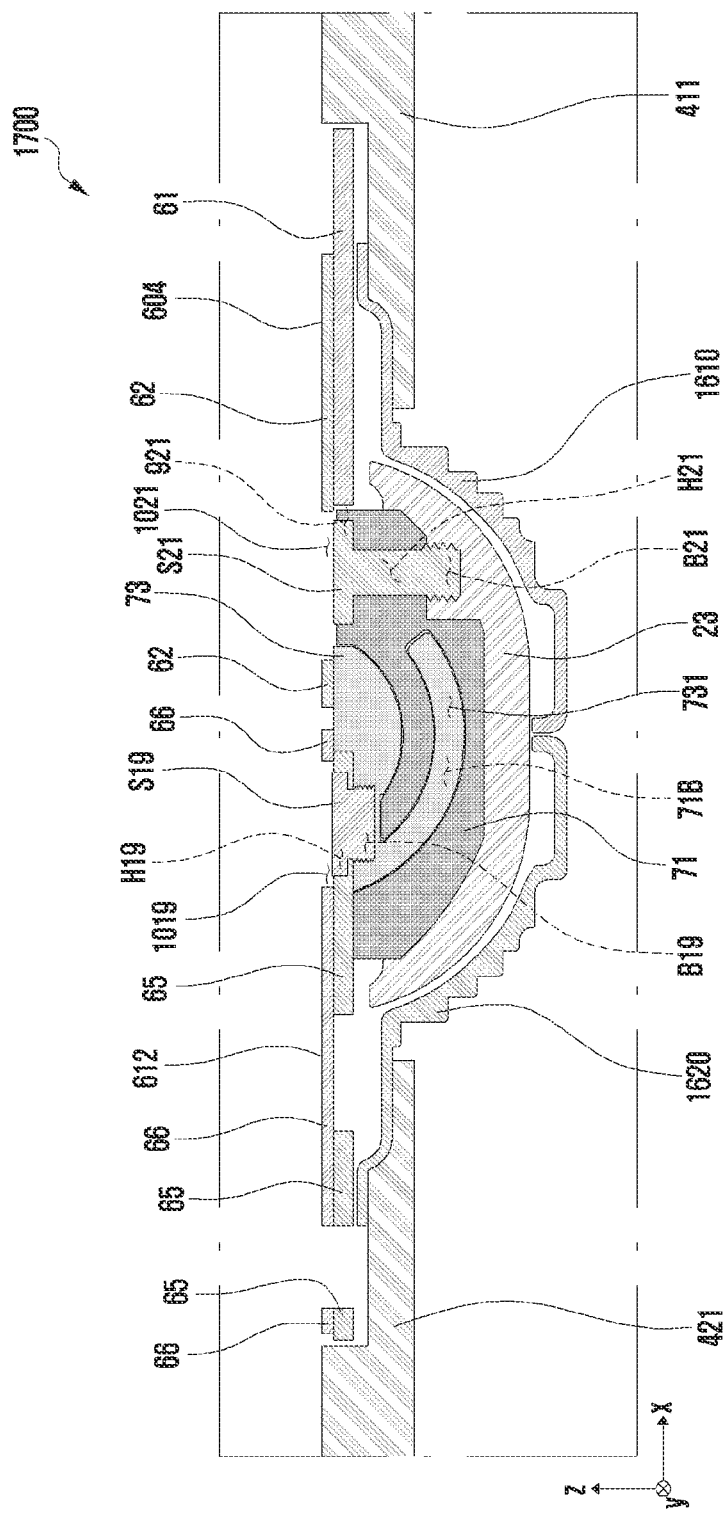
FIG. 17 is a cross-sectional view taken along line E-E' in FIG. 12 according to an embodiment of the disclosure.

FIG. 16 is a cross-sectional view 1600 taken along line D-D' in FIG. 12 according to an embodiment of the disclosure. FIG. 17 is a cross-sectional view 1700 taken along line E-E' in FIG. 12 according to an embodiment of the disclosure. It is to be understood as the disclosure envisages and includes all combinations of features and/or embodiments disclosed in relation to FIGS. 16 and 17. That is, every combination of the features described below in relation to FIGS. 16 and 17 should be considered as included in the disclosure as a specific example.

With reference to FIGS. 16 and 17, the electronic device 2 may include a first support structure 411, a second support structure 421, a first plate 61, a second plate 62, a fifth plate 65, a sixth plate 66, a guide rail structure 71, a first slider structure 72, a second slider structure 73, a seventeenth screw S17, a nineteenth screw S19, a twenty-first screw S21, a twenty-second screw S22, a first cover member 1610, and/or a second cover member 1620.

According to an embodiment, the guide rail structure 71 and the first slider structure 72, and the guide rail structure 71 and the second slider structure 73 may be sliding pairs. The first slider structure 72 and the second slider structure 73 may be slidably disposed in the guide rail structure 71. The guide rail structure 71 may be coupled to the hinge housing 23 using the twenty-first screw S21 and the twenty-second screw S22. The guide rail structure 71 may include a twenty-first screw hole H21 corresponding to the twenty-first screw S21, and the hinge housing 23 may include a twenty-first screw fastening part B21 (e.g., a twenty-first boss including a female screw) aligned with the twenty-first screw hole H21. The twenty-first screw S21 may penetrate the twenty-first screw hole H21 to be coupled to the twenty-first screw fastening part B21. The guide rail structure 71 may include a twenty-second screw hole H22 corresponding to the twenty-second screw S22, and the hinge housing 23 may include a twenty-second screw fastening part B22 (e.g., a twenty-second boss including a female screw) aligned with the twenty-second screw hole H22. The twenty-second screw S22 may penetrate the twenty-second screw hole H22 to be coupled to the twenty-second screw fastening part B22. The first plate 61 may be coupled to the first slider structure 72 using the seventeenth screw S17. The first slider structure 72 may include a seventeenth screw fastening part B17 (e.g., a seventeenth boss including a female screw) aligned with the seventeenth screw hole H17 of the first plate 61. The seventeenth screw S17 may penetrate the seventeenth screw hole H17 to be coupled to the seventeenth screw fastening part B17. The fifth plate 65 may be coupled to the second slider structure 73 using the nineteenth screw S19. The second slider structure 73 may include a nineteenth screw fastening part B19 (e.g., a nineteenth boss including a female screw) aligned with the nineteenth screw hole H19 of the fifth plate 65. The nineteenth screw S19 may penetrate the nineteenth screw hole H19 to be coupled to the nineteenth screw fastening part B19.

According to an embodiment, the seventeenth screw S17, and a portion of the first plate 61 overlapped with the opening 1017 of the second plate 62 may be disposed not to protrude from the fourth surface 604 of the second plate 62 so as not to interfere with or pressurize the display assembly including the flexible display 30 (see FIG. 2).

According to an embodiment, the twenty-first screw S21, and a portion of the guide rail structure 71 overlapped with the opening 1021 of the second plate 62 may be disposed not to protrude from the fourth surface 604 of the second plate 62 so as not to interfere with or pressurize the display assembly including the flexible display 30 (see FIG. 2).

According to an embodiment, the nineteenth screw S19, and a portion of the fifth plate 65 overlapped with the opening 1019 of the sixth plate 66 may be disposed not to protrude from the twelfth surface 612 of the sixth plate 66 so as not to interfere with or pressurize the display assembly including the flexible display 30 (see FIG. 2).

According to an embodiment, the twenty-second screw S22, and a portion of the guide rail structure 71 overlapped with the opening 1022 of the sixth plate 66 may be disposed so as not to protrude from the twelfth surface 612 of the sixth plate 66 so as not to interfere with or pressurize the display assembly including the flexible display 30 (see FIG. 2).

According to an embodiment, the guide rail structure 71 may include a first guide rail 71A and a second guide rail 71B. The first guide rail 71A may be a space provided along a path corresponding to a rotational motion of the first front case 41 (see FIG. 8) coupled with the first plate assembly 6A (see FIG. 4) coupled with the first slider structure 72. The second guide rail 71B may be a space provided along a path corresponding to a rotational motion of the second front case 42 (see FIG. 8) coupled with the second plate assembly 6B (see FIG. 4) coupled with the second slider structure 73. The first slider structure 72 may include a first slider 721 inserted into the first guide rail 71A of the guide rail structure 71 and movable by being guided to the first guide rail 71A. The second slider structure 73 may include a second slider 731 inserted into the second guide rail 71B of the guide rail structure 71 and movable by being guided to the second guide rail 71B. Because the first slider structure 72 is coupled to the first plate 61 of the first plate assembly 6A (see FIG. 4), the first slider structure 72 may be rotationally movable together with the first plate assembly 6A coupled to the first front case 41. Because the second slider structure 73 is coupled to the fifth plate 65 of the second plate assembly 6B (see FIG. 4), the second slider structure 73 may be rotationally movable together with the second plate assembly 6B coupled to the second front case 42. In an embodiment, the guide rail assembly 7 (see FIG. 4) including the guide rail structure 71, the first slider structure 72, and the second slider structure 73 may be positioned between the first hinge assembly 51 and the second hinge assembly 52. The guide rail assembly 7 may reduce a lifting phenomenon of the first plate assembly 6A (see FIG. 4) and the second plate assembly 6B (see FIG. 4).

According to an embodiment, the first cover member 1610 may be connected to the first support structure 411. In some embodiments, the first cover member 1610 may be integrally formed with the first support structure 411. The second cover member 1620 may be connected to the second support structure 421. In some embodiments, the second cover member 1620 may be integrally formed with the second support structure 421. In some embodiments, the first cover member 1610 may be interpreted as part of the first front case 41 (see FIG. 4), and the second cover member 1620 may be interpreted as part of the second front case 42 (see FIG. 4). One surface of the hinge housing 23 exposed to the outside in the folded state (see FIG. 3) of the electronic device 2 may include a curved surface, and the first cover member 1610 and the second cover member 1620 may be provided in a curved shape including a curved portion corresponding to the curved surface. In some embodiments, the first cover member 1610 may be referred to as various other terms, such as a 'first curved member' or a 'first curved surface', and the second cover member 1620 may be referred to as various other terms, such as a 'second curved member' or a 'second curved cover'. In the unfolded state (see FIG. 2) of the electronic device 2, the first cover member 1610 and the second cover member 1620 may cover both sides of the hinge housing 23, respectively, and the hinge housing 23 may not be substantially exposed to the outside. In the folded state (see FIG. 3) of the electronic device 2, the hinge housing 23 may be exposed to the outside between the first cover member 1610 and the second cover member 1620. In some embodiments, the first cover member 1610 may be interpreted as part of the first housing 21 (see FIG. 2), and the second cover member 1620 may be interpreted as part of the second housing 22 (see FIG. 2). In some embodiments, the first cover member 1610 and the second cover member 1620 may be interpreted as part of the folding part of the foldable housing 20 (see FIG. 2).

Figure 18:
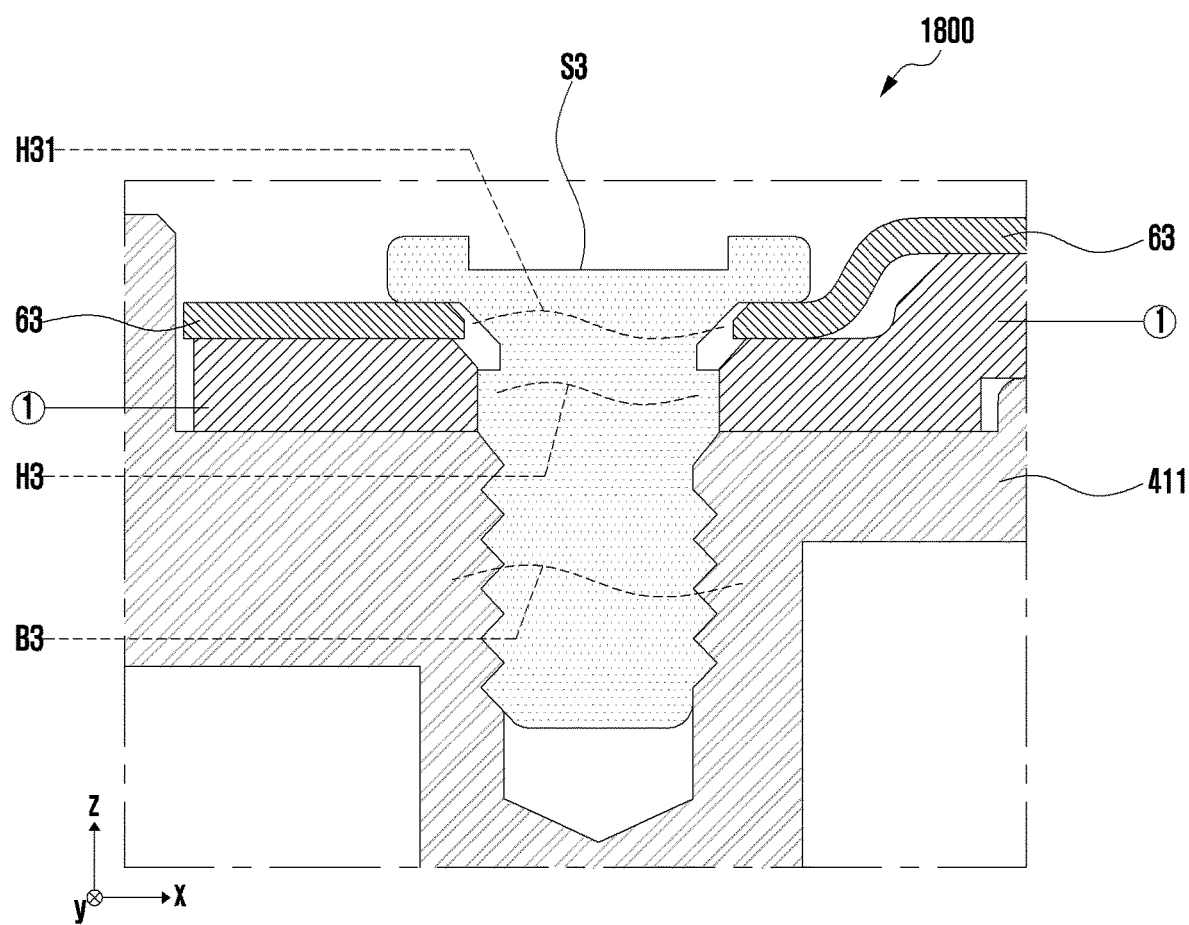
FIG. 18 is a cross-sectional view illustrating a third plate, a first part of a first hinge assembly, a first support structure, and a third screw in FIG. 12 according to an embodiment of the disclosure.

FIG. 18 is a cross-sectional view 1800 illustrating a third plate 63, a first part ① of a first hinge assembly 51, a first support structure 411, and a third screw S3 in FIG. 12 according to an embodiment of the disclosure. It is to be understood as the disclosure envisages and includes all combinations of features and/or embodiments disclosed in relation to FIG. 18. That is, every combination of the features described below in relation to FIG. 18 should be considered as included in the disclosure as a specific example.

With reference to FIG. 18, in an embodiment, the third plate 63, the first part ① of the first hinge assembly 51, and the first support structure 411 may be coupled using a third screw S3. The first part ① may include a third screw hole H3 corresponding to the third screw S3. The third plate 63 may include a screw hole H31 aligned (or overlapped) with the third screw hole H3. The first support structure 411 may include a third screw fastening part B3 (e.g., a third boss including a female screw) corresponding to the third screw S3. The third screw hole H3 of the first part ① may be positioned between the screw hole H31 of the third plate 63 and the third screw fastening part B3 of the first support structure 411. The third screw S3 may penetrate the screw hole H31 of the third plate 63 and the third screw hole H3 of the first part ① to be coupled to the third screw fastening part B3.

According to an embodiment, the third screw S3, a portion of the third plate 63 including the screw hole H31, and a portion including the third screw hole H3 in the first part ① of the first hinge assembly 51 may be disposed not to interfere with or pressurize the display assembly including the flexible display 30 (see FIG. 2). For example, a coupling portion including the third screw S3, a portion provided with a screw hole H31 in the third plate 63, and a portion provided with a third screw hole H3 in the first part ① of the first hinge assembly 51 may be disposed in a recessed form with respect to a peripheral area so as not to interfere with or pressurize the display assembly including the flexible display 30. The peripheral area may be interpreted as, for example, a portion adjacent to the coupling portion including a third screw S3 in an area supporting the rear surface of the display assembly of the third assembly 1200 of FIG. 12, a portion provided with a screw hole H31 in the third plate 63, and a portion provided with the third screw hole H3 in the first part ① of the first hinge assembly 51 and enclosing at least partially the coupling portion.

Although not illustrated, a cross-sectional structure illustrating the seventh plate 67, the second part ② of the first hinge assembly 51, the second support structure 421, and the fourth screw S4 in FIG. 12 may be provided substantially the same as or similar to the cross-sectional view 1800 of FIG. 18.

Although not illustrated, a cross-sectional structure illustrating the fourth plate 64, the fifth part ⑤ of the second hinge assembly 52, the first support structure 411, and the seventh screw S7 in FIG. 12 may be provided substantially the same as or similar to the cross-sectional view 1800 of FIG. 18.

Although not illustrated, a cross-sectional structure illustrating the eighth plate 68, the sixth part ⑥ of the second hinge assembly 52, the second support structure 421, and the eighth screw S8 in FIG. 12 may be provided substantially the same as or similar to the cross-sectional view 1800 of FIG. 18.

Figure 19:
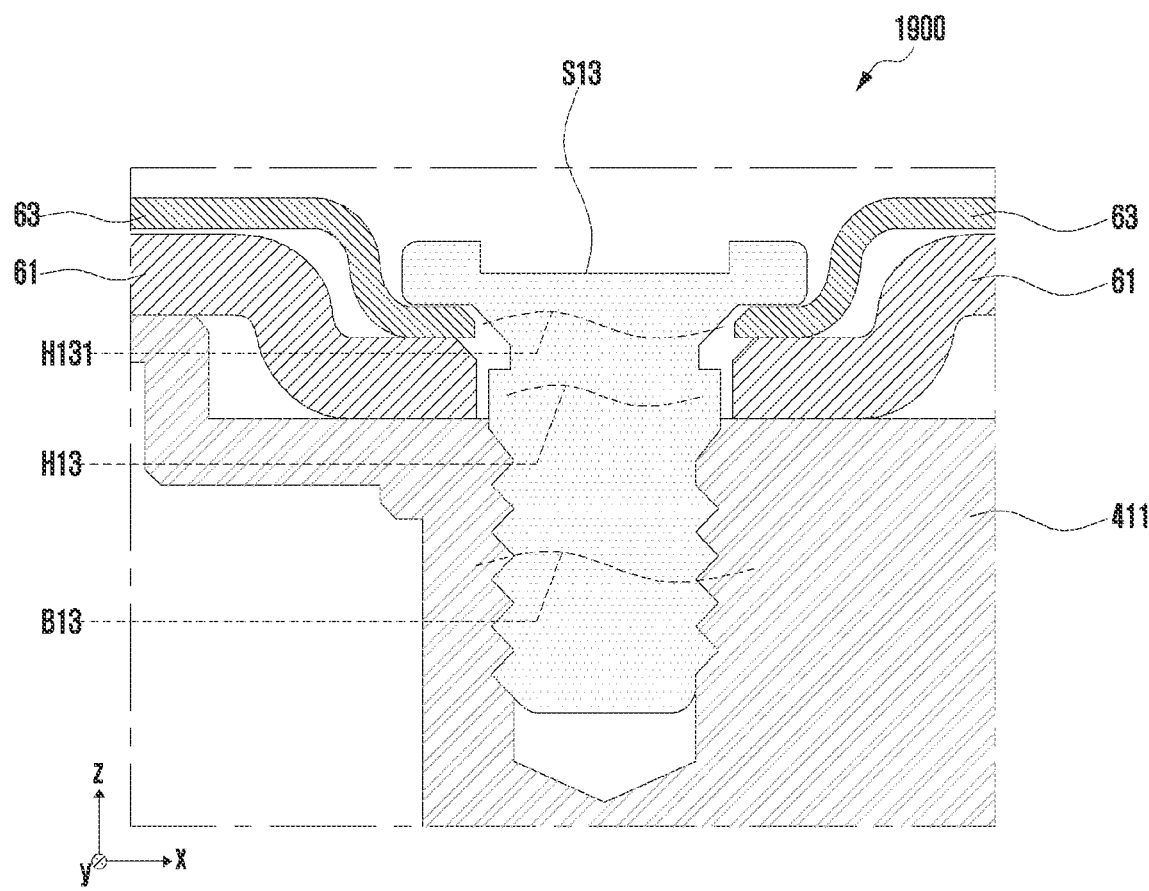
FIG. 19 is a cross-sectional view illustrating a third plate, a first plate, a first support structure, and a thirteenth screw in FIG. 12 according to an embodiment of the disclosure.

FIG. 19 is a cross-sectional view 1900 illustrating a third plate 63, a first plate 61, a first support structure 411, and a thirteenth screw S13 in FIG. 12 according to an embodiment of the disclosure. It is to be understood as the disclosure envisages and includes all combinations of features and/or embodiments disclosed in relation to FIG. 19. That is, every combination of the features described below in relation to FIG. 19 should be considered as included in the disclosure as a specific example.

With reference to FIG. 19, in an embodiment, the third plate 63, the first plate 61, and the first support structure 411 may be coupled using a thirteenth screw S13. The first plate 61 may include a thirteenth screw hole H13 corresponding to the thirteenth screw S13. The third plate 63 may include a screw hole H131 aligned (or overlapped) with the thirteenth screw hole H13. The first support structure 411 may include a thirteenth screw fastening part B13 (e.g., a thirteenth boss including a female screw) corresponding to the thirteenth screw S13. The thirteenth screw hole H13 of the first plate 61 may be positioned between the screw hole H131 of the third plate 63 and the thirteenth screw fastening part B13 of the first support structure 411. The thirteenth screw S13 may penetrate the screw hole H131 of the third plate 63 and the thirteenth screw hole H13 of the first plate 61 to be coupled to the thirteenth screw fastening part B13.

According to an embodiment, the thirteenth screw S13, a portion of the third plate 63 including the screw hole H131, and a portion of the first plate 61 including the thirteenth screw hole H13 may be disposed not to interfere with or pressurize the display assembly including the flexible display 30 (see FIG. 2). For example, a coupling portion including the thirteenth screw S13, a portion of the third plate 63 in which a screw hole H131 is provided, and a portion of the first plate 61 in which a thirteenth screw hole H13 is provided may be disposed in a recessed form with respect to a peripheral area so as not to interfere with or pressurize the display assembly including the flexible display 30. The peripheral area may be interpreted as, for example, a portion adjacent to the coupling portion including the thirteenth screw S13 in an area supporting the rear surface of the display assembly of the third assembly 1200 of FIG. 12, a portion of the third plate 63 in which the screw hole H131 is provided, and a portion of the first plate 61 in which the thirteenth screw hole H13 is provided and enclosing at least partially the coupling portion.

Although not illustrated, a cross-sectional structure representing the seventh plate 67, the fifth plate 65, and the second support structure 421, and the fifteenth screw S15 in FIG. 12 may be provided substantially the same as or similar to the cross-sectional view 1900 of FIG. 19.

Although not illustrated, a cross-sectional structure representing the fourth plate 64, the first plate 61, the first support structure 411, and the fourteenth screw S14 in FIG. 12 may be provided substantially the same as or similar to the cross-sectional view 1900 of FIG. 19.

Although not illustrated, a cross-sectional structure representing the eighth plate 68, the fifth plate 65, the second support structure 421, and the sixteenth screw S16 in FIG. 12 may be provided substantially the same as or similar to the cross-sectional view 1900 of FIG. 19.

Figure 20:
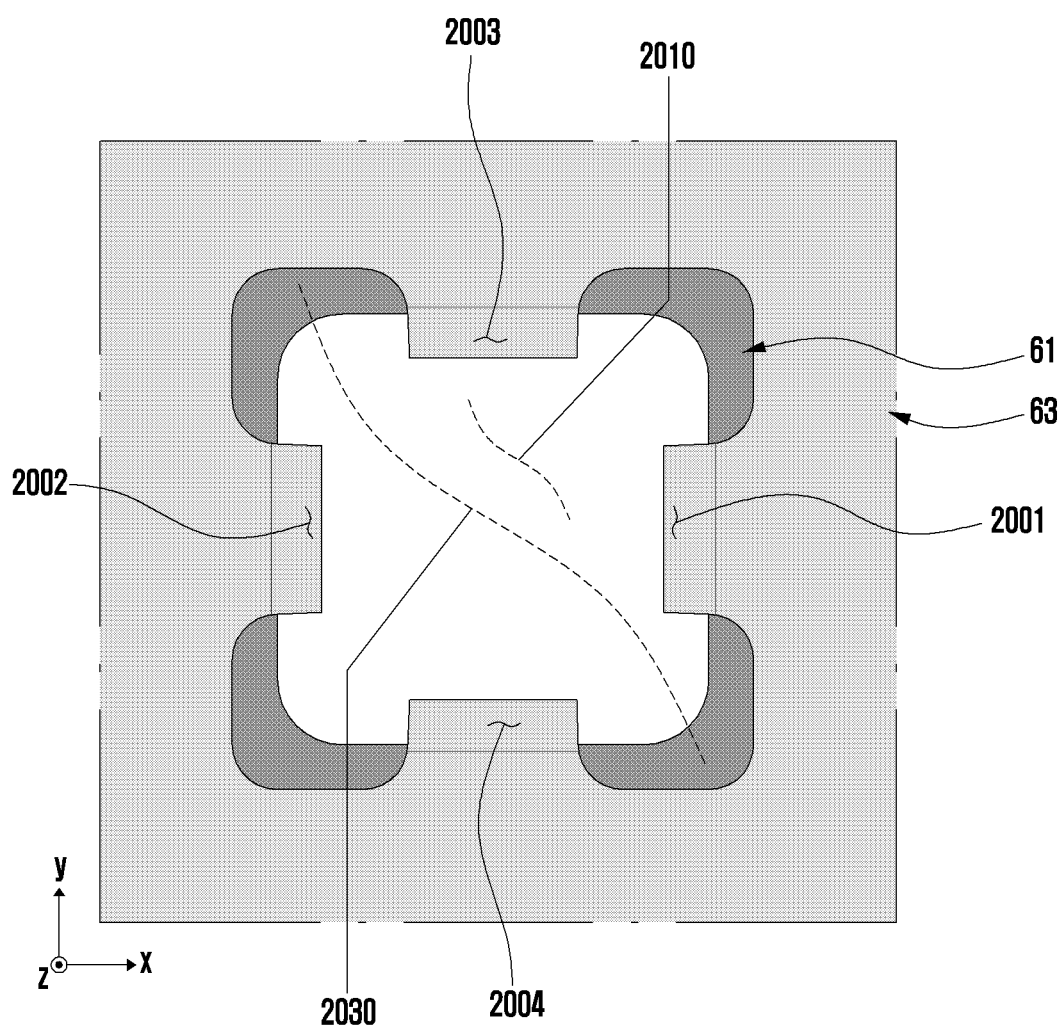
FIG. 20 is an enlarged view illustrating a portion indicated by the reference numeral '1301' in FIG. 13 according to an embodiment of the disclosure.
Figure 21:
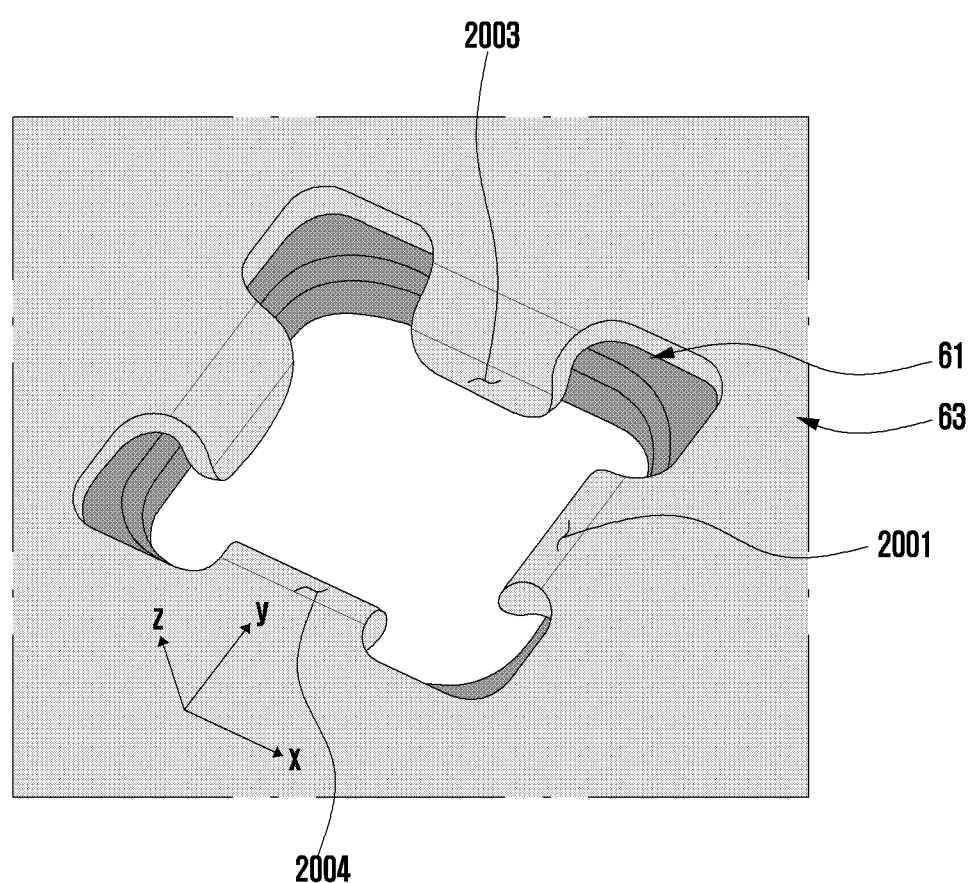
FIG. 21 is a perspective view illustrating a first plate and a third plate in relation to FIG. 20 according to an embodiment of the disclosure.
Figure 22:
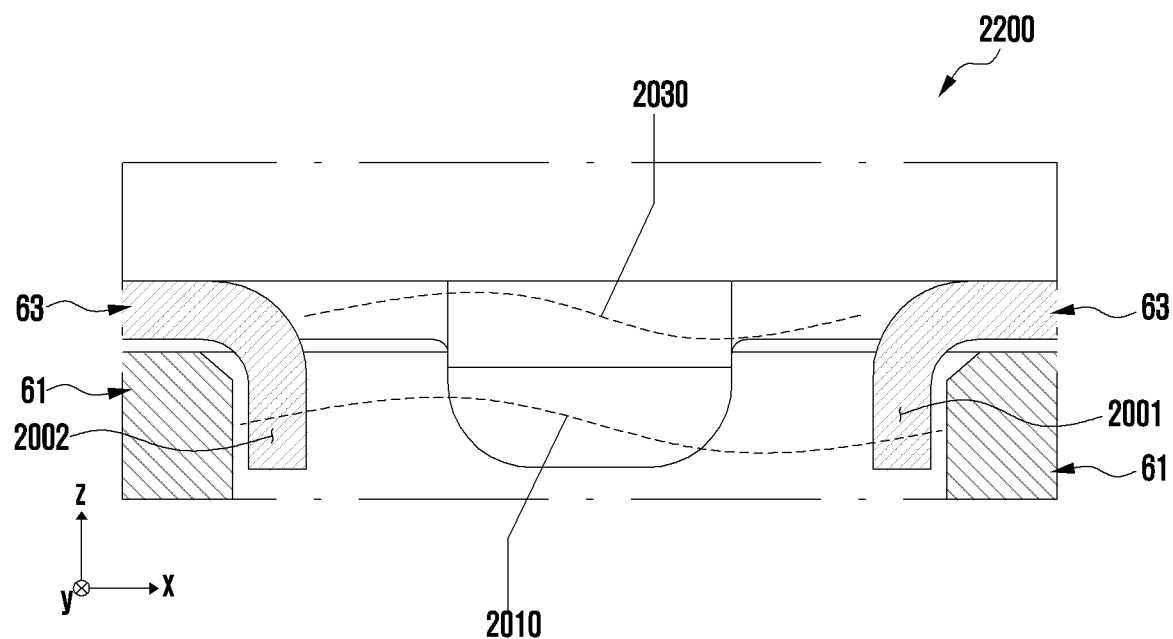
FIG. 22 is a cross-sectional view illustrating a first plate and a third plate in relation to FIG. 20 according to an embodiment of the disclosure.
Figure 23:
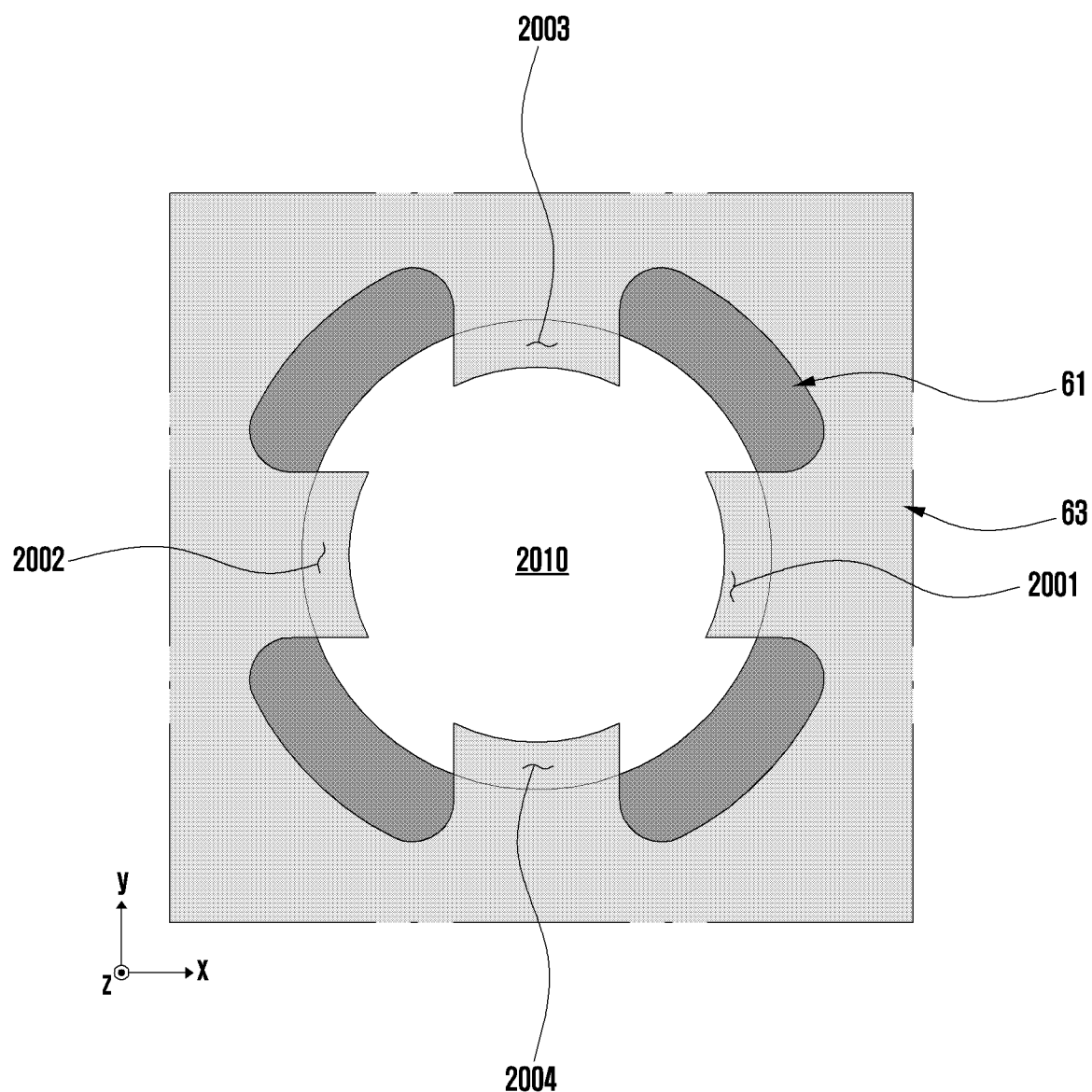
FIG. 23 is a diagram illustrating another coupling structure between a first plate and a third plate according to another embodiment of the disclosure.

FIG. 20 is an enlarged view illustrating, for example, a portion indicated by the reference numeral '1301' in FIG. 13 according to an embodiment of the disclosure. FIG. 21 is a perspective view illustrating, for example, a first plate 61 and a third plate 63 in relation to FIG. 20 according to an embodiment of the disclosure. FIG. 22 is a cross-sectional view 2200 illustrating a first plate 61 and a third plate 63 in relation to FIG. 20 according to an embodiment of the disclosure. FIG. 23 is a diagram illustrating another coupling structure between a first plate 61 and a third plate 63 according to another embodiment of the disclosure. It is to be understood as the disclosure envisages and includes all combinations of features and/or embodiments disclosed in relation to FIGS. 20, 21, 22, and 23. That is, every combination of the features described below in relation to FIGS. 20, 21, 22, and 23 should be considered as included in the disclosure as a specific example.

With reference to FIGS. 20, 21, and 22, the first plate 61 may include an opening 2010, and the third plate 63 may include an opening 2030 aligned (or overlapped) with the opening 2010 of the first plate 61. In an embodiment, the third plate 63 may include a plurality of extension parts 2001, 2002, 2003, and 2004 extended from an edge of the opening 2030 to be inserted into the opening 2010 of the first plate 61. The plurality of extension parts 2001, 2002, 2003, and 2004 may support the first plate 61 and contribute to stably coupling the first plate 61 and the third plate 63 in a designated relative positional relationship.

According to an embodiment, the opening 2010 of the first plate 61 may be a rectangle, and the first plate 61 may include four inner side surfaces included in the opening 2010. The plurality of extension parts 2001, 2002, 2003, and 2004 of the third plate 63 may be positioned to correspond in one-to-one to four inner side surfaces of the first plate 61.

According to an embodiment, a coupling structure between the first plate 61 and the third plate 63 described with reference to FIGS. 20, 21, and 22 may be applied to a coupling structure between the first plate 61 and the fourth plate 64 (see FIG. 12), a coupling structure between the fifth plate 65 (see FIG. 12) and the seventh plate 67, and/or a coupling structure between the fifth plate 65 and the eighth plate 68 (see FIG. 12).

According to some embodiments, a coupling structure between the first plate 61 and the third plate 63 described with reference to FIGS. 20, 21, and 22 may be applied to a coupling structure between the first plate 61 and the second plate 62 (see FIG. 12), and/or a coupling structure between the fifth plate 65 (see FIG. 12) and the sixth plate 66 (see FIG. 12).

According to some embodiments, a coupling structure between the first plate 61 and the third plate 63 described with reference to FIGS. 20, 21, and 22 may be applied to a coupling structure between the first part ①(see FIG. 12) of the first hinge assembly 51 and the third plate 63, and/or a coupling structure between the second part ②(see FIG. 12) of the first hinge assembly 51 and the seventh plate 67 (see FIG. 12).

According to some embodiments, a coupling structure between the first plate 61 and the third plate 63 described with reference to FIGS. 20, 21, and 22 may be applied to a coupling structure between the fifth part ⑤(see FIG. 12) of the second hinge assembly 52 and the fourth plate 64 (see FIG. 12), and/or a coupling structure between the sixth part ⑥(see FIG. 12) of the second hinge assembly 52 and the eighth plate 68 (see FIG. 12).

According to some embodiments, a coupling structure between the first plate 61 and the third plate 63 described with reference to FIGS. 20, 21, and 22 may be applied to a coupling structure between the third part ③(see FIG. 12) of the first hinge assembly 51 and the third plate 63, and/or a coupling structure between the fourth part ④(see FIG. 12) of the first hinge assembly 51 and the seventh plate 67 (see FIG. 12).

According to some embodiments, a coupling structure between the first plate 61 and the third plate 63 described with reference to FIGS. 20, 21, and 22 may be applied to a coupling structure between the seventh part ⑦(see FIG. 12) of the second hinge assembly 52 and the fourth plate 64 (see FIG. 12), and/or a coupling structure between the eighth part ⑧(see FIG. 12) of the second hinge assembly 52 and the eighth plate 68 (see FIG. 12).

With reference to FIG. 23, in another embodiment, the opening 2010 of the first plate 61 may be a circle, and the first plate 61 may include a circular inner side surface included in the opening 2010. A plurality of extension parts 2001, 2002, 2003, and 2004 of the third plate 63 may be positioned to correspond to circular inner side surface of the first plate 61. A coupling structure between the first plate 61 and the third plate 63 is not limited to the illustrated example and may vary. For example, the opening 2010 of the first plate 61 may be provided in an oval or various polygons such as a triangle, and the second plate 62 may include a plurality of extension parts corresponding thereto.

Figure 24:
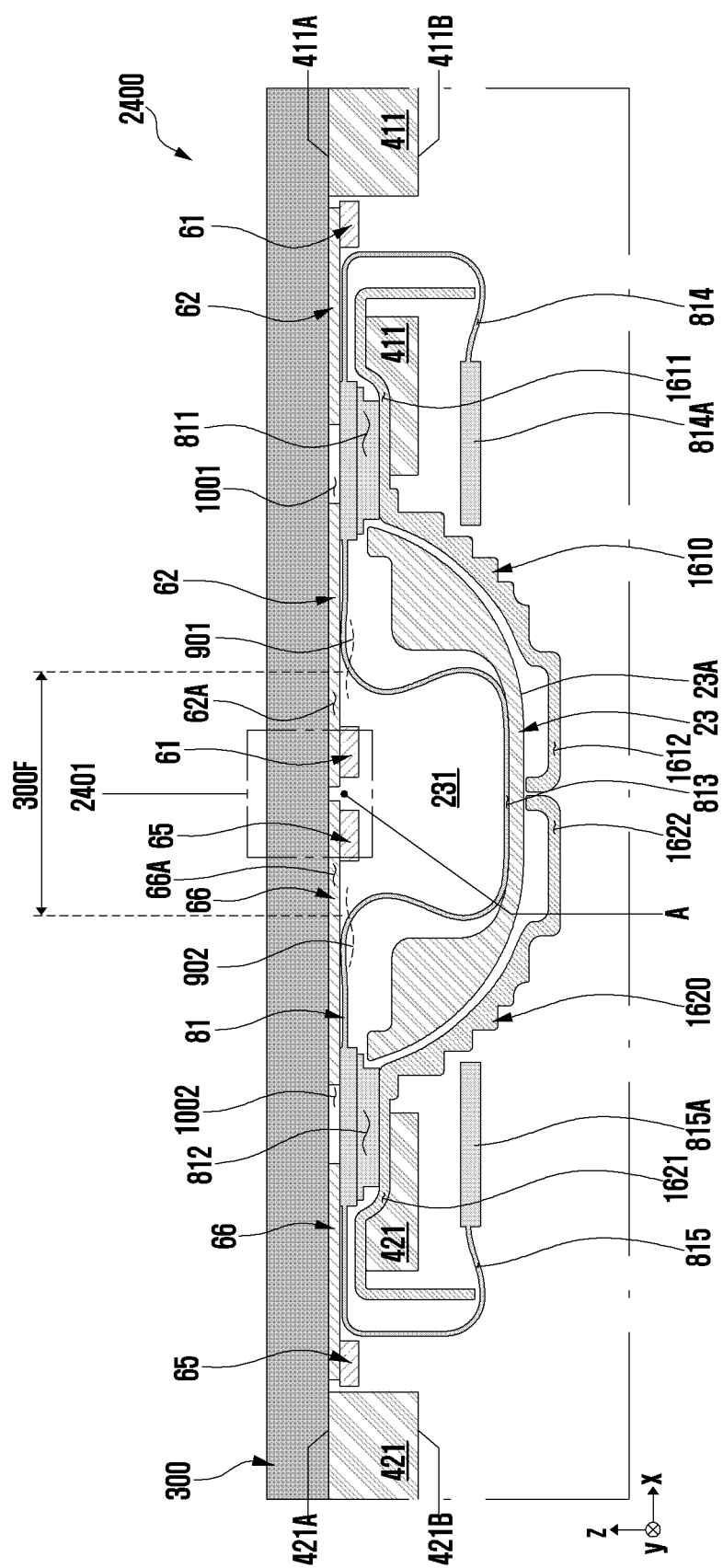
FIG. 24 is a cross-sectional view illustrating an electronic device in an unfolded state taken along line G-G' in FIG. 2 according to an embodiment of the disclosure.
Figure 25:
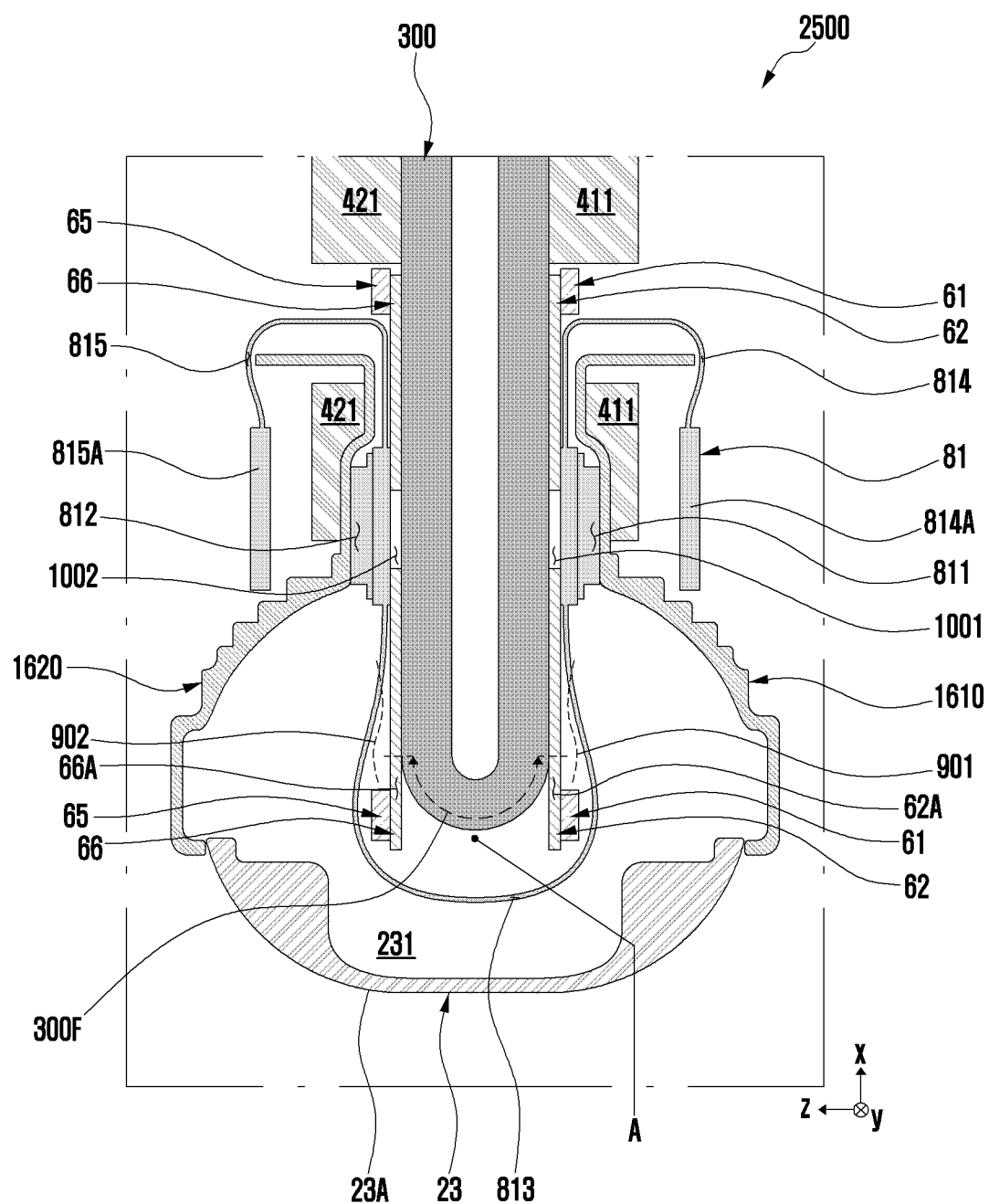
FIG. 25 is a cross-sectional view illustrating the electronic device of FIG. 24 in a folded state according to an embodiment of the disclosure.

FIG. 24 is a cross-sectional view 2400 illustrating an electronic device 2 in an unfolded state taken along line G-G' in FIG. 2 according to an embodiment of the disclosure. FIG. 25 is a cross-sectional view 2500 illustrating an electronic device 2 in a folded state in relation to an example of FIG. 24 according to an embodiment of the disclosure. It is to be understood as the disclosure envisages and includes all combinations of features and/or embodiments disclosed in relation to FIGS. 24 and 25. That is, every combination of the features described below in relation to FIGS. 24 and 25 should be considered as included in the disclosure as a specific example.

With reference to FIGS. 24 and 25, the electronic device 2 may include a display assembly 300, a first support structure 411, a second support structure 421, a first cover member 1610, a second cover member 1620, a hinge housing 23, a first electrical path 81, a first plate 61, a second plate 62, a fifth plate 65, and/or a sixth plate 66.

According to an embodiment, the display assembly 300 may be a layer stacked structure or a layer assembly in which a plurality of layers including the flexible display 30 (see FIG. 2) are stacked.

According to an embodiment, the first support structure 411 may include a first support area 411A facing the front surface 20A (see FIG. 2) of the electronic device 2 and a third support area 411B facing the rear surface 20B (see FIG. 2) of the electronic device 2. The second support structure 421 may include a second support area 421A facing the front surface 20A (see FIG. 2) of the electronic device 2 and a fourth support area 421B facing the rear surface 20B (see FIG. 2) of the electronic device 2. A portion of the display assembly 300 may be disposed in the first support area 411A of the first support structure 411 to be supported by the first support structure 411. Another portion of the display assembly 300 may be disposed in a second support area 421A of the second support structure 421 to be supported by the second support structure 421. For example, the display assembly 300 may be coupled to the first support structure 411 and the second support structure 421 using various adhesive materials such as a heat reaction adhesive material, a photoreaction adhesive material, a general adhesive and/or a double-sided tape.

According to an embodiment, the first plate 61 and the second plate 62 coupled to the first support structure 411, and the fifth plate 65 and the sixth plate 66 coupled to the second support structure 421 may support a partial area of the display assembly 300 corresponding to the folding cover area F (see FIG. 2) in an unfolded state (see FIG. 2) of the electronic device 2.

According to an embodiment, the electronic device 2 may include a first printed circuit board (e.g., first PCB or printed board assembly (PBA)) disposed in the third support area 411B of the first support structure 411 between the first support structure 411 and the first rear cover 211 (see FIG. 2). The electronic device 2 may include a first battery disposed in the third support area 411B of the first support structure 411 between the first support structure 411 and the first rear cover 211.

According to an embodiment, the electronic device 2 may include a second printed circuit board (e.g., second PCB or second PBA) disposed in the fourth support area 421B of the second support structure 421 between the second support structure 421 and the second rear cover 221 (see FIG. 2). The electronic device 2 may include a second battery disposed in the fourth support area 421B of the second support structure 421 between the second support structure 421 and the second rear cover 221.

According to some embodiments, the first PCB disposed in the first support structure 411 or the second PCB disposed in the second support structure 421 may include a primary PCB, a secondary PCB, and an interposer substrate between the primary PCB and the secondary PCB. The interposer substrate may electrically connect the primary PCB and the secondary PCB. The interposer substrate may include, for example, a plurality of conductive vias that electrically connect the primary PCB and the secondary PCB. At least a part of the plurality of conductive vias included in the interposer substrate may be part of a signal line that transfers a signal between a first electronic component disposed on the primary PCB and a second electronic component disposed on the secondary PCB. In some embodiments, some of the plurality of conductive vias included in the interposer substrate may be part of a ground path that electrically connects a first ground plane included in the primary PCB and a second ground plane included in the secondary PCB.

According to an embodiment, the first electrical path 81 (e.g., FPCB) may electrically connect the first PCB disposed in the first support structure 411 and the second PCB disposed in the second support structure 421. One end portion of the first electrical path 81 may include a first connector 814A for electrical connection with the first PCB, and the other end portion of the first electrical path 81 may include a second connector 815A for electrical connection with the second PCB.

According to an embodiment, the first electrical path 81 may include a first area 811, a second area 812, a third area 813, a fourth area 814, and/or a fifth area 815. The first area 811 may pass through the first opening 901 of the first plate 61 to be coupled to the second plate 62. The first area 811 may be, for example, coupled to the second plate 62 using bonding techniques including bonding with an adhesive material. The second area 812 may pass through the second opening 902 of the fifth plate 65 to be coupled to the sixth plate 66. The second area 812 may be, for example, coupled to the sixth plate 66 using bonding techniques including bonding with an adhesive material. The first area 811 and the second area 812 may be substantially rigid. The first area 811 and the second area 812 may be provided, for example, in the form of a substantially rigid PCB. For other examples, the first area 811 and the second area 812 may include a reinforcement member or a reinforcement structure, such as a stiffener. In some embodiments, using a mechanical connection such as screw fastening instead of an adhesive member, the first area 811 may be coupled to the second plate 62, and the second area 812 may be coupled to the sixth plate 66. The third area 813 may be flexible and connect the first area 811 and the second area 812. The third area 813 may be disposed in the recess 231 of the hinge housing 23 to correspond to a folding part of the foldable housing 20 (see FIG. 2). The third area 813 may be modified according to a change in the state (e.g., the switch between the unfolded state of FIG. 2 and the folded state of FIG. 3) of the electronic device 2. The fourth area 814 may be extended from the first area 811, and the first connector 814A may be disposed or included in the fourth area 814. The fifth area 815 may be extended from the second area 812, and the second connector 815A may be disposed or included in the fifth area 815.

According to an embodiment, the hinge housing 23 may include one surface 23A corresponding to the first cover member 1610 and the second cover member 1620. In an unfolded state (see FIG. 2) of the electronic device 2, one surface 23A may not be exposed to the outside by being covered by the first cover member 1610 and the second cover member 1620. When the electronic device 2 is switched from the unfolded state to the folded state (see FIG. 3), while a gap B (see FIG. 2) between the first cover member 1610 and the second cover member 1620 is opened, one surface 23A of the hinge housing 23 may be exposed to the outside to provide a portion of an external appearance of the electronic device 2. When the electronic device 2 is switched from the unfolded state to the folded state, an area in which the first cover member 1610 overlaps one surface 23A of the hinge housing 23 and an area in which the second cover member 1620 overlaps one surface 23A of the hinge housing 23 may be reduced. In an embodiment, the first area 811 of the first electrical path 81 may be disposed between the second plate 62 and the first cover member 1610. In an embodiment, the second area 812 of the first electrical path 81 may be disposed between the sixth plate 66 and the second cover member 1620. One surface 23A of the hinge housing 23 may include one side area including a curved surface corresponding to the first cover member 1610 and the other side area including a curved surface corresponding to the second cover member 1620. When viewing from the cross-section of the x-z plane illustrated in FIG. 24 (e.g., the cross-section of the x-z plane perpendicular to a direction of the folding axis A), the first cover member 1610 may have a curved shape extended from the first end portion 1611 to the second end portion 1612 so as to cover one side area of one surface 23A of the hinge housing 23. When viewing from the cross-section of the x-z plane illustrated in FIG. 24, the second cover member 1620 may have a curved shape extended from the third end portion 1621 to the fourth end portion 1622 so as to cover the other side area of one surface 23A of the hinge housing 23. In the unfolded state of the electronic device 2, the second end portion 1612 of the first cover member 1610 and the fourth end portion 1622 of the second cover member 1620 abut; thus, the gap B (see FIG. 2) may be substantially free, and the hinge housing 23 may not be exposed to the outside. When the electronic device 2 is switched from the unfolded state to the folded state, while a gap B (see FIG. 2) between the second end portion 1612 of the first cover member 1610 and the fourth end portion 1622 of the second cover member 1620 is opened, one surface 23A of the hinge housing 23 may be exposed to the outside to provide a portion of an external appearance of the electronic device 2. In an embodiment, the first area 811 of the first electrical path 81 may be disposed between the first end portion 1611 of the first cover member 1610 and the second plate 62.

The first end portion 1611 of the first cover member 1610 may be connected to the first support structure 411 using various methods, such as screw fastening or bonding. In an embodiment, the second area 812 of the first electrical path 81 may be disposed between the sixth plate 66 and the third end portion 1621 of the second cover member 1620. The third end portion 1621 of the second cover member 1620 may be connected to the second support structure 421 using various methods, such as screw fastening or bonding.

According to an embodiment, in the unfolded state (see FIG. 24) of the electronic device 2, the first plate assembly 6A (see FIG. 4) including the first plate 61, the second plate 62, the third plate 63 (see FIG. 4), and the fourth plate 64 (see FIG. 4) may form an angle of about 180 degrees with a second plate assembly 6B including the fifth plate 65, the sixth plate 66, the seventh plate 67 (see FIG. 4), and the eighth plate 68 (see FIG. 4). In the folded state (see FIG. 25) of the electronic device 2, the first plate assembly 6A and the second plate assembly 6B may be spaced apart from each other to face each other and form an angle of about 0 degrees to about 10 degrees or may be disposed substantially parallel to each other. In the folded state of the electronic device 2, the second surface 602 of the first plate 61 (see FIG. 4) and the tenth surface 610 of the fifth plate 65 (see FIG. 4) may form an angle of about 0 degrees to about 10 degrees or may be disposed substantially parallel to each other. In the folded state of the electronic device 2, the fourth surface 604 of the second plate 62 (see FIG. 4) and the twelfth surface 612 of the sixth plate 66 (see FIG. 4) may form an angle of about 0 degrees to about 10 degrees or may be disposed substantially parallel to each other. In the folded state of the electronic device 2, the sixth surface 606 of the third plate 63 (see FIG. 4) and the fourteenth surface 614 of the seventh plate 67 (see FIG. 4) may form an angle of about 0 degrees to about 10 degrees or may be disposed substantially parallel to each other. In the folded state of the electronic device 2, the eighth surface 608 of the fourth plate 64 (see FIG. 4) and the sixteenth surface 616 of the eighth plate 68 (see FIG. 4) may form an angle of about 0 degrees to about 10 degrees or may be disposed substantially parallel to each other.

According to an embodiment, when viewing a cross section of the x-z plane (e.g., the cross-section of the x-z plane perpendicular to a direction of the folding axis A), the display assembly 300 may include a bendable area 300F overlapped with a folding cover area F (see FIG. 2). The second plate 62 may include a first end area 62A corresponding to the bendable area 300F of the display assembly 300. The sixth plate 66 may include a second end area 66A corresponding to the bendable area 300F of the display assembly 300. In the unfolded state (see FIG. 24) of the electronic device 2, the first end area 62A of the second plate 62 and the second end area 66A of the sixth plate 66 may support the bendable area 300F of the display assembly 300 disposed in a planar form. The first end area 62A and the second end area 66A may contribute so that the bendable area 300F of the display assembly 300 may be maintained in a planar form in the unfolded state of the electronic device 2. In the folded state (see FIG. 25) of the electronic device 2, the bendable area 300F of the display assembly 300 curved in the form of a curved surface may be positioned between the first end area 62A of the second plate 62 and the second end area 66A of the sixth plate 66 due to a position of the folding axis A. In an embodiment, the remaining area other than the first end area 62A of the second plate 62 and/or the remaining area other than the second end area 66A of the sixth plate 66 may be coupled to the display assembly 300 using an adhesive material. In some embodiments, the remaining area of the second plate 62 other than the first end area 62A and/or the remaining area of the sixth plate 66 other than the second end area 66A may be in a state separated from the display assembly 300.

Figure 26:
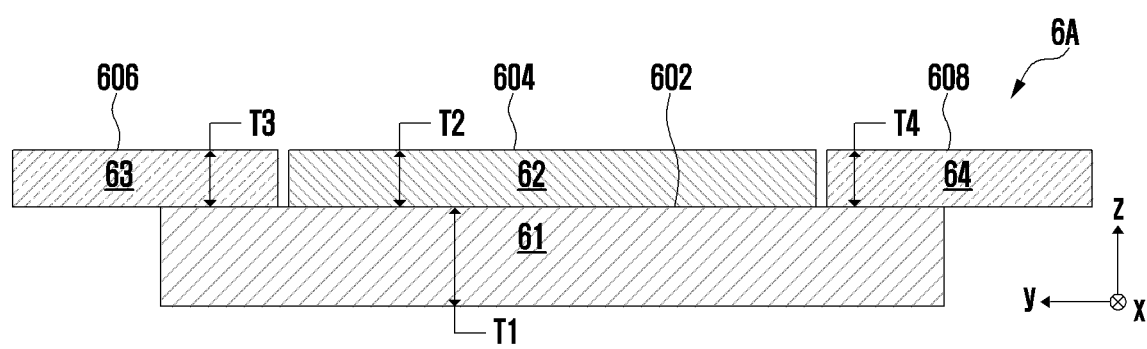
FIG. 26 is a cross-sectional view illustrating a first plate assembly according to an embodiment of the disclosure.

FIG. 26 is a cross-sectional view illustrating a first plate assembly 6A according to an embodiment of the disclosure. It is to be understood as the disclosure envisages and includes all combinations of features and/or embodiments disclosed in relation to FIG. 26. That is, every combination of the features described below in relation to FIG. 26 should be considered as included in the disclosure as a specific example.

With reference to FIG. 26, the first plate assembly 6A may include a first plate 61, a second plate 62, a third plate 63, and a fourth plate 64. The second plate 62, the third plate 63, and the fourth plate 64 may be disposed on or coupled to a second surface 602 of the first plate 61. The second plate 62 may be positioned between the third plate 63 and the fourth plate 64 in a direction (e.g., y-axis direction) of the folding axis A (see FIG. 2). When viewed in the −z axial direction, a portion of the third plate 63 that does not overlap the first plate 61 may be coupled to the first part ① of the first hinge assembly 51 (see FIG. 4). When viewed in the −z axis direction, a portion of the fourth plate 64 that does not overlap the first plate 61 may be coupled to the fifth part ⑤ of the second hinge assembly 52 (see FIG. 4).

According to an embodiment, the fourth surface 604 of the second plate 62, the sixth surface 606 of the third plate 63, and the eighth surface 608 of the fourth plate 64 may support a rear surface of the display assembly (e.g., the display assembly 300 of FIG. 24) together with the first support area 411A (see FIG. 24) of the first support structure 411. In an embodiment, the first plate 61 may be disposed in a first support area 411A of the first support structure 411 (see FIG. 4) so as not to overlap the first hinge assembly 51 and the second hinge assembly 52, when viewed in the −z axis direction to be a bracket or a base connecting the second plate 62, the third plate 63, and the fourth plate 64 supporting the display assembly to the first support structure 411. The first plate 61 may enable the second plate 62, the third plate 63, and the fourth plate 64 to be positioned apart from the first support structure 411 (FIG. 4) at a designated height.

The second plate 62, the third plate 63, and the fourth plate 64 are disposed in the first plate 61 and spaced apart from the first support structure 411 at a designated height to support the display assembly not to sag without substantially pressing the rear surface of the display assembly. The first plate 61 may have a first thickness T1 of about 0.5 mm, but is not limited thereto.

According to an embodiment, the fourth surface 604 of the second plate 62, the sixth surface 606 of the third plate 63, and the eighth surface 608 of the fourth plate 64 of the first plate assembly 6A are support surfaces supporting the display assembly (e.g., the display assembly 300 of FIG. 24) and may be formed with substantially no difference in height. For example, a second thickness T2 of the second plate 62, a third thickness T3 of the third plate 63, and a fourth thickness T4 of the fourth plate 64 may be substantially the same. For example, the second thickness T2, the third thickness T3, and/or the fourth thickness T4 may be about 0.2 mm, but are not limited thereto.

According to some embodiments, the third thickness T3 of the third plate 63 and the fourth thickness T4 of the fourth plate 64 may be substantially the same, and the second thickness T2 of the second plate 62 may be smaller than the third thickness T3 and the fourth thickness T4. The fourth surface 604 of the second plate 62 may be further spaced apart from the rear surface of the display assembly (e.g., the display assembly 300 of FIG. 24) compared to the sixth surface 606 of the third plate 63 and the eighth surface 608 of the fourth plate 64. In this case, an additional member may be disposed in the fourth surface 604. The additional member may support the rear surface of the display assembly instead of the fourth surface 604. In an embodiment, the additional member may be a ninth plate (not illustrated) disposed in the fourth surface 604. The ninth plate may be positioned between the third plate 63 and the fourth plate 64, when viewed from above the first support area 411A (see FIG. 12) of the first support structure 411. The ninth plate may be interpreted as part of the first plate assembly 6A. The ninth plate may include a metallic material and/or a non-metallic material. In case that the ninth plate includes a metallic material, the ninth plate may be coupled to the second plate 62 using welding. For another example, the ninth plate may be coupled to the second plate 62 using bonding techniques including bonding with an adhesive material. For another example, the ninth plate may be coupled to the second plate 62 and/or the first plate 61 using a screw. There may be substantially no difference in height between the support surface supporting the rear surface of the display assembly in the ninth plate and the sixth surface 606 of the third plate 63, and between the support surface of the ninth plate supporting the rear surface of the display assembly and the eighth surface 608 of the fourth plate 64.

Although not illustrated, the second plate assembly 6B (see FIG. 4) may be provided substantially the same as or similar to the first plate assembly 6A described with reference to FIG. 26.

Figure 27:
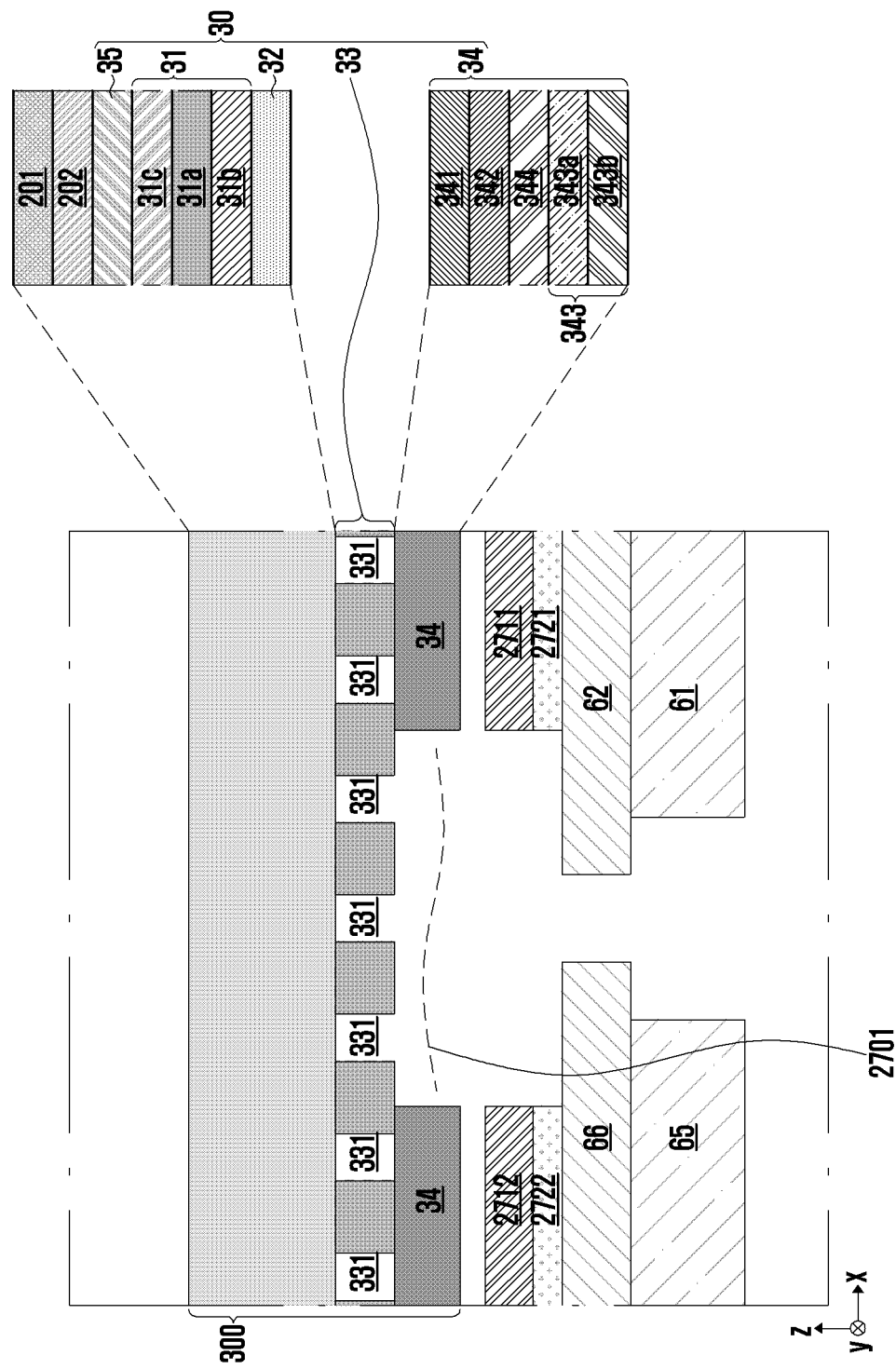
FIG. 27 is an enlarged view illustrating a portion indicated by reference numeral '2401' in FIG. 24 according to an embodiment of the disclosure.

FIG. 27 is an enlarged view illustrating a portion indicated by reference numeral '2401' in FIG. 24 according to an embodiment of the disclosure. It is to be understood as the disclosure envisages and includes all combinations of features and/or embodiments disclosed in relation to FIG. 27. That is, every combination of the features described below in relation to FIG. 27 should be considered as included in the disclosure as a specific example.

With reference to FIG. 27, the electronic device 2 may include a display assembly 300, a first plate 61, a second plate 62, a fifth plate 65, a sixth plate 66, a first reinforcement plate 2711, a second reinforcement plate 2712, a first adhesive member 2721, and/or a second adhesive member 2722.

According to an embodiment, the display assembly 300 may include a front cover 201, an optical transparent adhesive member 202, and a flexible display 30. The flexible display 30 may be coupled to the front cover 201 using an optical transparent adhesive member 202 (e.g., optical clear adhesive (OCA), optical clear resin (OCR), or super view resin (SVR)). The front cover 201 (e.g., window) may cover the flexible display 30 to protect the flexible display 30 from the outside. The front cover 201 may be implemented in a thin film form (e.g., thin film layer) having flexibility. The front cover 201 may include, for example, a plastic film (e.g., polyimide film) or thin film glass (e.g., ultra thin glass). In some embodiments, the front cover 201 may include a plurality of layers. For example, the front cover 201 may be in the form of various coating layers disposed in a plastic film or thin film glass. For example, the front cover 201 may be in the form of at least one protective layer or coating layer including a polymer material (e.g., polyester (PET), polyimide (PI), or thermoplastic polyurethane (TPU)) disposed in a plastic film or thin film glass. In some embodiments, the front cover 201 may be defined or interpreted as a component included in the flexible display 30. The flexible display 30 may include, for example, a display panel 31, a base film 32, a support sheet 33, a lower panel 34, and/or an optical layer 35. The display panel 31 may be disposed between the optical layer 35 and the base film 32. The base film 32 may be disposed between the display panel 31 and the support sheet 33. The support sheet 33 may be disposed between the base film 32 and the lower panel 34. The optical layer 35 may be disposed between the optical transparent adhesive member 202 and the display panel 31. Between the display panel 31 and the base film 32, between the base film 32 and the support sheet 33, between the support sheet 33 and the lower panel 34, and/or between the display panel 31 and the optical layer 35, an adhesive member (not illustrated) of various polymers may be disposed.

The display panel 31 may include, for example, a light emitting layer 31a, a thin film transistor (TFT) film 31b, and/or an encapsulation (e.g., thin-film encapsulation (TFE)) 31c. The light emitting layer 31a may include, for example, a plurality of pixels implemented into a light emitting element such as an OLED or micro LED. The light emitting layer 31a may be disposed on the TFT film 31b through organic material evaporation. The TFT film 31b may be disposed between the light emitting layer 31a and the base film 32. The TFT film 31b may refer to a film structure in which at least one TFT is disposed on a flexible substrate (e.g., PI film) through a series of processes such as deposition, patterning, and etching. The at least one TFT may control a current to a light emitting element of the light emitting layer 31a to adjust on/off of a pixel or brightness of a pixel. The at least one TFT may be implemented into, for example, an amorphous silicon (a-Si) TFT, a liquid crystalline polymer (LCP) TFT, a low-temperature polycrystalline oxide (LTPO) TFT, or a low-temperature polycrystalline silicon (LTPS) TFT. The display panel 31 may include a storage capacitor, which may maintain a voltage signal in the pixel, maintain a voltage entered to the pixel within one frame, or reduce a change in a gate voltage of the TFT due to leakage during a light emission time. By a routine (e.g., initialization, data write) that controls at least one TFT, the storage capacitor may maintain a voltage applied to the pixel at a predetermined time interval. In an embodiment, the display panel 31 may be implemented based on an OLED, and the encapsulation 31c may cover the light emitting layer 31a. Because organic materials and electrodes that emit light in OLEDs may react very sensitively to oxygen and/or moisture to lose luminescent properties thereof, the encapsulation 31c may seal the light emitting layer 31a so that oxygen and/or moisture do not penetrate into the OLED. The encapsulation 31c may serve as a pixel protection layer for protection of a plurality of pixels of the light emitting layer 31a.

The base film 32 may include, for example, a flexible film made of plastic or polymer such as polyimide or polyester (PET). The base film 32 may serve to support and protect the display panel 31. In some embodiments, the base film 32 may be referred to as other terms such as a 'protective film', 'back film', or 'back plate'.

According to an embodiment, the support sheet 33 may contribute to durability of the display assembly 300 or the flexible display 30. The support sheet 33 may reduce, for example, the effect of a load or stress that may occur in the switch between the unfolded state of FIG. 2 and the folded state of FIG. 3, on the flexible display 30. The support sheet 33 may be made of various metallic materials and/or non-metallic materials (e.g., polymers). The support sheet 33 may include, for example, stainless steel. For another example, the support sheet 33 may include engineering plastic.

According to an embodiment, the support sheet 33 may include a lattice structure provided in a portion corresponding to the folding cover area F (see FIG. 2). The lattice structure may include, for example, a plurality of openings (or slits) 331. For example, the plurality of openings 331 may be provided periodically, have substantially the same shape, and be arranged repeatedly at regular intervals. In some embodiments, the lattice structure including the plurality of openings 331 may be referred to as an 'opening pattern'. The lattice structure may contribute to flexibility for a portion of the display assembly 300 corresponding to the folding cover area F. In some embodiments, the support sheet 33 may include a recess pattern (not illustrated) including a plurality of recesses, replacing the lattice structure. The recess pattern may include, for example, a plurality of recesses provided on a surface facing the base film 32 or the opposite surface to the base film 32. In some embodiments, the lattice structure or recess pattern contributing to the flexibility of the display assembly 300 may be further extended to other portions. In some embodiments, the support sheet 33 including a lattice structure or recess pattern, or the corresponding conductive member may be formed in a plurality of layers.

According to some embodiments, the support sheet 33 may be disposed at the rear surface of the flexible display 30. For example, the support sheet 33 may be disposed at the rear surface of the lower panel 34 included in the flexible display 30. In some embodiments, the support sheet 33 may be defined or interpreted as a component separated from the flexible display 30. In some embodiments, the support sheet 33 may be omitted.

The lower panel 34 may include, for example, a plurality of layers for various functions. Adhesive members (not illustrated) of various polymers may be disposed between the plurality of layers included in the lower panel 34. The lower panel 34 may include, for example, a light blocking layer 341, a buffer layer 342, a lower layer 343, and/or an electromagnetic induction panel 344. The light blocking layer 341 may be disposed between the support sheet 33 and the buffer layer 342. The buffer layer 342 may be disposed between the light blocking layer 341 and the electromagnetic induction panel 344. The electromagnetic induction panel 344 may be disposed between the buffer layer 342 and the lower layer 343. The light blocking layer 341 may block at least a part of light incident from the outside. For example, the light blocking layer 341 may include an emboss layer. The emboss layer may be a black layer including an uneven pattern. The buffer layer 342 may mitigate an external shock applied to the flexible display 30. For example, the buffer layer 342 may include a sponge layer or a cushion layer. The lower layer 343 may diffuse, disperse, or dissipate a heat generated in the electronic device 2 or the flexible display 30. The lower layer 343 may absorb or shield electromagnetic waves. The lower layer 343 may mitigate an external shock applied to the electronic device 2 or the flexible display 30. For example, the lower layer 343 may include a composite sheet 343a or a conductive sheet 343b. In an embodiment, the composite sheet 343a may be a sheet processed by combining layers or sheets having different properties. For example, the composite sheet 343a may include at least one of polyimide or graphite. The composite sheet 343a may be replaced by a single sheet including one material (e.g., polyimide or graphite). The composite sheet 343a may be disposed between the electromagnetic induction panel 344 and the conductive sheet 343b. The conductive sheet 343b may reduce or shield electromagnetic interference (EMI) to the flexible display 30. The conductive sheet 343b may include copper, but is not limited thereto, and may include various other metal materials. In some embodiments, at least a portion of the lower layer 343 is a conductive member (e.g., metal plate), which may help to reinforce the rigidity of the electronic device 2 and be used for shielding ambient noise and dissipating a heat emitted from peripheral heat generating components (e.g., display driving circuit (e.g., DDI)). The conductive member may include, for example, at least one of copper (Cu), aluminum (A1), stainless steel (SUS) or CLAD (e.g., a laminated member in which SUS and A1 are alternately disposed). The lower layer 343 may include various layers for various other functions.

According to an embodiment, the electromagnetic induction panel 344 (e.g., digitizer) may be implemented in a form such as a flexible film or a flexible sheet. The electromagnetic induction panel 344 may be provided as, for example, a flexible PCB. When an alternating current is supplied to the electromagnetic induction panel 344, an electromagnetic field may be formed by a plurality of electrode patterns included in the electromagnetic induction panel 344. The pen input device may be implemented in an electromagnetic induction scheme (e.g., electromagnetic resonance (EMR) scheme). The pen input device includes a resonant circuit, and the resonant circuit may be interworked with the electromagnetic induction panel 344. When a pen tip of the pen input device is brought close to the front surface 20A (see FIG. 2) of the electronic device 2, a current may flow to the coil included in the resonance circuit of the pen input device by electromagnetic induction. The pen input device may generate a signal (e.g., radio frequency signal) (e.g., position signal, pen pressure signal, and/or angle signal) related to the user input on a screen using energy supplied from the electromagnetic induction panel 344 and transmit the signal to the screen (e.g., electromagnetic induction panel 344). The electromagnetic induction panel 344 may include a shielding sheet. The shielding sheet may be positioned at the rear surface (e.g., in the illustrated embodiment, a surface of a flexible PCB facing the conductive sheet 343b) of a flexible PCB including a plurality of electrode patterns. The shielding sheet may prevent interference between the components included in the electronic device 2 by an electromagnetic field generated in the components. The shielding sheet may block electromagnetic fields generated in the components, thereby enabling an input from the pen input device to be accurately transmitted to the coil included in the electromagnetic induction panel 344. In some embodiments, the electromagnetic induction panel 344 may be positioned between the conductive sheet 343b and the composite sheet 343a of the lower layer 343. In some embodiments, the electromagnetic induction panel 344 may be positioned between the light blocking layer 341 and the buffer layer 342. In some embodiments, the electromagnetic induction panel 344 may be defined or interpreted as a component included in the flexible display 30. According to some embodiments, the pen input device may be implemented in an active electrical stylus (AES) scheme or an electric coupled resonance (ECR) scheme. In this case, the electromagnetic induction panel 344 may be omitted.

The optical layer 35 may include, for example, a polarizing layer (or polarizer) or a retardation layer (or retarder). The polarizing layer and the retardation layer may improve outdoor visibility of the screen. The optical layer 35 may selectively transmit, for example, light generated in a light source of the display panel 31 and vibrating in a predetermined direction. In some embodiments, a single layer in which the polarizing layer and the retardation layer are combined may be provided, and such a layer may be defined as a 'circular polarizing layer'. In some embodiments, the polarizing layer (or circular polarizing layer) may be omitted, and in this case, a black pixel define layer (PDL) and/or a color filter may be included instead of the polarizing layer.

According to some embodiments, although not illustrated, in addition to the base film 32, at least one additional polymer layer (e.g., layer including PI, PET, or TPU) may be disposed at the rear surface of the display panel 31. In various embodiments, at least one of the plurality of layers (e.g., the light blocking layer 341, the buffer layer 342, the composite sheet 343a, the conductive sheet 343b, and the electromagnetic induction panel 344) included in the lower panel 34 may be omitted. In some embodiments, the disposition order of the plurality of layers included in the lower panel 34 is not limited to the illustrated example and may be variously changed.

According to an embodiment, the display assembly 300 may include touch sensing circuit (e.g., touch sensor) (not illustrated). The touch sensing circuit may be implemented into a transparent conductive layer (or film) based on various conductive materials such as indium tin oxide (ITO). For example, the touch sensing circuit may be disposed between the front cover 201 and the optical layer 35 (e.g., add-on type). For another example, the touch sensing circuit may be disposed between the optical layer 35 and the display panel 31 (e.g., on-cell type). For another example, the display panel 31 may include a touch sensing circuit or a touch sensing function (e.g., in-cell type). In an embodiment (not illustrated), the flexible display 30 is a touch sensing circuit disposed on the encapsulation 31c between the encapsulation 31c and the optical layer 35 and may include a conductive pattern such as a metal mesh (e.g., aluminum metal mesh). For example, to correspond to bending of the flexible display 30, the metal mesh may have greater durability than that of a transparent conductive layer implemented with ITO. In some embodiments, the flexible display 30 may further include a pressure sensor (not illustrated) capable of measuring the intensity (pressure) of the touch. The display panel 31, or the plurality of layers included in the lower panel 34, a lamination structure or the lamination order thereof may vary. The flexible display 30 may be implemented by omitting some of the components, or by adding other components, according to a providing form thereof or the trend of convergence.

According to an embodiment, the display assembly 300 may include a recess 2701 provided at the rear surface of the display assembly 300 corresponding to the bendable area 300F (see FIG. 24). For example, the lower panel 34 of the flexible display 30 may be implemented in a form in which a portion included in the bendable area 300F of the display assembly 300 has been removed; thus, the recess 2701 provided at the rear surface of the display assembly 300 may be implemented. For example, because the electromagnetic induction panel 344 is not extended in a portion including the recess 2701 in the bendable area 300F of the display assembly 300, it may be difficult to input (or recognize) using the pen input device. The recess 2701 may reduce a bending stress generating in the bendable area 300F of the display assembly 300 in the folded state (see FIG. 3) of the electronic device 2. The bending stress may occur when a force (e.g., tensile stress) increasing on one surface of the bendable area 300F and a force (e.g., compressive stress) decreasing on the other surface of the bendable area 300F collide. When a bending stress occurs a yield stress or more in the bendable area 300F, breakage or permanent deformation of the bendable area 300F may occur. When the switch between the unfolded state (see FIG. 2) and the folded state (see FIG. 3) of the electronic device 2 is repeated, the bending stress generated in the bendable area 300F may cause a decrease or loss of an elastic force due to fatigue accumulation, resulting in breakage or permanent deformation of the bendable area 300F. The bending stress occurring in the bendable area 300F may be, for example, proportional to the longitudinal elastic modulus of the bendable area 300F (e.g., degree of resistance to tensile or compression) and/or the thickness of the bendable area 300F. The bending stress occurring in the bendable area 300F may be, for example, inversely proportional to the radius of curvature. The recess 2701 may reduce the thickness of the bendable area 300F to reduce the bending stress generated in the bendable area 300F and reduce the breakage of the bendable area 300F. In some embodiments, in case that the physical properties of the bendable area 300F are configured to reduce breakage or permanent deformation of the bendable area 300F, the recess 2701 may be omitted. The lower panel 34 is further extended to the bendable area 300F; thus, the recess 2701 may not be provided, and compared to embodiments including the recess 2701, it may be possible to input (or recognize) using the pen input device through the bendable area 300F. In some embodiments, the recess 2701 may be provided by omitting some of the plurality of layers included in the lower panel 34. For example, it may be provided by omitting a portion of the lower layer 343 to correspond to the bendable area 300F of the plurality of layers included in the lower panel 34.

According to an embodiment, the first reinforcement plate 2711 may be coupled to the second plate 62 using the first adhesive member 2721. The second reinforcement plate 2712 may be coupled to the sixth plate 66 using the second adhesive member 2722. The first reinforcement plate 2711 and the second reinforcement plate 2712 may not overlap the recess 2701 when viewed from above the display assembly 300 (e.g., when viewed in the −z axis direction) in the electronic device 2 in the unfolded state. The first reinforcement plate 2711 may reinforce or support the first plate assembly 6A as a stiffener. The second reinforcement plate 2712 may reinforce or support the second plate assembly 6B as a stiffener. In some embodiments, the lower panel 34 may be extended further to the bendable area 300F: thus, the recess 2701 may not be provided. In this case, the first reinforcement plate 2711 and the second reinforcement plate 2712 may be further extended to the bendable area 300F.

According to an embodiment, the first reinforcement plate 2711 and the first adhesive member 2721 may reduce a separation space between the second plate 62 and the rear surface of the flexible display 30, and the first reinforcement plate 2711 may support the rear surface of the flexible display 30 instead of the second plate 62. In some embodiments, the first reinforcement plate 2711 and the first adhesive member 2721 may be interpreted as part of the first plate assembly 6A (see FIG. 4). The first reinforcement plate 2711 may include a metallic material or a non-metallic material.

According to some embodiments, in case that there is substantially no separation space between the second plate 62 and the rear surface of the flexible display 30 or in case that the second plate 62 is provided to support the rear surface of the flexible display 30, the first reinforcement plate 2711 and the first adhesive member 2721 may be omitted.

According to an embodiment, the second reinforcement plate 2712 and the second adhesive member 2722 may reduce a separation space between the sixth plate 66 and the rear surface of the flexible display 30, and the second reinforcement plate 2712 may support the rear surface of the flexible display 30 instead of the sixth plate 66. In some embodiments, the second reinforcement plate 2712 and the second adhesive member 2722 may be interpreted as part of the second plate assembly 6B (see FIG. 4). The second reinforcement plate 2712 may include a metallic material or a non-metallic material.

According to some embodiments, in case that there is substantially no separation space between the sixth plate 66 and the rear surface of the flexible display 30 or in case that the sixth plate 66 is provided to support the rear surface of the flexible display 30, the second reinforcement plate 2712 and the second adhesive member 2722 may be omitted.

According to an example embodiment of the disclosure, the electronic device (e.g., the electronic device 2 of FIG. 2) may include a foldable housing (e.g., the foldable housing 20 of FIG. 2) including a first housing (e.g., the first housing 21 of FIG. 2), a second housing (e.g., the second housing 22 of FIG. 2), and a folding part between the first housing and the second housing. The electronic device may include a foldable display (e.g., the flexible display 30 of FIG. 2) positioned in an internal space of the foldable housing. The flexible display may be visible through a front surface of the foldable housing. The electronic device may include a first support structure (e.g., the first support structure 411 of FIG. 4) positioned in an internal space of the first housing. The first support structure may support a portion of the flexible display. The electronic device may include a second support structure (e.g., the second support structure 421 of FIG. 4) positioned in an internal space of the second housing. The second support structure may support a portion of the flexible display. The electronic device may include a first hinge assembly (e.g., the first hinge assembly 51 of FIG. 4) and a second hinge assembly (e.g., the second hinge assembly 52 of FIG. 4) positioned in an internal space of the foldable housing to correspond to the folding part. The first hinge assembly and the second hinge assembly may connect the first support structure and the second support structure to be positioned to be spaced apart from each other in a direction of a folding axis of the folding part. The electronic device may include a first plate assembly (e.g., the first plate assembly 6A of FIG. 4) positioned in the internal space of the foldable housing corresponding to the folding part. The first plate assembly may include a first plate (e.g., the first plate 61 of FIG. 4), a second plate (e.g., the second plate 62 of FIG. 4), a third plate (e.g., the third plate 63 of FIG. 4), and a fourth plate (e.g., the fourth plate 64 of FIG. 4). The first plate may be coupled to the first support structure and support a portion of the flexible display corresponding to the folding part. The first plate may include a first surface (not illustrated) facing the first support structure and a second surface (e.g., the second surface 602 of FIG. 4) facing in a direction opposite to that of the first surface. The first plate may be positioned between the first hinge assembly and the second hinge assembly. The second plate may include a third surface (not illustrated) facing the second surface and a fourth surface (e.g., the fourth surface 604 of FIG. 4) facing in a direction opposite to that of the third surface. The third plate may include a fifth surface (not illustrated) and a sixth surface (e.g., the sixth surface 606 of FIG. 4) facing in a direction opposite to that of the fifth surface. The fifth surface may face the second surface and the first hinge assembly. The third plate may not overlap the second plate, when viewed from above the sixth surface. The fourth plate may include a seventh surface (not illustrated) and an eighth surface (e.g., the eighth surface 608 of FIG. 4) facing in a direction opposite to that of the seventh surface. The seventh surface may face the second surface and the second hinge assembly. The fourth plate may not overlap the second plate when viewed from above the eighth surface. The second plate may be positioned between the third and fourth plates, when viewed from above the fourth surface.

According to an example embodiment of the disclosure, the first plate (e.g., the first plate 61 of FIG. 4) and the second plate (e.g., the second plate 62 of FIG. 4) may be coupled using welding.

According to an example embodiment of the disclosure, the screw (e.g., the eighteenth screw S18 of FIG. 8) may penetrate a screw hole (e.g., the eighteenth screw hole H18 of FIG. 9) provided in the first plate (e.g., the first plate 61 of FIG. 8) to be coupled to the screw fastening part provided in the first support structure (e.g., the first support structure 411 of FIG. 8).

According to an example embodiment of the disclosure, the second plate (e.g., the second plate 62 of FIG. 8) may include an opening (e.g., the opening 1018 of FIG. 10) overlapped with the screw hole (e.g., the eighteenth screw hole H18 of FIG. 9) of the first plate (e.g., the first plate 61 of FIG. 8).

According to an example embodiment of the disclosure, the screw (e.g., the thirteenth screw S13 of FIG. 12) may penetrate a screw hole (e.g., the thirteenth screw hole H13 of FIG. 9) provided in the first plate (the first plate 61 of FIG. 12) and a screw hole provided in the third plate (e.g., the third plate 63 of FIG. 12) to be coupled to the screw fastening part provided in the first support structure (e.g., the first support structure 411 of FIG. 12).

According to an example embodiment of the disclosure, the screw (e.g., the third screw S3 of FIG. 12) may penetrate a screw hole provided in the third plate (e.g., the third plate 63 of FIG. 12) and a screw hole (e.g., the third screw hole H3 of FIG. 7) provided in the first hinge assembly (e.g., the first hinge assembly 51 of FIG. 12) to be coupled to the screw fastening part provided in the first support structure (e.g., the first support structure 411 of FIG. 12).

According to an example embodiment of the disclosure, the screw (e.g., the seventh screw S7 of FIG. 12) may penetrate a screw hole provided in the fourth plate (e.g., the fourth plate 64 of FIG. 12) and a screw hole provided in the second hinge assembly (e.g., the second hinge assembly 52 of FIG. 12) to be coupled to the screw fastening part provided in the second support structure (e.g., the second support structure 421 of FIG. 12).

According to an example embodiment of the disclosure, the first hinge assembly (e.g., the first hinge assembly 51 of FIG. 4) may include a first rotator, a first hinge arm, and a first actuator (e.g., the first actuator 511 of FIG. 4). The first rotator may include a first part (e.g., the first part ① of FIG. 4) coupled to the first support structure (e.g., the first support structure 411 of FIG. 4) and a second part (e.g., the second part ② of FIG. 4) coupled to the second support structure (e.g., the second support structure 421 of FIG. 4). The first hinge arm may include a third part (e.g., the third part ③ of FIG. 4) connected to the first part, and a fourth part (e.g., the fourth part ④ of FIG. 4) connected to the second part. The first actuator may connect the third part and the fourth part. The first actuator may include a gear assembly for providing a driving force for a rotational motion between the third part and the fourth part using elasticity of a torsion spring. The second hinge assembly (e.g., the second hinge assembly 52 of FIG. 4) may include a second rotator, a second hinge arm, and a second actuator (e.g., the second actuator 521 of FIG. 4). The second rotator may include a fifth part (e.g., the fifth part ⑤ of FIG. 4) coupled to the first support structure, and a sixth part (e.g., the sixth part ⑥) of FIG. 4) coupled to the second support structure. The second hinge arm may include a seventh part (e.g., the seventh part ⑦ of FIG. 4) connected to the fifth part, and an eighth part (e.g., the eighth part ⑧ of FIG. 4) connected to the sixth part. The second actuator may connect the seventh part and the eighth part. The second actuator may include a gear assembly for providing a drive force for a rotational motion between the seventh part and the eighth part using elasticity of the torsion spring. The first hinge arm and the second hinge arm may be positioned between the first rotator and the second rotator.

According to an example embodiment of the disclosure, when viewed from above the second surface (e.g., the second surface 602 of FIG. 8), the first plate may be positioned between the first hinge arm (e.g., the third part ③ and the fourth part ④) of FIG. 12) and the second hinge arm (e.g., the seventh part ⑦ and the eighth part ⑧ of FIG. 12). The screw (e.g., the third screw S3 of FIG. 12) may penetrate a screw hole provided in the third plate (e.g., the third plate 63 of FIG. 12) and a screw hole (e.g., the third screw hole H3 of FIG. 7) provided in the first part (e.g., the first part ① of FIG. 12) to be coupled to the screw fastening part provided in the first support structure (e.g., the first support structure 411 of FIG. 12). The screw (e.g., the seventh screw S7 of FIG. 12) may penetrate a screw hole provided in the fourth plate (e.g., the fourth plate 64 of FIG. 12) and a screw hole provided in the fifth part (e.g., the fifth part ⑤ of FIG. 12) to be coupled to the screw fastening part provided in the first support structure.

According to an example embodiment of the disclosure, the third plate (e.g., the third plate 63 of FIG. 13) may include an opening (e.g., the openings 1501 and 1503 of FIG. 13) that prevents the third plate from interfering with a portion of the first actuator (e.g., the first actuator 511 of FIG. 4). The fourth plate (e.g., the fourth plate 64 of FIG. 12) may include an opening that prevents the fourth plate from interfering with a portion of the second actuator (e.g., the second actuator 521 of FIG. 4).

According to an example embodiment of the disclosure, the folding part may include a hinge housing (e.g., the hinge housing 23 of FIG. 4) for covering the first hinge assembly and the second hinge assembly, and a guide rail assembly (e.g., the guide rail assembly 7 of FIG. 4) disposed in the hinge housing and positioned between the first hinge assembly and the second hinge assembly. The hinge housing may be exposed to the outside when the foldable housing is switched from an unfolding state to a folding state to provide a portion of an outer surface of the electronic device. The guide rail assembly may include a guide rail structure (e.g., the guide rail structure 71 of FIGS. 4, 16, and 17) and a slider structure (e.g., the first slider structure 72 of FIGS. 4 and 16). The guide rail structure may be coupled to the hinge housing. The slider structure may be coupled to the first plate. The slider structure may include a slider movable by being guided to the guide rail provided in the guide rail structure. The screw (e.g., the seventeenth screw S17 of FIG. 16) may penetrate the screw hole (e.g., the seventeenth screw hole H17 of FIG. 16) provided in the first plate (e.g., the first plate 61 of FIG. 16) to be coupled to the screw fastening part (e.g., the seventeenth screw fastening part B17 of FIG. 16) provided in the guide rail structure.

According to an example embodiment of the disclosure, the second plate (e.g., the second plate 62 of FIG. 16) may include an opening (e.g., the opening 1017 of FIG. 16) overlapped with the screw hole (e.g., the seventeenth screw hole H17 of FIG. 16) of the first plate (e.g., the first plate 61 of FIG. 16).

According to an example embodiment of the disclosure, the screw (e.g., the twenty-first screw S21 of FIG. 17) may penetrate a screw hole (e.g., the twenty-first screw hole H21 of FIG. 17) provided in the guide rail structure (e.g., the guide rail structure 71 of FIG. 17) to be coupled to the screw fastening part (e.g., the screw fastening part B21 of FIG. 17) provided in the hinge housing (e.g., the hinge housing 23 of FIG. 17). The first plate (e.g., the first plate 61 of FIG. 21) and the second plate (e.g., the second plate 62 of FIG. 21) may include openings (e.g., the opening 921 of FIG. 9 and the opening 1021 of FIG. 10) overlapped with a screw hole (e.g., the twenty-first screw hole H21 of FIG. 21) provided in the guide rail structure.

According to an example embodiment of the disclosure, the electronic device may include a flexible PCB (e.g., the first electrical path 81 or the second electrical path 82 of FIG. 4) positioned in an internal space of the foldable housing (e.g., the foldable housing 20 of FIG. 2). The flexible PCB may electrically connect a first electrical element housed in the first housing (e.g., the first housing 21 of FIG. 2) and a second electrical element housed in the second housing (e.g., the second housing 22 of FIG. 2). The flexible PCB may be extended between the first plate assembly (e.g., the first plate assembly 6A of FIG. 4) and the hinge housing (e.g., the hinge housing 23 of FIG. 4). A portion (e.g., the first area 811 of FIG. 24) of the flexible PCB may pass through the opening (e.g., the first opening 901 of FIG. 24) provided in the first plate (e.g., the first plate 61 of FIG. 24) to be coupled to the second plate (e.g., the second plate 62 of FIG. 24).

According to an example embodiment of the disclosure, the first plate (e.g., the first plate 61 of FIG. 20) may include a first opening (e.g., the opening 2010 of FIG. 20). The third plate (e.g., the third plate 63 of FIG. 20) may include a second opening (e.g., the opening 2030 of FIG. 20) overlapped with the first opening. The third plate may include one or more extension parts (e.g., a plurality of extension parts 2001, 2002, 2003, and 2004 of FIG. 20) extended from an edge of the second opening and inserted into the first opening to support the first plate.

According to an example embodiment of the disclosure, the electronic device may include a second plate assembly (e.g., the second plate assembly 6B of FIG. 4). The second plate assembly may be positioned in an internal space of the foldable housing (e.g., the foldable housing 20 of FIG. 4) corresponding to the folding part. The second plate assembly may be coupled to the second support structure (e.g., the second support structure 421 of FIG. 4). The second plate assembly may support a portion of the flexible display (e.g., the flexible display 30 of FIG. 2) corresponding to the folding part. In an unfolding state of the foldable housing, the first plate assembly (e.g., the first plate assembly 6A of FIG. 4) and the second plate assembly may form an angle of 180 degrees. In a folding state of the foldable housing, the first plate assembly and the second plate assembly may form an angle of 0 to 10 degrees. The second plate assembly may include a fifth plate (e.g., the fifth plate 65 of FIG. 4), a sixth plate (e.g., the sixth plate 66 of FIG. 4), a seventh plate (e.g., the seventh plate 67 of FIG. 4), and an eighth plate (e.g., the eighth plate 68 of FIG. 4). The fifth plate may include a ninth surface (not illustrated) facing the second support structure (e.g., the second support structure 421 of FIG. 4) and a tenth surface (e.g., the tenth surface 610 of FIG. 4) facing in a direction opposite to that of the ninth surface. The fifth plate may be positioned between the first hinge assembly and the second hinge assembly. The sixth plate may include an eleventh surface (not illustrated) facing the tenth surface and a twelfth surface (e.g., the twelfth surface 612 of FIG. 4) facing in a direction opposite to that of the eleventh surface. The seventh plate may include a thirteenth surface (not illustrated) and a fourteenth surface (e.g., the fourteenth surface 614 of FIG. 4) facing in a direction opposite to that of the thirteenth surface. The thirteenth surface may face the tenth surface and the first hinge assembly (e.g., the first hinge assembly 51 of FIG. 4). The seventh plate may not overlap the sixth plate, when viewed from above the fourteenth surface. The eighth plate may include a fifteenth surface (not illustrated) and a sixteenth surface (e.g., the sixteenth surface 616 of FIG. 4) facing in a direction opposite to that of the fifteenth surface. The fifteenth surface may face the tenth surface and the second hinge assembly (e.g., the second hinge assembly 52 of FIG. 4). The eighth plate may not overlap the sixth plate, when viewed from above the sixteenth surface. The sixth plate may be positioned between the seventh and eighth plates, when viewed from above the twelfth surface.

According to an example embodiment of the disclosure, the fifth plate (e.g., the fifth plate 65 of FIG. 4) and the sixth plate (e.g., the sixth plate 66 of FIG. 4) may be coupled using welding.

According to an example embodiment of the disclosure, the screw (e.g., the twentieth screw S20 of FIG. 8) may penetrate a screw hole (e.g., the twentieth screw hole S20 of FIG. 9) provided in the fifth plate (e.g., the fifth plate 65 of FIG. 8) to be coupled to a screw fastening part provided in the second support structure (e.g., the second support structure 421 of FIG. 8). The sixth plate (e.g., the sixth plate 66 of FIG. 8) may include an opening (e.g., the opening 1020 of FIG. 10) overlapped with the screw hole of the fifth plate.

According to an example embodiment of the disclosure, the screw (e.g., the fifteenth screw S15 of FIG. 12) may penetrate a screw hole (e.g., the fifteenth screw hole H15 of FIG. 9) provided in the fifth plate (e.g., the fifth plate 65 of FIG. 12) and a screw hole provided in the seventh plate (e.g., the seventh plate 67 of FIG. 12) to be coupled to the screw fastening part provided in the second support structure (e.g., the second support structure 421 of FIG. 12).

According to an example embodiment of the disclosure, the screw (e.g., the fourth screw S4 of FIG. 12) may penetrate a screw hole provided in the seventh plate (e.g., the seventh plate 67 of FIG. 12) and a screw hole (e.g., the fourth screw hole H4 of FIG. 7) provided in the first hinge assembly (e.g., the first hinge assembly 51 of FIG. 12) to be coupled to the screw fastening part provided in the first support structure (e.g., the first support structure 411 of FIG. 12). The screw (e.g., the eighth screw S8 of FIG. 12) may penetrate a screw hole provided in the eighth plate (e.g., the eighth plate 68 of FIG. 12) and a screw hole provided in the second hinge assembly (e.g., the second hinge assembly 52 of FIG. 12) to be coupled to the screw fastening part provided in the second support structure (e.g., the second support structure 421 of FIG. 12).

According to an example embodiment of the disclosure, the electronic device may further include a flexible PCB (e.g., the first electrical path 81 or the second electrical path 82 of FIG. 4) positioned in an internal space of the foldable housing (e.g., the foldable housing 20 of FIG. 2). The folding part may include a hinge housing (e.g., the hinge housing 23 of FIG. 4) that covers the first hinge assembly (e.g., the first hinge assembly 51 of FIG. 4) and the second hinge assembly (e.g., the second hinge assembly 52 of FIG. 4). The hinge housing may be exposed to the outside when the foldable housing is switched from an unfolding state to a folding state to provide a portion of an outer surface of the electronic device. The flexible PCB may electrically connect a first electrical element housed in the first housing (e.g., the first housing 21 of FIG. 2) and a second electrical element housed in the second housing (e.g., the second housing 22 of FIG. 2). The flexible PCB may be extended between the first plate assembly (e.g., the first plate assembly 6A of FIG. 4) and the hinge housing, and between the second plate assembly (e.g., the second plate assembly 6B of FIG. 4) and the hinge housing. The flexible PCB may include a first area (e.g., the first area 811 of FIG. 24), a second area (e.g., the second area 812 of FIG. 24), and a third area (e.g., the third area 813 of FIG. 24). The first area may pass through an opening (e.g., the opening 901 of FIG. 24) provided in the first plate (e.g., the first plate 61 of FIG. 24) to be coupled to the second plate (e.g., the second plate 62 of FIG. 24). The second area may pass through an opening (e.g., the second opening 902 of FIG. 24) provided in the fifth plate (e.g., the fifth plate 65 of FIG. 24) to be coupled to the sixth plate (e.g., the sixth plate 66 of FIG. 24). The third area may connect the first area and the second area and be positioned in the recess (e.g., the recess 231 of FIG. 24) of the hinge housing.

The embodiments disclosed in the disclosure described and shown in the specification and the drawings are merely specific examples that have been presented to easily explain the technical contents of the disclosure and help understanding of the disclosure, and are not intended to limit the scope of the disclosure. Therefore, the scope of various embodiments of the disclosure should be construed to include, in addition to the embodiments set forth herein, all changes and modifications derived on the basis of the technical idea of the disclosure. Additionally, any embodiment(s) set forth herein may be used with any other embodiment(s) set forth herein. In particular, it is stressed that, although the disclosure has been presented in a form in which a number of embodiments each defining a number of features are provided, where some of these embodiments are linked only through referring to the same figure or figures, the disclosure should be understood to include all combinations of these embodiments, unless there is a clear contradiction between two (or more) embodiments. In other words, where features are presented as optional herein, all combinations of such optional features are included in this disclosure.

The invention claimed is:

1. An electronic device, comprising:
 a foldable housing comprising a first housing, a second housing, and a folding part between the first housing and the second housing;
 a flexible display positioned in an internal space of the foldable housing and visible through a front surface of the foldable housing;
 a first support structure positioned in an internal space of the first housing and configured to support a first portion of the flexible display;
 a second support structure positioned in an internal space of the second housing and configured to support a second portion of the flexible display;
 a first hinge assembly and second hinge assembly positioned in the internal space of the foldable housing over the folding part, configured to connect the first support structure and the second support structure, and spaced apart from each other in a direction of a folding axis of the folding part; and
 a first plate assembly positioned in the internal space of the foldable housing over the folding part, coupled to the first support structure, and configured to support a third portion of the flexible display corresponding to the folding part;
 wherein the first plate assembly comprises:
  a first plate comprising a first surface facing the first support structure and a second surface facing in a direction opposite to that of the first surface and positioned between the first hinge assembly and the second hinge assembly;
  a second plate comprising a third surface facing the second surface and a fourth surface facing in a direction opposite to that of the third surface;
  a third plate comprising a fifth surface and a sixth surface facing in a direction opposite to that of the fifth surface, the fifth surface facing the second surface and the first hinge assembly; and
  a fourth plate comprising a seventh surface and an eighth surface facing in a direction opposite to that of the seventh surface, the seventh surface facing the second surface and the second hinge assembly;
 wherein the second plate is configured to be positioned between the third plate and the fourth plate, when viewed from above the fourth surface.

2. The electronic device of claim 1, wherein the first plate and the second plate are configured to be coupled using welding.

3. The electronic device of claim 1, wherein a screw is configured to penetrate a screw hole provided in the first plate to be coupled to a screw fastening part provided in the first support structure.

4. The electronic device of claim 3, wherein the second plate comprises an opening overlapped with the screw hole of the first plate.

5. The electronic device of claim 1, wherein a screw is configured to penetrate a screw hole provided in the first plate and a screw hole provided in the third plate to be coupled to a screw fastening part provided in the first support structure.

6. The electronic device of claim 1, wherein a screw is configured to penetrate a screw hole provided in the third plate and a screw hole provided in the first hinge assembly to be coupled to a screw fastening part provided in the first support structure; and a screw is configured to penetrate a screw hole provided in the fourth plate and a screw hole provided in the second hinge assembly to be coupled to a screw fastening part provided in the second support structure.

7. The electronic device of claim 1, wherein the first hinge assembly comprises:

a first rotator comprising a first part coupled to the first support structure, and a second part coupled to the second support structure;

a first hinge arm comprising a third part connected to the first part, and a fourth part connected to the second part; and a first actuator having a gear assembly configured to connect the third part and the fourth part and to provide a drive force for a rotational motion between the third part and the fourth part using elasticity of a torsion spring;

wherein the second hinge assembly comprises:

a second rotator comprising a fifth part coupled to the first support structure, and a sixth part coupled to the second support structure;

a second hinge arm comprising a seventh part connected to the fifth part and an eighth part connected to the sixth part; and a second actuator having a gear assembly configured to connect the seventh part and the eighth part and to provide a drive force for a rotational motion between the seventh part and the eighth part using elasticity of a torsion spring, wherein the first hinge arm and the second hinge arm are configured to be positioned between the first rotator and the second rotator.

8. The electronic device of claim 7, wherein the first plate is configured to be positioned between the first hinge arm and the second hinge arm, when viewed from above the second surface;

a screw is configured to penetrate a screw hole provided in the third plate and a screw hole provided in the first part to be coupled to a screw fastening part provided in the first support structure; and a screw is configured to penetrate a screw hole provided in the fourth plate and a screw hole provided in the fifth part to be coupled to a screw fastening part provided in the first support structure.

9. The electronic device of claim 7, wherein the third plate comprises an opening configured to prevent the third plate from interfering with a portion of the first actuator; and the fourth plate comprises an opening configured to prevent the fourth plate from interfering with a portion of the second actuator.

10. The electronic device of claim 1, wherein the folding part comprises:

a hinge housing configured to cover the first hinge assembly and the second hinge assembly; and a guide rail assembly disposed in the hinge housing and positioned between the first hinge assembly and the second hinge assembly;

wherein the hinge housing is configured to be exposed to the outside when the foldable housing is switched from an unfolding state to a folding state to provide a portion of an outer surface of the electronic device, wherein the guide rail assembly comprises:

a guide rail structure coupled to the hinge housing; and a slider structure including a slider coupled to the first plate and movable by being guided to a guide rail provided in the guide rail structure;

wherein a screw is configured to penetrate a screw hole provided in the first plate to be coupled to a screw fastening part provided in the guide rail structure.

11. The electronic device of claim 10, wherein the second plate comprises an opening overlapped with the screw hole of the first plate.

12. The electronic device of claim 10, wherein a screw is configured to penetrate a screw hole provided in the guide rail structure to be coupled to a screw fastening part provided in the hinge housing; and the first plate and the second plate comprise an opening overlapped with a screw hole provided in the guide rail structure.

13. The electronic device of claim 10, further comprising a flexible printed circuit board positioned in the internal space of the foldable housing and configured to electrically connect a first electrical element received in the first housing and a second electrical element received in the second housing;

wherein the flexible printed circuit board is configured to be extended between the first plate assembly and the hinge housing; and a portion of the flexible printed circuit board is configured to pass through an opening provided in the first plate to be coupled to the second plate.

14. The electronic device of claim 1, wherein the first plate comprises a first opening;

the third plate comprises a second opening overlapped with the first opening; and the third plate comprises one or more extension parts extended from an edge of the second opening and inserted into the first opening to support the first plate.

15. The electronic device of claim 1, further comprising a second plate assembly positioned in the internal space of the foldable housing to correspond to the folding part, coupled to the second support structure, and configured to support a portion of the flexible display corresponding to the folding part;

wherein in an unfolding state of the foldable housing, the first plate assembly and the second plate assembly are configured to form an angle of 180 degrees;

in a folding state of the foldable housing, the first plate assembly and the second plate assembly are configured to form an angle of 0 degree to 10 degrees;

wherein the second plate assembly comprises:

a fifth plate comprising a ninth surface facing the second support structure and a tenth surface facing in a direction opposite to that of the ninth surface, and positioned between the first hinge assembly and the second hinge assembly;

a sixth plate comprising an eleventh surface facing the tenth surface and a twelfth surface facing in a direction opposite to that of the eleventh surface;

a seventh plate comprising a thirteenth surface and a fourteenth surface facing in a direction opposite to that of the thirteenth surface, the thirteenth surface facing the tenth surface and the first hinge assembly; and an eighth plate comprising a fifteenth surface and a sixteenth surface facing in a direction opposite to that of the fifteenth surface, the fifteenth surface facing the tenth surface and the second hinge assembly;

wherein the sixth plate is configured to be positioned between the seventh plate and the eighth plate, when viewed from above the twelfth surface.

16. The electronic device of claim 15, wherein the fifth plate and the sixth plate are configured to be coupled using welding.

17. The electronic device of claim 15, wherein a screw is configured to penetrate a screw hole provided in the fifth plate to be coupled to a screw fastening part provided in the second support structure; and the sixth plate comprises an opening overlapped with the screw hole of the fifth plate.

18. The electronic device of claim 15, wherein a screw is configured to penetrate a screw hole provided in the fifth plate and a screw hole provided in the seventh plate to be coupled to a screw fastening part provided in the second support structure.

19. The electronic device of claim 15, wherein a screw is configured to penetrate a screw hole provided in the seventh plate and a screw hole provided in the first hinge assembly to be coupled to a screw fastening part provided in the first support structure; and a screw is configured to penetrate a screw hole provided in the eighth plate and a screw hole provided in the second hinge assembly to be coupled to a screw fastening part provided in the second support structure.

20. The electronic device of claim 15, further comprising a flexible printed circuit board positioned in an internal space of the foldable housing and configured to electrically connect a first electrical element housed in the first housing and a second electrical element housed in the second housing;

wherein the folding part is configured to cover the first hinge assembly and the second hinge assembly, and when the foldable housing is switched from an unfolding state to a folding state, the folding part comprises a hinge housing exposed to the outside to provide a portion of an outer surface of the electronic device;

the flexible printed circuit board is configured to be extended between the first plate assembly and the hinge housing, and between the second plate assembly and the hinge housing;

wherein the flexible printed circuit board comprises:
  a first area configured to pass through an opening provided in the first plate to be coupled to the second plate;
  a second area configured to pass through an opening provided in the fifth plate to be coupled to the sixth plate; and
  a third area configured to connect the first area and the second area and positioned in a recess of the hinge housing.

* * * * *